United States Patent
Schmidt-Karaca et al.

(10) Patent No.: US 8,407,297 B2
(45) Date of Patent: Mar. 26, 2013

(54) SYSTEMS AND METHODS TO RECEIVE INFORMATION FROM A GROUPWARE CLIENT

(75) Inventors: Markus Schmidt-Karaca, Heidelberg (DE); Peter Eberlein, Malsch (DE); Jurgen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 188 days.

(21) Appl. No.: 11/876,426

(22) Filed: Oct. 22, 2007

(65) Prior Publication Data

US 2009/0106373 A1  Apr. 23, 2009

(51) Int. Cl.
  *G06F 15/16* (2006.01)
(52) U.S. Cl. .................... 709/206; 709/205
(58) Field of Classification Search .................... 709/206
  See application file for complete search history.

(56) References Cited

U.S. PATENT DOCUMENTS

| | | | |
|---|---|---|---|
| 6,405,225 B1* | 6/2002 | Apfel et al. | 715/210 |
| 6,549,950 B2* | 4/2003 | Lytle et al. | 709/246 |
| 7,317,697 B2* | 1/2008 | Lewis et al. | 370/312 |
| 7,870,201 B2* | 1/2011 | Madams et al. | 709/206 |
| 2002/0091776 A1* | 7/2002 | Nolan et al. | 709/206 |
| 2002/0138582 A1* | 9/2002 | Chandra et al. | 709/206 |
| 2002/0169837 A1* | 11/2002 | Taranath et al. | 709/206 |
| 2004/0107025 A1* | 6/2004 | Ransom et al. | 700/286 |
| 2004/0138787 A1* | 7/2004 | Ransom et al. | 700/295 |
| 2004/0205216 A1* | 10/2004 | Ballinger et al. | 709/231 |
| 2004/0268215 A1* | 12/2004 | Trossen et al. | 715/500 |
| 2005/0038859 A1* | 2/2005 | Gardner et al. | 709/206 |
| 2005/0131811 A1* | 6/2005 | Ranzini et al. | 705/39 |
| 2005/0273459 A1* | 12/2005 | Moore et al. | 707/1 |
| 2006/0004768 A1* | 1/2006 | Betts et al. | 707/10 |
| 2006/0095511 A1* | 5/2006 | Munarriz et al. | 709/203 |
| 2006/0129499 A1* | 6/2006 | Combar et al. | 705/64 |
| 2006/0129655 A1* | 6/2006 | Schlimmer et al. | 709/217 |
| 2006/0200522 A1* | 9/2006 | Guest | 709/206 |
| 2006/0265393 A1 | 11/2006 | Agassi et al. | |
| 2006/0271933 A1 | 11/2006 | Agassi et al. | |
| 2006/0277079 A1 | 12/2006 | Gilligan et al. | |
| 2006/0277166 A1 | 12/2006 | Vogler-Ivashchanka et al. | |
| 2006/0277544 A1 | 12/2006 | Bjoernsen et al. | |
| 2006/0277554 A1 | 12/2006 | Vogler-Ivashchanka et al. | |
| 2007/0150296 A1* | 6/2007 | Ramcharran et al. | 705/1 |
| 2007/0250583 A1* | 10/2007 | Hardy et al. | 709/206 |
| 2008/0120129 A1* | 5/2008 | Seubert et al. | 705/1 |
| 2008/0189244 A1* | 8/2008 | Starbuck et al. | 707/2 |
| 2008/0294729 A1* | 11/2008 | Ionescu et al. | 709/206 |
| 2009/0013389 A1* | 1/2009 | Pintzow | 726/5 |
| 2009/0054091 A1* | 2/2009 | van Wijk et al. | 455/466 |
| 2009/0106371 A1* | 4/2009 | Schmidt-Karaca et al. | 709/206 |
| 2009/0193431 A1* | 7/2009 | Beard et al. | 719/314 |
| 2010/0287247 A1* | 11/2010 | Kohring et al. | 709/206 |

OTHER PUBLICATIONS

Freed, Multipurpose Internet Mail Extensions, 1996, Innosoft.*

(Continued)

*Primary Examiner* — Krista Zele
*Assistant Examiner* — Arvin Eskandarnia
(74) *Attorney, Agent, or Firm* — Buckley, Maschoff & Talwalkar LLC

(57) ABSTRACT

A system may include reception of an internet electronic mail message associated with a standards-compliant groupware object, and conversion of the internet electronic mail message to a message associated with the standards-compliant groupware object and compliant with a Web service message interface.

25 Claims, 47 Drawing Sheets

OTHER PUBLICATIONS

Jock L. Williams et al., "Duet Implementation Best Practices", White Paper, Published Nov. 2006, Duet Software for Microsoft Office and SAP. 12pgs.

"Duet Software: Bringing Together Business Productivity and Enterprise Applications", A Technical Overview, Duet Software for Microsoft Office and SAP. 12pgs, Oct. 2008.

U.S. Appl. No. 11/678,629, entitled "XAMLS / JAMLS Dynamic Mapping Solution in an Option Dialog Framework (ODF)", filed Feb. 26, 2007, not published.

U.S. Appl. No. 11/759,841, entitled "Business Query Language", not published, Filed on Jun. 7, 2007.

* cited by examiner

FIG. 30

SYSTEMS AND METHODS TO RECEIVE INFORMATION FROM A GROUPWARE CLIENT

FIELD

Some embodiments relate to the integration of groupware with a business process platform. In particular, some embodiments concern interactions between standards-based groupware clients and enterprise software systems via standards-based groupware objects and one or more Web service message interfaces.

BACKGROUND

Many business users use groupware clients (e.g., Microsoft Outlook®, Lotus Notes®, etc.) for collaboration and communication. Business users may also utilize business applications for implementing business processes, such as but not limited to the applications of SAP Business Suite®. Such business applications typically execute within a business process platform having a dedicated user interface. Contemporaneous use of a groupware client and business applications therefore requires a user to switch between at least two user interfaces. Efficiencies may be gained by integrating a business process platform with groupware technologies in order to enable a user to access functionality of the business process platform using any standards-based groupware client.

In this regard, a user may choose from among several disparate standards-based groupware clients depending upon the circumstances under which the user is working. For example, a user may choose a Personal Digital Assistant (PDA)-optimized groupware client when travelling but may prefer a richer desktop platform-optimized groupware client when at the office. The user may also prefer in some circumstances to install extensions (e.g., plug-ins) to his groupware client to enhance usability. A suitable groupware integration scenario may support groupware client functions that supplement commonly-available groupware client functions.

Mobile business users are presented with two usage scenarios. In one instance, an application server hosts online applications which are accessed by a client application (e.g., browser, proprietary client, etc.) for displaying user interfaces of the online applications. Use of these online applications requires a communication link that may be unavailable or sporadic, and may also require non-trivial configuration for establishing and securing the link. Offline applications, on the other hand, may utilize a framework (e.g., SAP Mobile Infrastructure®) that provides periodic synchronization with a back-end system. A user may therefore access an offline application without an active communication link to the back-end system. Offline applications may be costly to develop and maintain, and typically also require a mobile device to store some master data within a local persistence. This latter requirement imposes installation of a database as well as a component for managing access to the database.

Other business applications suffer due to their lack of integration with standards-based groupware. Current solutions to track groupware objects representing electronic mail messages, appointments, contacts, and/or tasks within business process platforms require duplicative data entry and/or rely on cumbersome interfaces.

For example, business applications may be used to centrally track electronic mail messages passed between sales representatives and their customers in order to provide a complete overview of interactions with the customer. After exchanging an electronic mail with a customer, a sales representative logs on to his CRM system and creates an electronic mail activity. The representative also inputs identifying information to describe the activity, and uploads the electronic mail message for association with the created electronic mail activity.

Tracking of customer interactions within a CRM system may also include tracking customer visits by sales representatives. Such tracking may proceed similarly to that described above with respect to electronic mail activity. These customer visits are also tracked and entered into the user's groupware client, either as appointments into his personal groupware calendar or meeting requests sent to the customer using functionality of the groupware client. The user must reflect any changes to the information in both the CRM system and the groupware client. If an appointment is scheduled in the groupware client while the CRM system is not available, the user must remember to update all relevant information once the CRM system becomes available. If an appointment originates in the CRM system, the user must reflect the appointment in his personal groupware calendar and send a corresponding invitation to the customer afterwards.

Business users require access to customer contact information to perform their business tasks. Contact information is stored in a back-end system and can be accessed via a user interface of a suitable business application (e.g., a CRM system) running on a business process platform. Acquisition of the contact information therefore requires a dedicated user interface and connectivity with the business process platform.

When the user is offline and wants to contact a customer, it is either impossible or inconvenient to log on to the business application to obtain the customer's electronic mail address or telephone number. Since business users also use groupware clients which provide for management of contact information as well as offline storage thereof, a user prepares for the above situation by manually maintaining contact information on his groupware client for all of his customers. This approach can be duplicative, time-consuming and error-prone. Moreover, the approach does not address changes to contact information that may be reflected on the back-end system.

Business users require efficient access to business reports. This access is typically restricted to users having access to an enterprise reporting user interface. The user logs on to the interface, enters report selection criteria, runs the report, and saves the report locally. If the report is to be used remotely, the report must first be transferred to a mobile device.

Request and approval scenarios offered by business applications may suffer from similar inefficiencies. For example, in order to request a vacation, a user first uses his groupware client to check his electronic calendar and the calendars of relevant coworkers. After deciding upon appropriate vacation days, the user logs on to a Human Resource Management (HRM) system to submit a request for the vacation days. With respect to approvals, an HRM system may notify a manager that a request is pending for approval. This notification may be sent via electronic mail. The manager must then log on to an approval system, review the request, and grant or deny the request.

Time reporting in conventional business scenarios may result in triple entry of business data. For example, an appointment or other calendar entry may be generated in a groupware client, and the data of the calendar entry is manually entered into a CRM system for tracking purposes as described above. The data of the calendar entry is then manually entered into a time reporting system in order to log the user's time.

Improved integration of groupware and business process platforms is therefore desired.

BRIEF DESCRIPTION OF THE DRAWINGS

FIG. 30 is a view of a groupware client user interface for creating and sending a calendar entry according to some embodiments.

DETAILED DESCRIPTION

Figure 1:
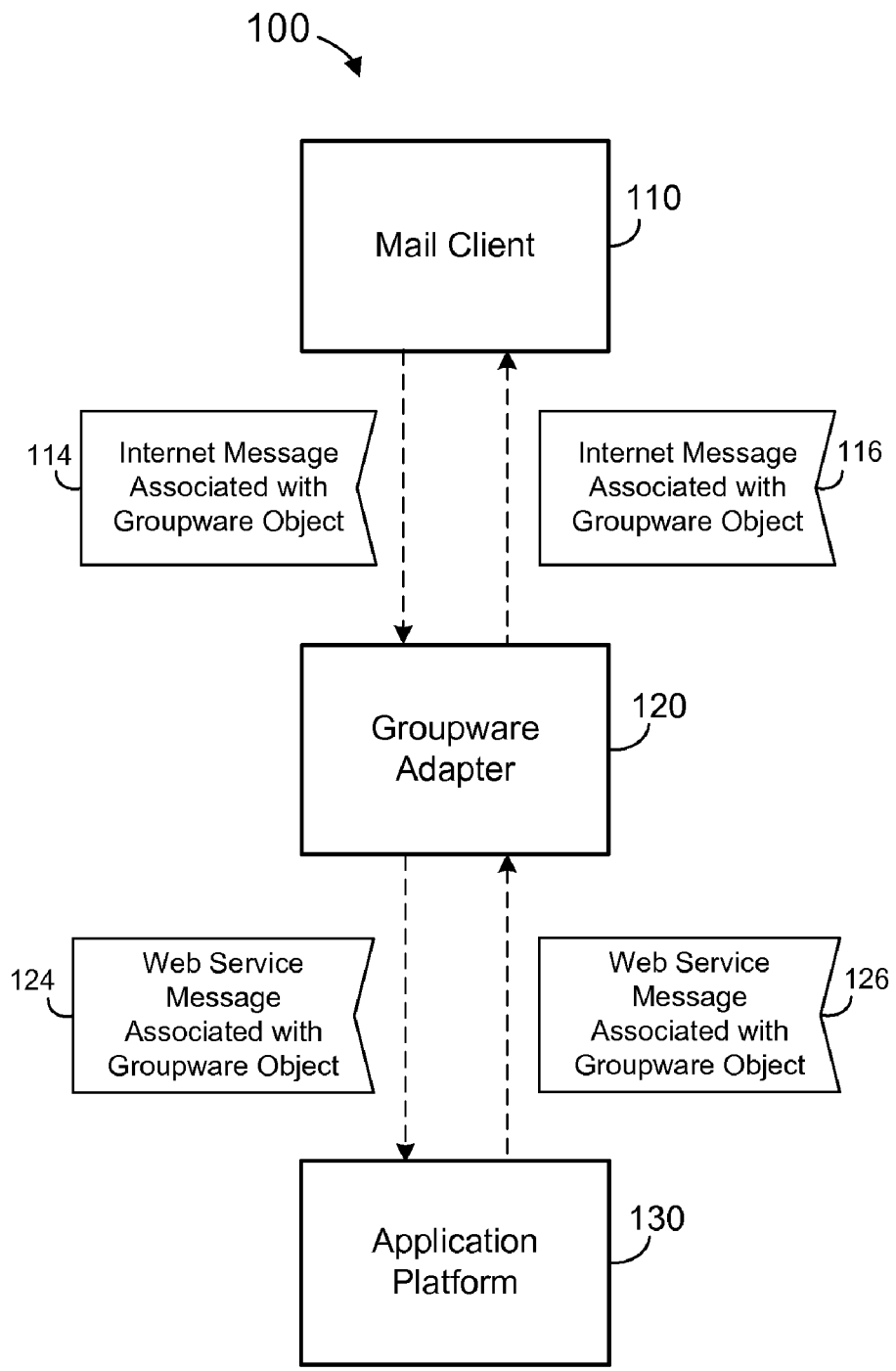
FIG. 1 is a block diagram of a system according to some embodiments.

FIG. 1 is a block diagram of system 100 according to some embodiments. System 100 may provide integration of groupware with a business process platform. Two or more of the elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other. Other topologies may be used in conjunction with other embodiments.

According to some embodiments, mail client 110 may comprise any application capable of sending and receiving an internet electronic mail message. Such a message may comply with Request For Comments (RFC) 2822—Internet Message Format and may also comply with one or more extensions thereto (e.g., RFC 2045—Multipurpose Internet Mail Extensions (MIME) Part One: Format of Internet Message Bodies, RFC 2046—Multipurpose Internet Mail Extensions (MIME) Part Two: Media Types, RFC 2049—Multipurpose Internet Mail Extensions (MIME) Part Five: Conformance Criteria and Examples). The RFC 2822 standard specifies a syntax for text messages that are sent between computer users, within the framework of "electronic mail".

Mail client 110 may also support the generation and attachment of one or more standards-compliant groupware objects to an internet message. Such groupware objects include, but are not limited to, objects compliant with RFC 2445—Internet Calendaring and Scheduling Core Object Specification (iCalendar) and objects compliant with RFC 2426—vCard MIME Directory Profile. For purposes of the description below, an internet electronic mail message will be considered a standards-compliant groupware object, as well as a carrier for transmission of one or more groupware objects including itself.

Mail client 110 may comprise Microsoft Outlook®, Lotus Notes®, Mozilla Thunderbird®, Qualcomm Eudora®, Google Gmail®, or any other suitable application that is or becomes known. Mail client 110 may also comprise any hardware suitable for executing the application, including but not limited to a desktop computer, a laptop computer, a PDA, a cellular telephone, a dedicated terminal, and a dedicated handheld device.

As shown in FIG. 1, mail client 110 may transmit internet message 114 to groupware adapter 120 or receive internet message 116 from groupware adapter 120. Groupware adapter 120 may transmit internet message 116 in response to receiving internet message 114 from mail client 110, mail client 110 may transmit internet message 114 in response to receiving message 116 from groupware adapter 120, or no causal relationship might exist between internet messages 114 and 116. Some embodiments may provide for transmission of an internet message in only one direction between client 110 and adapter 120.

Internet messages 114 and 116 are each associated with a groupware object. As described above, internet messages 114 and 116 are themselves groupware objects with which they are associated. Additionally, internet messages 114 and 116 may include one or more iCalendar objects compliant with RFC 2445 and vCard objects compliant with RFC 2426. An iCalendar attachment may refer to a calendar entry or to a task in some embodiments.

Mail client 110 may transmit internet message 114 to groupware adapter 120 using standard protocols, including but not limited to Simple Mail Transport Protocol (SMTP), and may receive internet message 116 using Post Office Protocol 3 (POP3), Internet Message Access Protocol (IMAP), Simple Mail Access Protocol (SMAP), or other standard protocols. In the latter regard, mail client 110 may receive internet message 116 from a mail server (unshown) that is associated with a recipient electronic mail address of internet message 116.

Similarly, groupware adapter 120 may transmit internet message 116 and receive internet message 114 using the aforementioned or other send/receive protocols. Groupware adapter 120 may include a mail server associated with a domain of a recipient electronic mail address of internet message 114 or may receive internet message 114 from such a mail server. In either case, groupware adapter 120 also includes a mail client to receive internet message 114. The mail client is associated with a local-part of the recipient electronic mail address.

Groupware adapter 120 may convert internet electronic mail message 114 associated with a groupware object to Web service message 124 associated with the groupware object. Generally, a Web service is associated with a message interface and a Web service message complies with the message interface. The Web service message interface with which the converted message is to comply may be determined based on the local-part of the recipient electronic mail address of internet electronic mail message 114.

According to some embodiments, Web service message 124 comprises an extensible Markup Language (XML) message within an XML/Simple Object Access Protocol (SOAP) envelope. The Web service message interface may be defined by a Web Services Description Language (WSDL) or XML Schema Definition (XSD) description. Groupware adapter 120 may use the message interface description to convert message 114 to message 124.

Groupware adapter 120 may also convert Web service message 126 associated with a groupware object to internet electronic mail message 116 associated with the groupware object. The Web service and/or groupware object of Web service message 124 may differ from the Web service and/or groupware object of Web service message 126. Accordingly, the message interface to which Web service message 126 complies may differ from the message interface to which Web service message 124 complies. Groupware adapter 120, in some embodiments, performs the above-mentioned conversion in only one direction. In such embodiments, a second groupware adapter may perform the conversion in the other direction.

Application platform 130 may receive Web service message 124 from groupware adapter 120. Application platform 130 may implement the Web service with which Web service message 124 is associated. More specifically, application platform may comprise a process agent to receive Web service message 124 based on the message interface with which message 124 complies, and to execute a business process based on the groupware object associated with message 124.

Application platform 130 may transmit Web service message 126 to groupware adapter 120. Some embodiments of application platform 130 comprise a process agent to create a message associated with a standards-compliant groupware object and compliant with a Web service message interface. Application platform 120 may include business objects with which the aforementioned process agents interact to execute business processes.

Communication between groupware adapter 120 and application platform 130 may be facilitated by a framework to provide communication between application platform 130 and disparate systems. For example, the framework may provide dynamic routing of messages, mapping of message contents, propagation of authentication data, and/or other functions. The framework may allow application platform 130 to communicate with a new system using an adapter associated with the new system. The framework may comprise, but is not limited to, SAP eXchange Infrastructure® (XI) and the XI Adapter Framework®.

Some embodiments of system 100 allow a user to interact with a business process platform within a groupware working environment. The groupware working environment therefore serves as a user interface to the business process platform. Some embodiments may also or alternatively provide a lightweight option for integrating business partners based solely on an assumption that systems of each business partner adhere to internet electronic mail message and groupware object standards. Other benefits of various embodiments will become evident from the foregoing description.

Figure 2:
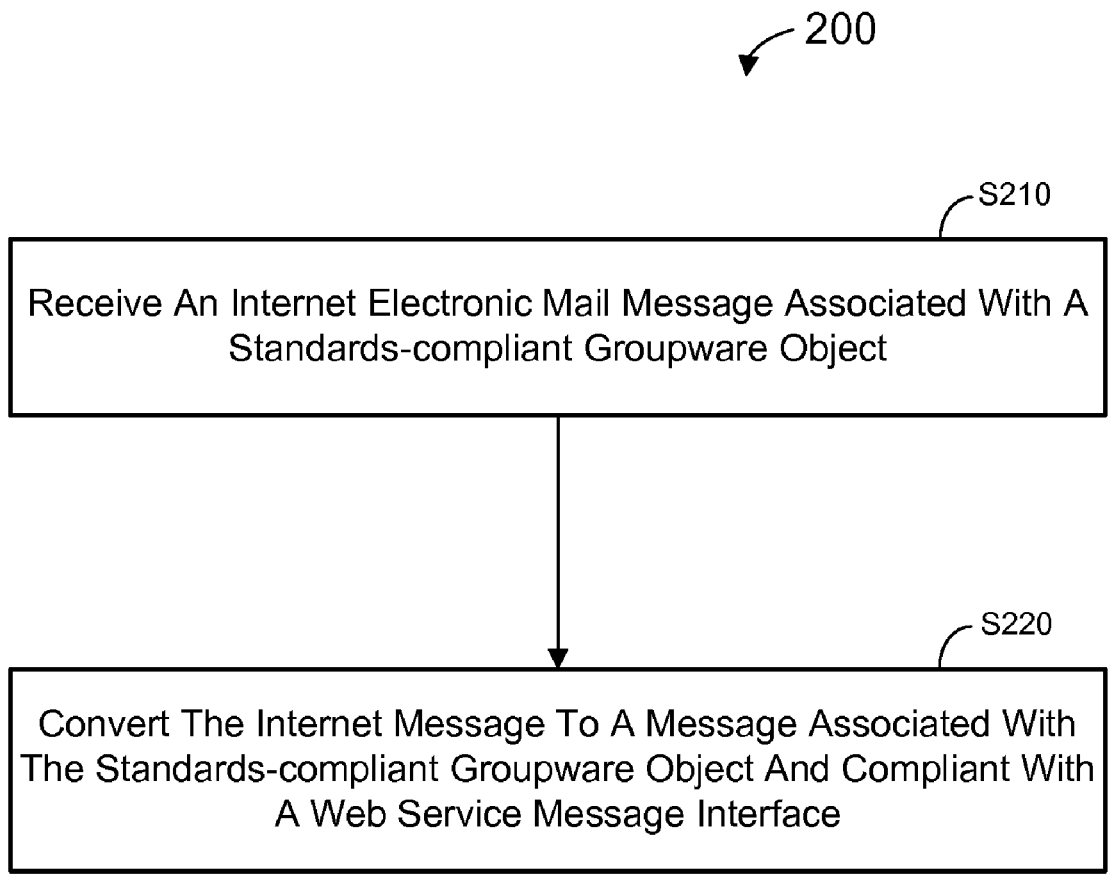
FIG. 2 is a flow diagram of a process according to some embodiments.

FIG. 2 is a flow diagram of process 200 according to some embodiments. Some embodiments of process 200 may provide efficient integration of groupware with a business process platform. In some embodiments, groupware adapter 120 performs process 200.

Process 200 and all other processes mentioned herein may be embodied in processor-executable program code read from one or more of a computer-readable medium, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an internet message associated with a standards-compliant groupware object is received. The internet message may comprise an internet electronic mail message according to RFC 2822. The internet message may also comply with RFC 2045, RFC 2046, RFC 2049, and/or other extensions to RFC 2822.

According to some embodiments, the internet message received at S210 includes one or more attachments. The one or more attachments may comprise one or more standards-compliant groupware objects such as an iCalendar or vCard objects. The attachments may comprise another internet electronic mail message in some embodiments.

The internet message may be received using POP3, IMAP, SMAP or other standard protocols. The internet message may be received from a mail server associated with a domain of a recipient electronic mail address of the internet message or from the internet in a case that process 200 is executed by an element including such a mail server. In a case that groupware adapter 120 of system 100 receives the internet message, groupware adapter 120 includes a mail client that is associated with a local-part of the recipient electronic mail address of the internet message.

The internet message is converted to a We service message in S220. The Web service message is associated with the standards-compliant groupware object with which the received internet message is associated. The Web service message is compliant with a message interface associated with the Web service.

The Web service message may comprise an XML message within an SOAP envelope, and the Web service message interface may be defined by a WSDL or XSD description. According to some embodiments of S220, groupware adapter 120 uses methods of the Web service message interface description to convert the received internet message to the Web service message.

Some embodiments of S220 comprise converting the internet electronic mail message to a Web service message associated with a "generic" groupware message interface. Next, the Web service message is mapped to a second Web service message interface based on the local-part of the recipient electronic mail address of the received internet electronic mail message. The Web service message is then provided to a particular process agent of an application platform that implements the associated Web service. Some examples of the foregoing are provided below.

Figure 3:
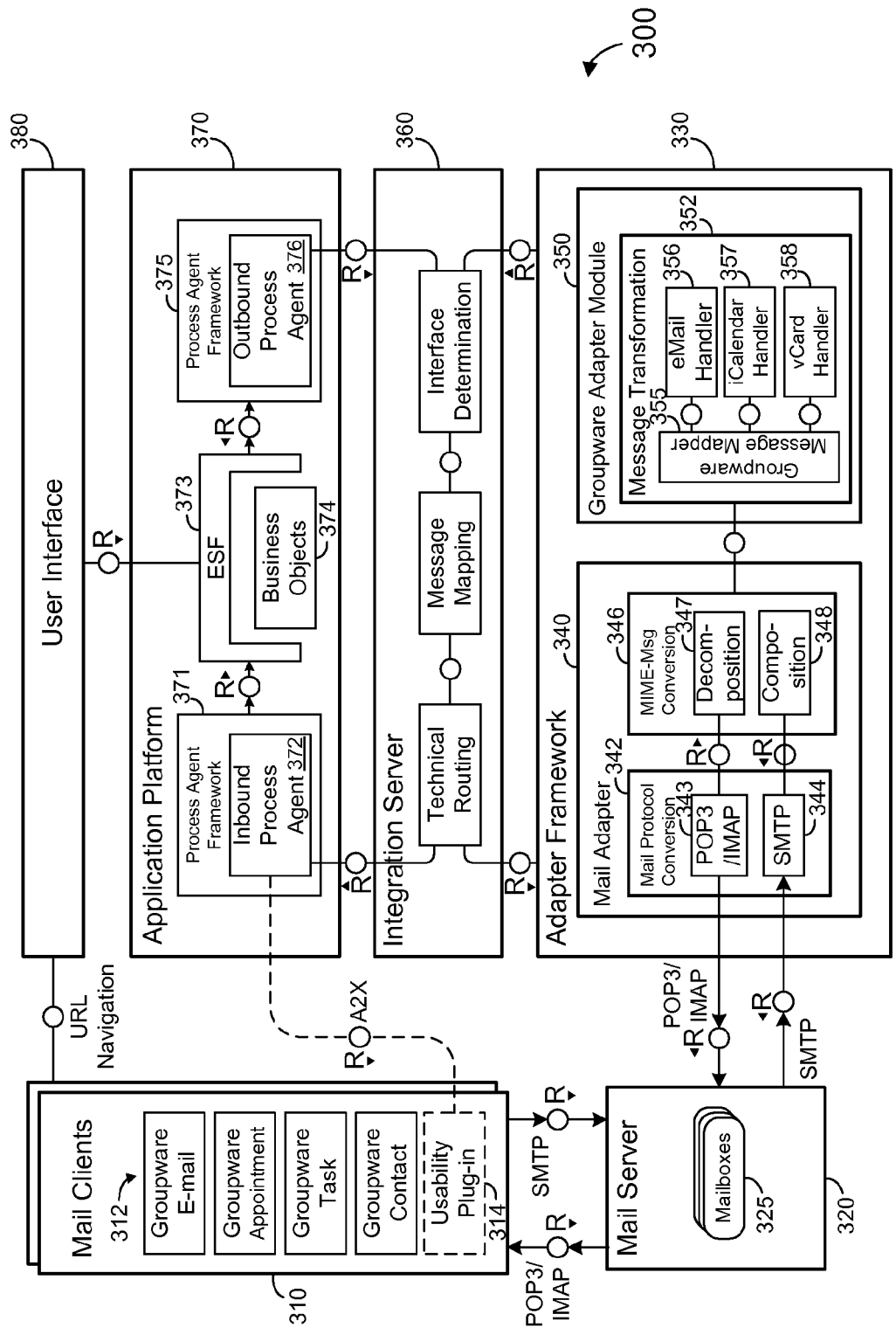
FIG. 3 is a detailed block diagram of a system according to some embodiments.

FIG. 3 is a detailed block diagram of system 300 according to some embodiments. System 300 may comprise an implementation of system 100 of FIG. 1. Accordingly, elements of system 300 may also or alternatively execute process 200 according to some embodiments.

Two or more of the depicted elements of system 300 may be located remote from one another and may communicate with one another via a network and/or a dedicated connection. Each displayed element of system 300 may comprise any number of hardware and/or software elements suitable to provide the functions described herein, some of which are located remote from each other. Other topologies may be used in conjunction with other embodiments.

Mail clients 310 may comprise any applications for transmitting and receiving internet electronic mail messages, including but not limited to those listed above. As also described above with respect to mail client 110, mail clients 310 may execute on any suitable software and hardware platforms. Mail clients 310 also support the generation and maintenance of groupware objects 312.

Mail clients 310 provide for the attachment of groupware objects 312 to an internet electronic mail message as well as extraction therefrom. For example, assignment of attendees to an appointment may cause creation of an internet electronic mail message with an attached iCalendar object, reception of an electronic mail message having an attached iCalendar object causes display of a meeting request, and contact information may be exported to a vCard object that may be subsequently attached to an electronic mail message.

Usability plug-in 314 may provide an extension of the base functionality of one or more mail clients 310 in order to facilitate associated usage scenarios, examples of which will be provided below. Moreover, mail clients 310 may support HyperText Transfer Protocol (HTTP) communication for Uniform Resource Locator (URL)-based navigation to a Web server.

Mail clients 310 may transmit internet electronic mail messages to mail server 320 using SMTP, but embodiments are not limited thereto. Conversely, mail clients 310 may receive internet electronic mail messages from mail server 320 using POP3 or IMAP. Mail server 320 may be associated with one or more internet domains. Accordingly, mail server 320 receives internet electronic mail messages having recipient electronic mail addresses which include the domains with which mail server 320 is associated.

Each of mailboxes 320 of mail server 325 is associated with a local-part (e.g., a username) of a domain with which mail server 320 is associated. One of mailboxes 325 therefore stores electronic mail messages having recipient electronic mail addresses which specify the local-part and domain associated with the mailbox 325. Mailboxes 325 may be accessed by adapter framework 330.

Adapter framework 330 includes mail adapter 340 and groupware adapter module 350. Adapter framework 330 may comprise the SAP XI Adapter Framework mentioned above. According to some embodiments, adapter framework 330 uses adapters to facilitate communication between a business process platform and separate systems associated with each of the adapters. Each adapter, in turn, may operate in conjunction with one or more adapter modules. Adapter framework 330 may therefore include more adapters and adapter modules than illustrated in FIG. 3.

Mail adapter 340 may exchange electronic mail messages with mail server 320 and translate between the internet message format of RFC 2822 and a message format of groupware adapter module 350. More specifically, mail adapter 340 includes mail protocol conversion module 342 for receiving electronic mail messages from mail server 320 and converting the received messages from the wire format to the aforementioned internet message format using POP3/IMAP module 343. Mail protocol conversion module 342 also includes SMTP module 344 for converting messages from the internet message format to the wire format to the aforementioned and transmitting the converted messages to mail server 320.

Mail adapter 340 also includes MIME-msg conversion module 346. Decomposition module 347 of conversion module 346 converts a received message in the internet message format to an intermediate message based on RFC 2045 and/or RFC 2046. Decomposition module 347 may also perform certificate verification if the received message complies with secure MIME (S/MIME) standards.

According to RFC 2045 and RFC 2046, the body of the received internet electronic mail message may include a nested structure of headers and attachments. In some embodiments, decomposition module 347 resolves only the body, the header elements, and a highest node level of any attachment tree. Decomposition module 347 then composes the intermediate message as a SOAP message having a main payload comprising the header elements and body, and a SOAP attachment of the highest level nodes of any attachment tree. The SOAP attachment may include a nested structure if the attachment tree comprises a multi-level structure.

Groupware adapter module 350 includes message transformation module 352 to transform SOAP messages to and from the intermediate message format described above. According to some embodiments, message transformation module 352 exchanges intermediate SOAP messages with mail adapter 340 via an Application Programming Interface (API). Message transformation module 352 includes groupware message mapper 355, electronic mail message handler 356, iCalendar handler 357 and vCard handler 358.

Groupware message mapper 355 determines a groupware object of interest based on a SOAP attachment of an intermediate message received from mail adapter 340. The groupware object of interest may comprise an iCalendar or vCard object, or an electronic mail object if no SOAP attachment exists. Groupware message mapper 355 invokes one of handlers 356, 357, and 358 based on the determined groupware object of interest.

Each of handlers 356, 357, and 358 may include an internal runtime representation of its associated groupware standard and methods to import or export the internal representation to string or XML. For an incoming intermediate message received from mail adapter 340, iCalendar handler 357 may be invoked to import an iCalendar string of the intermediate message to an internal representation, and to export the internal representation to XML. Handler 357 then employs the W3C Document Object Model (DOM) to create an XML tree based on the exported XML.

Using the XML tree and other information from the intermediate message, groupware message mapper 355 creates an XML (SOAP) message compliant with a generic groupware Web service message interface. According to some embodiments, the message type is one of: eMail; CalendarEvent; GroupwareContact; and GroupwareTask. Operation of mail adapter 340 and groupware adapter module 350 to process incoming messages and outgoing messages will be described in more detailed below.

Integration server 360 routes messages to and from appropriate interfaces of application platform 370. Integration server 360 may also provide mapping of incoming and outgoing messages according to pre-configured mappings. SAP XI provides an integration server suitable for use in conjunction with some embodiments.

Application platform 370 may receive a Web service message from integration server 360. In this regard, application platform 370 includes process agent framework 371 to support process agents for implementing message interfaces (i.e., providing Web services), such as inbound process agent 372. The received Web service message may be routed to inbound process agent 372 based on the message interface with which the message complies. The routing may also be based on the message type. For example, one inbound process agent may implement a generic groupware Web service for messages of type "eMail", while a second inbound process agent may implement the generic groupware Web service for messages of type "CalendarEvent". Inbound process agent 372, in some embodiments, may receive Web service messages directly from mail clients 310 via usability plug-in 314.

Inbound process agent 372 implements message interfaces of Web services by communicating with Enterprise Service Framework (ESF) 373 via process agent framework 371. ESF 373 provides an API through which framework 371 may cause instantiation of one or more of business objects 374. Each of business objects 374 may encapsulate data and related methods of business logic that describes a business process or task. ESF 373 may comprise a Service-Oriented Architecture (SOA) provided by SAP AG.

User interface 380 may comprise a software application that communicates with application platform 370 via proprietary interfaces. Accordingly, mail clients 310 provide an alternative user interface to application platform 370. In yet another alternative, user interface 380 may comprise a Web server for allowing mail clients 310 to access Web pages generated by user interface 380.

Process agent framework 375 may receive resulting information from ESF 373. This information may be received via the aforementioned API, and may be passed to outbound process agent 376. Outbound process agent 376 generates a Web service message based on the information. The Web service message may comply with the message interface implemented by inbound process agent 372, but embodiments are not limited thereto.

Application platform 370 transmits the Web service message to integration server 360. Integration server 360 and adapter framework 330 thereafter operate in a direction reverse to that described above to map the Web service message to a different message interface (if necessary), generate an intermediate XML SOAP message based on the Web service message and any attachments, convert the intermediate message to an internet electronic mail message, and transmit the internet electronic mail message to a mail server associated with one of mail clients 310. Some embodiments of the foregoing will be described in detail below.

Figure 4:
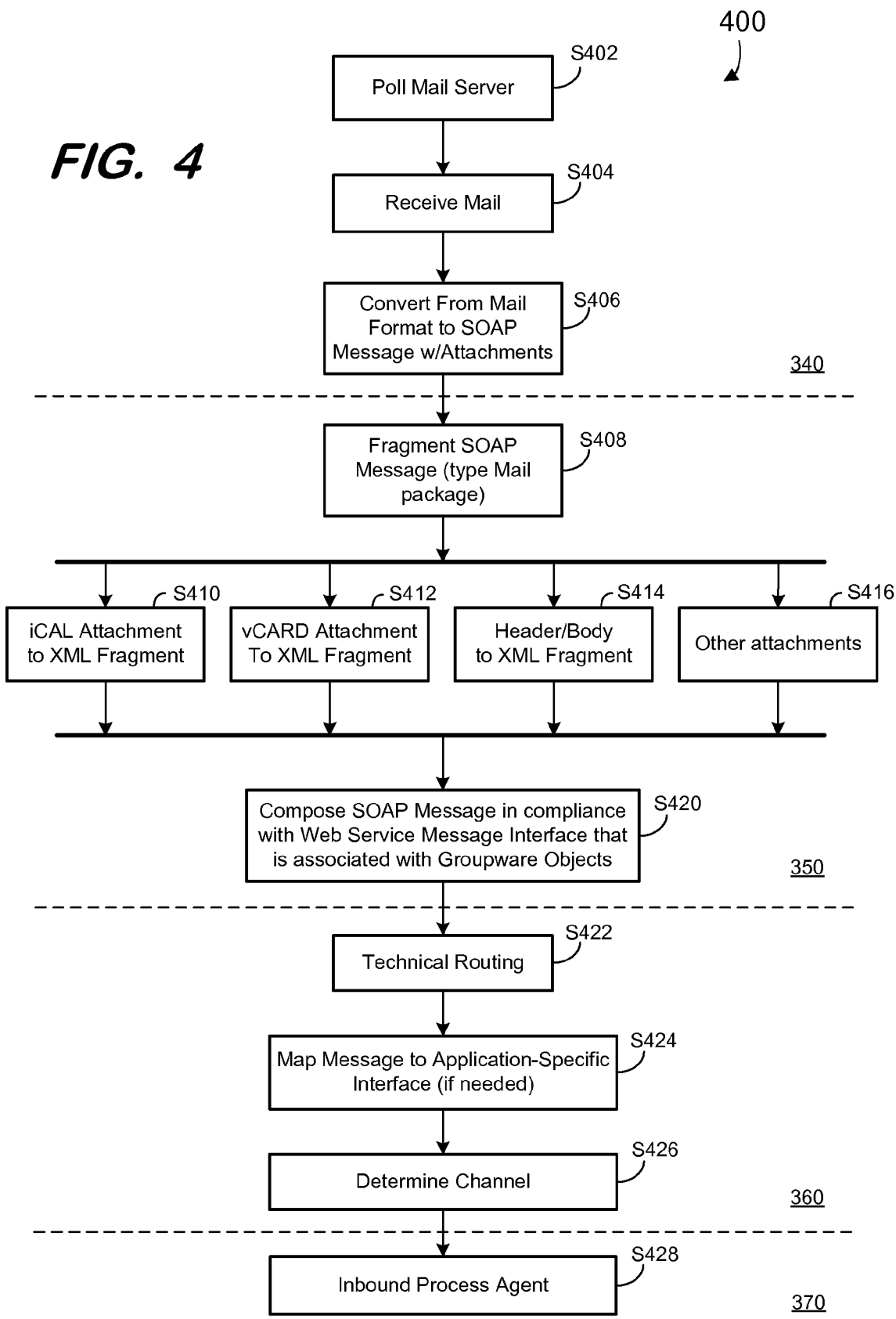
FIG. 4 is a flow diagram of a process to receive an electronic mail message according to some embodiments.

FIG. 4 is a diagram illustrating the processing of an internet electronic mail message sent to mail server 320. The sub-processes of process 400 are grouped according to the element of system 300 which performs the sub-processes. Embodiments are not limited to the architecture of system 300, and the sub-processes of process 400 need not be performed by the elements of system 300 with which they are associated in FIG. 4.

Mail adapter 340 polls mail server 320 at S402. The polling may be performed by mail protocol conversion module 342 using any suitable protocol. Mail server 320 stores internet electronic mail messages having recipient electronic mail addresses which include the domains with which mail server 320 is associated. S402 may comprise polling those mailboxes 325 which are associated with a local-part that is associated with application platform 370.

For example, mail server 320 may receive and store all electronic mail messages directed to local-part@company.com. Moreover, one of mailboxes 325 may store all electronic mail messages directed to track.activity@company.com. Local-part "track.activity" has been preconfigured to be associated with a Web service message interface of application platform 370. Accordingly, S402 may comprise polling the one of mailboxes 325.

An internet electronic mail message is received from mail server 420 at S404 in response to the polling. In some embodiments, mail protocol conversion module 342 receives the electronic mail message and converts the received message from the wire format to internet message format RFC 2822.

The electronic mail message is converted from the internet electronic mail message format to a SOAP message with attachments at S406. Decomposition module 347 of conversion module 346 may convert the message based on RFC 2045 and/or RFC 2046 according to some embodiments of S406. For example, decomposition module 347 may compose the SOAP message having a main payload comprising the header elements and body of the internet electronic mail message, and a SOAP attachment of the highest level nodes of any attachment tree of the internet electronic mail message. The SOAP attachment may include a nested structure if the attachment tree comprises a multi-level structure.

The SOAP message is fragmented at S408. S410 through S416 illustrate sub-processes that may comprise fragmentation of the SOAP message. More particularly, S410, S412 and S414 may be performed, respectively, by iCalendar handler 357, vCard handler 358 and electronic mail message handler 356. Groupware message mapper 355 determines which of handlers 356-358 to invoke based on the SOAP attachment of the message to be fragmented.

For example, iCalendar handler 357 may be invoked to import an iCalendar string of the SOAP attachment to an internal representation, and to export the internal representation to an XML fragment at S410. Similarly, vCard handler 358 may be invoked to import a vCard string of SOAP attachment to an internal representation and to export the internal representation to an XML fragment at S412.

Using the XML fragments generated by handlers 356-358, groupware message mapper 355 composes an XML (SOAP) message compliant with a generic groupware Web service message interface. According to some embodiments, the message type is one of: eMailNotification; CalendarEventNotification; GroupwareContactNotification; and GroupwareTaskNotification.

Figure 5:
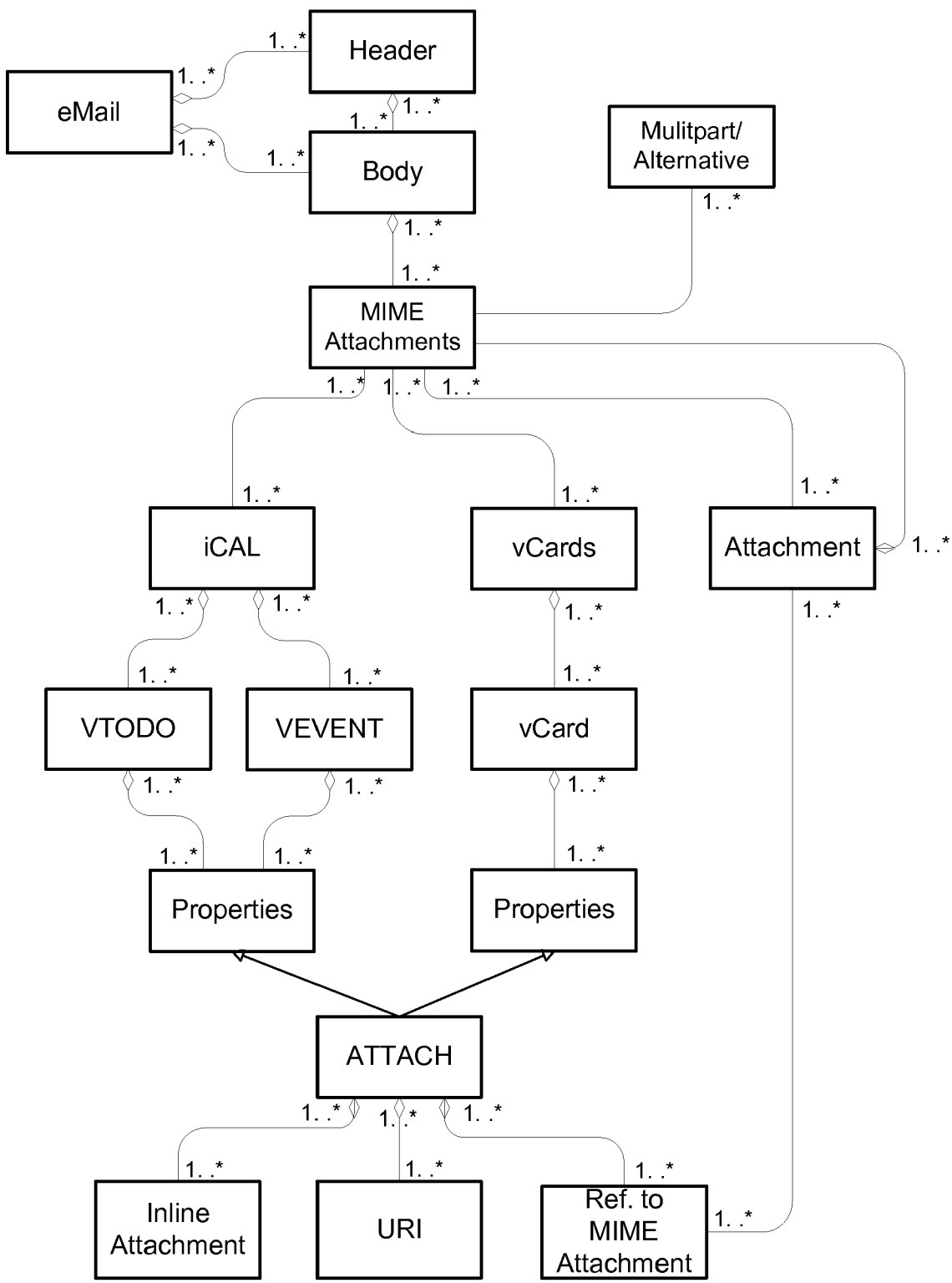
FIG. 5 is a diagram of an electronic mail attachment structure.
Figure 6:
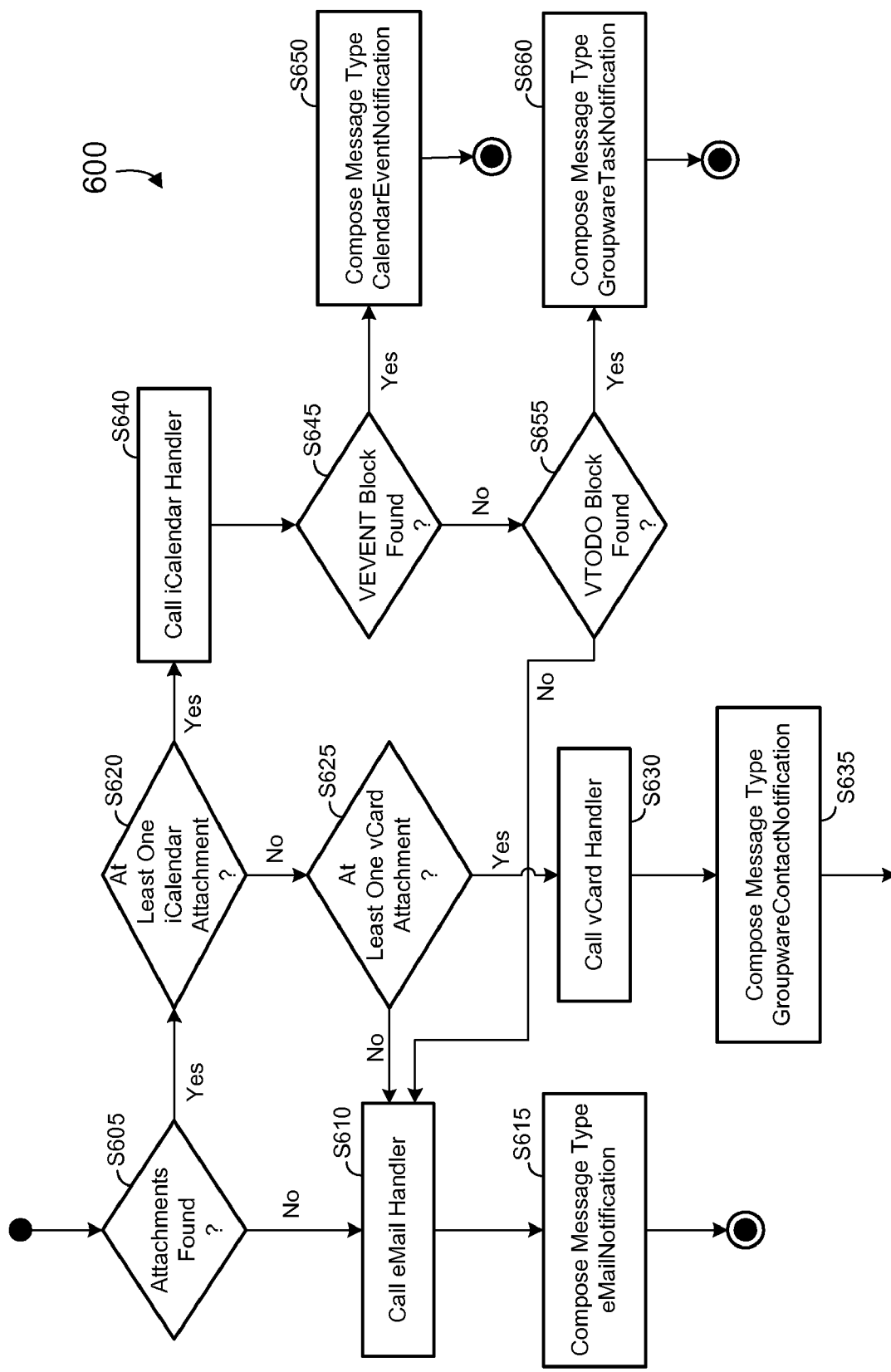
FIG. 6 is a flow diagram of a process to parse groupware objects according to some embodiments.

Current groupware object standards allow for an attachment structure as depicted in FIG. 5. FIG. 6, in turn, illustrates process 600 that may be used to execute S408 through S420 according to some embodiments and in view of the FIG. 5 structure. Process 600 may be performed by groupware message mapper 355 in some embodiments.

Initially, it is determined whether the SOAP message received from mail adapter 340 includes any attachments. If not, the groupware object of interest is an internet electronic mail message and electronic mail handler 356 is called at S610. Handler 356 returns an XML fragment based on the header structure and body located in the main payload of the SOAP message, and a SOAP/XML message is composed at S615 in compliance with a generic groupware Web service message interface. The message is associated with the type eMailNotification according to some embodiments.

Flow proceeds from S605 to S620 if the SOAP message received from mail adapter 340 includes any attachments. At S620, it is determined whether the message includes at least one iCalendar attachment. If not, it is determined at S625 whether the message includes at least one vCard attachment. Flow proceeds to S610 and continues as described above if it is determined at S625 that the message does not include at least one vCard attachment.

vCard handler 358 is called at S630 if the message includes at least one vCard attachment. Handler 358 executes its methods to return an XML fragment based on the vCard attachment. Next, at S635, a SOAP/XML message is composed in compliance with the generic groupware Web service message interface. The message may be associated with the type GroupwareContactNotification.

Flow proceeds to S640 to call iCalendar handler 357 if the determination at S620 is affirmative. is called at S630 if the message includes at least one vCard attachment. The methods of iCalendar handler 357 return an XML fragment based on the iCalendar attachment of the SOAP message. Next, at S645, it is determined whether the iCalendar attachment is associated with a VEVENT block as depicted in FIG. 5. If so, a SOAP/XML message of the type CalendarEventNotification is composed at S650 in compliance with the generic groupware Web service message interface.

If the iCalendar attachment is not associated with a VEVENT block, it is determined at S655 whether the iCalendar attachment is associated with a VTODO block as depicted in FIG. 5. If the iCalendar attachment is associated with a VTODO block, a SOAP/XML message in compliance with the generic groupware Web service message interface is composed at S650. The SOAP/XML message is associated with the type GroupwareTaskNotification. If it is determined at S655 that the iCalendar attachment is not associated with a VTODO block, flow proceeds to S610 and continues as described above to compose a SOAP/XML message in compliance with the generic groupware Web service message interface and of the type eMailNotification.

Returning to process 400, the Web service message may be routed by integration server 360 according to a pre-defined configuration. The Web service message may be mapped to an application-specific Web service message interface at S424. For example, the electronic mail address track.activity@company.com may be associated with the generic groupware Web service described above. Electronic mail messages sent to this address should be processed by the generic groupware Web service. Since adapter module 350 outputs a message that already complies with the message interface of the generic groupware Web service, no mapping of the message is required.

On the other hand, the electronic mail address update.contact@company.com may be associated with an application-specific groupware Web service and therefore an electronic mail message sent to this address should be processed by the application-specific groupware Web service. However, adapter module 350 will output a message based on the electronic mail message that complies with the message interface of the generic groupware Web service. Accordingly, the message that is output by adapter module 350 should be mapped at S424 to the message interface of the application-specific groupware Web service based on pre-defined mappings.

The channel/interface of the message may be determined by integration server 360 at S426. The channel/interface may be determined based on the Web service with which the message is associated, and may further depend upon the message type. In this regard, the channel/interface may determine the inbound process agent that is to receive the message. The inbound process agent associated with the determined channel/interface receives the message at S428.

Mail adapter 340 may comprise a standard mail adapter provided by SAP XI®. According to some embodiments, the above-described functionality of mail adapter 340 and groupware adapter module 350 is combined into a single groupware adapter. Such a single adapter may provide mail-related functionality in addition to that described above.

For example, polling of mail server 320 may result in the reception of electronic mail messages from different users by a single thread. According to some embodiments, additional mail-related functionality may ensure that each electronic mail message is handled by a single thread/transaction on a per user/message basis.

Figure 7:
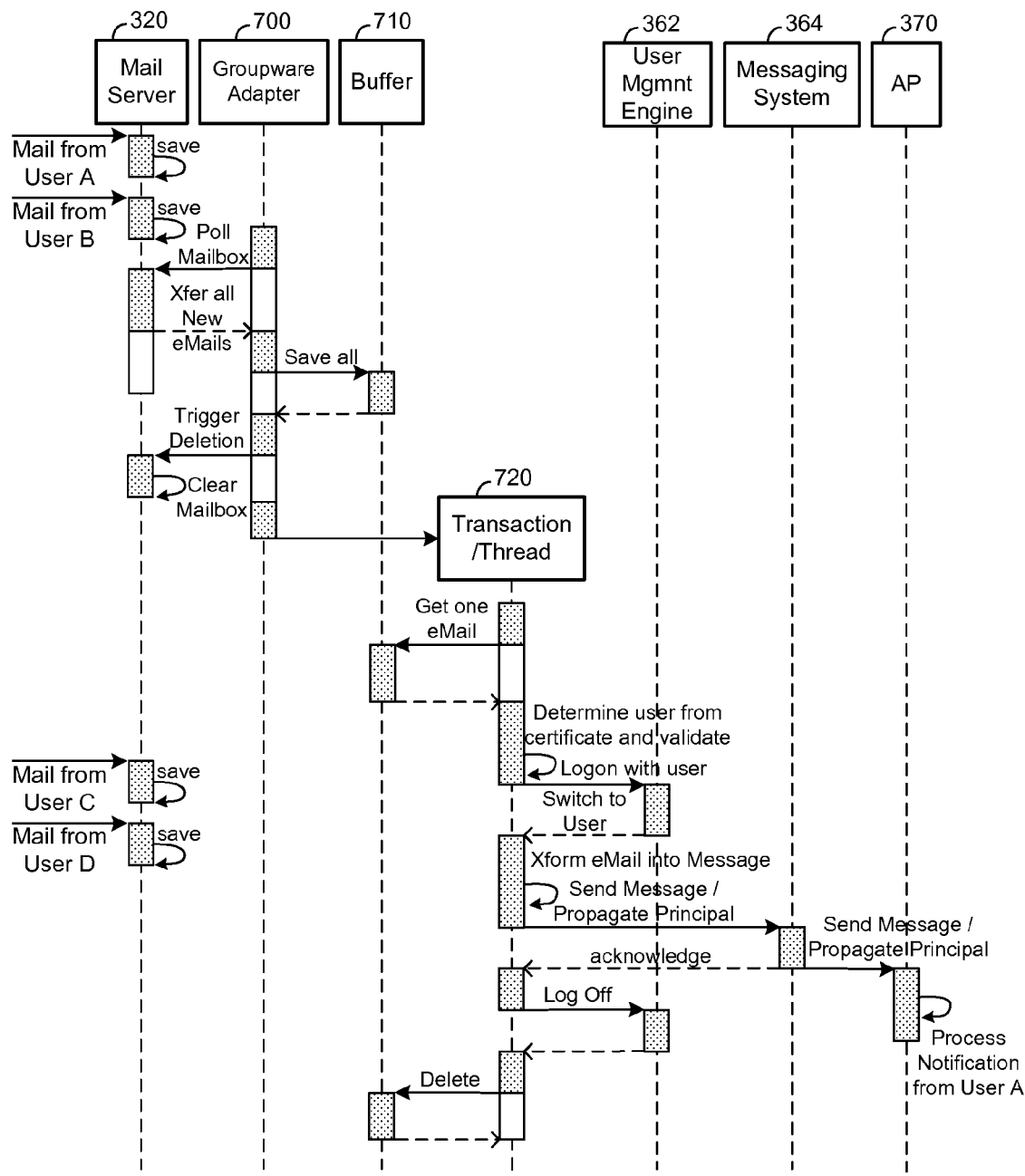
FIG. 7 is a diagram illustrating incoming mail handling according to some embodiments.

FIG. 7 illustrates the above-described additional functionality according to some embodiments. As shown, mail server 320 initially receives and saves an electronic mail message from User A and an electronic mail message from User B. The two electronic mail messages are therefore each associated with a recipient email address domain corresponding to mail server 320. It will be assumed that both electronic mail messages are associated with a same recipient mail address, which in turn is associated with a Web service. Accordingly, both electronic mail messages are stored in a same mailbox of mail server 320.

Groupware adapter 700 according to some embodiments may perform all of the functions attributed above to mail adapter 340 and groupware adapter module 350. Groupware adapter 700 polls the mailbox of mail server 320, and in response receives all new electronic mail messages stored in the mailbox. Groupware adapter 700 saves the received electronic mail messages in buffer 710, which may be a component of adapter framework 330 or accessible thereby.

Upon confirmation of the saved electronic mail messages, groupware adapter 700 triggers a deletion of the received electronic mail messages from the mailbox of mail server 320. Transaction/thread 720 is started after the deletion.

Transaction/thread 720 obtains one electronic mail message from buffer 710, determines a user based on a certificate of the message, and validates the certificate. Transaction/thread 720 then logs on to user management engine 362 of an infrastructure such as SAP XI®, causing user management engine 362 to switch to the user. Next, transaction/thread 720 converts the internet electronic mail message to a Web service message in any of the manners described herein.

The message is sent to messaging system 364 of the infrastructure, along with principal data used for authentication. Messaging system 364 passes the message and the principal data to application platform 370. The principal data may be used to provide the user with access to services of application platform 370. The principal data may comprise any data based on which application platform 370 may perform an authentication action. Non-exhaustive examples of principal data include a username/password (e.g., basic mode or digest mode), a signature and associated X.509 certificate, and a signed assertion (e.g., an SAP® logon ticket, a Security Assertion Markup Language assertion).

Application platform 370 authenticates the user and processes the message using the Web service with which the message complies. In the meantime, transaction/thread 720 logs the user off of user management engine 362 and deletes the subject electronic mail message from buffer 710.

Figure 8:
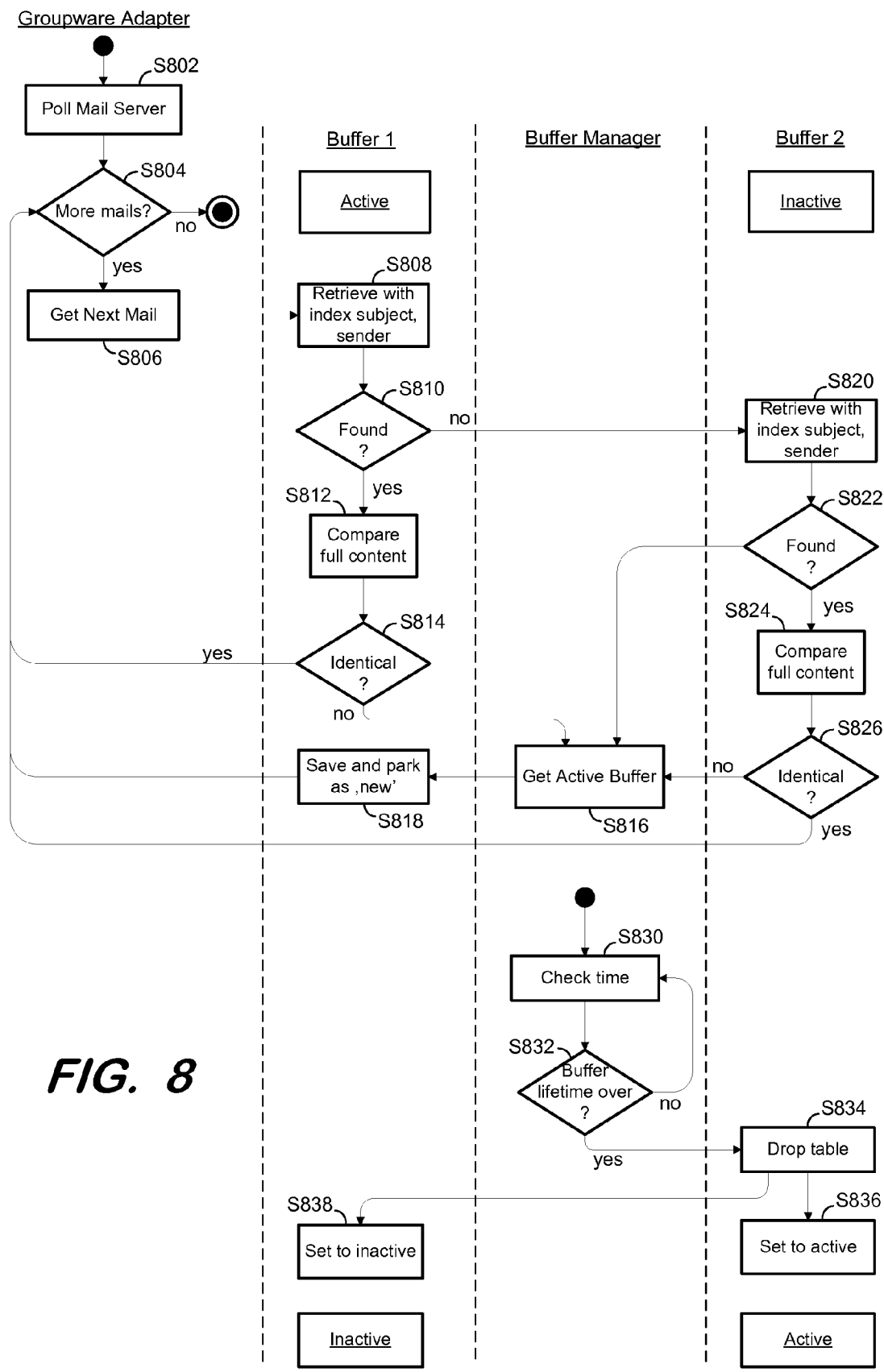
FIG. 8 is a flow diagram illustrating duplicate checking/handling according to some embodiments.

FIG. 8 illustrates still additional functionality provided by a groupware adapter according to some embodiments. Specifically, FIG. 8 illustrates a process to detect and discard duplicate electronic mail messages. Such a process may improve overall throughput and conserve resources.

The groupware adapter polls mail server 320 at S802, and receives a next electronic mail message from mail server 320 at S806 if it is determined at S804 that mail server 320 stores any unreceived messages. Buffer 1 may comprise a database table of previously-received electronic mail messages with an index on subject and sender. A retrieve is attempted on buffer 1 at S808 using the subject and sender of the mail message received at S806. If the retrieve is determined to be successful at S810, the full content of the received mail message is compared with the electronic mail messages retrieved from buffer 1 at S808.

Flow then proceeds from S814 to S816 if it is determined that the received electronic mail message is not identical to any of the electronic mail messages retrieved from buffer 1. A buffer manager determines the active buffer at S816 and saves the received electronic mail message in the active buffer and flags it as "new" at S818. For the present example, it will be assumed that buffer 1 is the active buffer initially. Flow returns to S804 from S818 and continues as described above. Flow returns to S804 directly from S814 (i.e., without storing the electronic mail message) if it is determined that the received electronic mail message is identical to any of the electronic mail messages retrieved from buffer 1.

If the retrieve is determined to be unsuccessful at S810, a second retrieve is attempted on buffer 2 at S820 using the subject and sender of the mail message received at S806. If the second retrieve is determined to be unsuccessful at S822, flow proceeds to S816 and continues to save the received electronic mail message in the active buffer (i.e., buffer 1) at S818.

The full content of the received mail message is compared with the electronic mail messages retrieved from buffer 2 at S824 if the second retrieve results in any electronic mail messages. Flow continues to S816 if it is determined that the received electronic mail message is not identical to any of the electronic mail messages retrieved from buffer 2. Conversely, flow returns directly to S804 (i.e., without storing the electronic mail message) if the received electronic mail message is identical to any of the electronic mail messages retrieved from buffer 2.

S830 et seq. determine the previous time period over which duplicate checking occurs. In this regards, flow cycles between S830 and S832 until a buffer lifetime (e.g., one week) has expired. Once the lifetime has expired, the entire table of the inactive buffer is deleted at S834. The inactive table is then set to active at S836 and the active table is set to inactive at S838. Accordingly, a buffer lifetime of one week allows incoming electronic mail messages to be checked against the previous two weeks of electronic mail messages.

A groupware adapter according to some embodiments may pass the full content of all electronic mail headers to an integration server/application platform. Conventional implementations of a mail adapter may lack this functionality.

Figure 9:
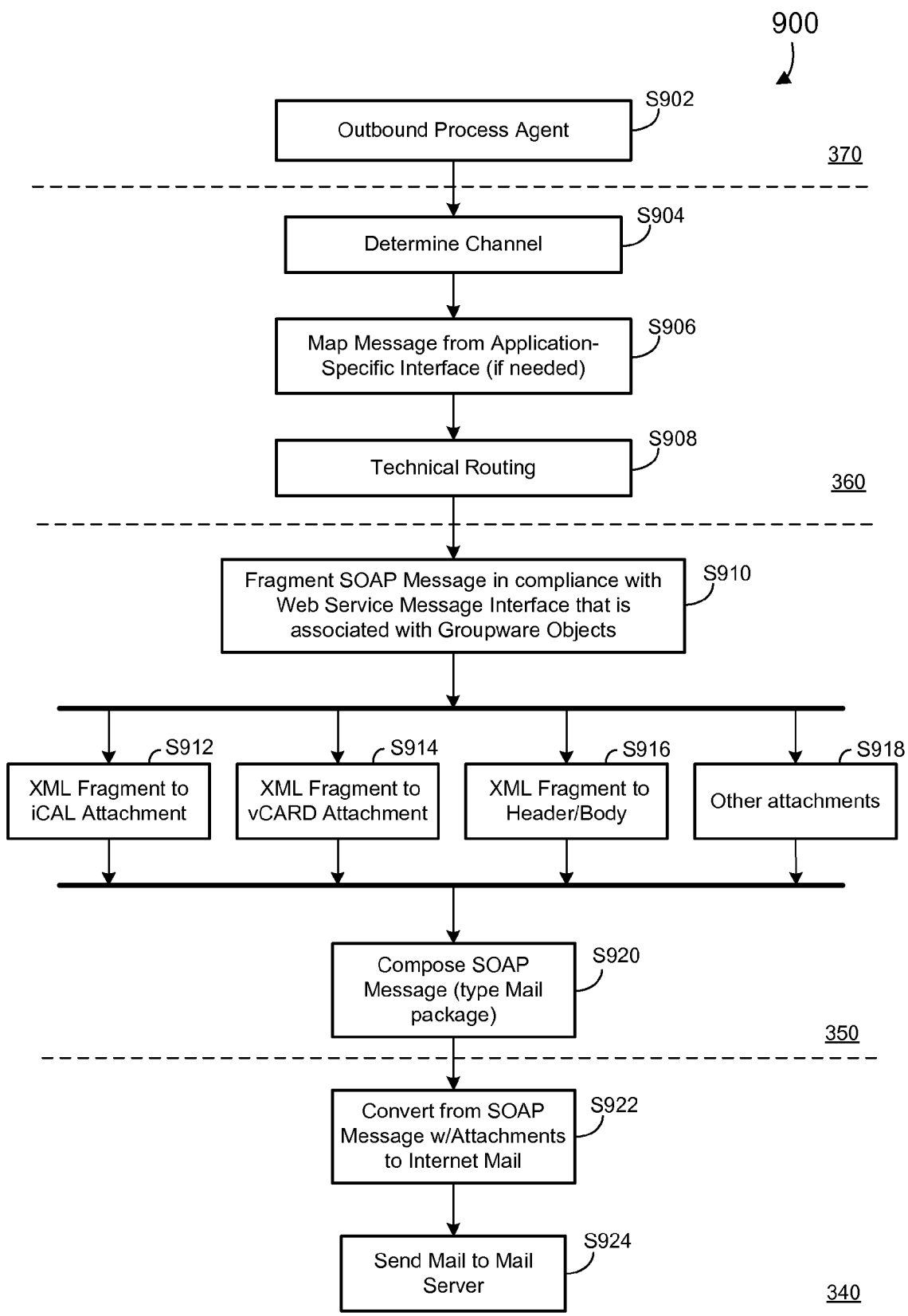
FIG. 9 is a flow diagram of a process to send an electronic mail message according to some embodiments.

FIG. 9 is a diagram illustrating the sending of a Web service message to a mail client from a business process platform according to some embodiments. The sub-processes of process 900 will be described with respect to the elements of system 300, but embodiments are not limited thereto.

Initially, outbound process agent 376 transmits a Web service message to integration server 360 at S902. The Web service message may be transmitted in response to a Web service message received by inbound process agent 372, or in response to another triggering event such as, but not limited to, an elapsed time, a current date and time, or a change to a data value. Various embodiments in which outbound process agent 376 transmits a Web service message are described below.

The transmitted Web service message may comply with any message interface described herein. The interface with which the message complies is determined at S908 by integration server 360. If the interface is an application-specific Web service message interface, the Web service message may be mapped at S906 to the generic groupware object message interface expected by groupware adapter module 350. The Web service message is then routed by integration server 360 at S908 according to a pre-defined configuration.

The Web service message comprises a SOAP XML message that complies with a generic groupware message interface and is associated with a groupware object. Groupware adapter module 350 receives the SOAP message at S910 and fragments the message at S910. For example, any attachments to the message that are not associated with groupware objects are first identified. Next, one of handlers 356-358 is invoked based on the type of the Web service message.

As mentioned above, a generic groupware message interface according to some embodiments may specify the following message types: eMailNotification; CalendarEventNotification; GroupwareContactNotification; and GroupwareTaskNotification. Accordingly, electronic mail handler 356 is invoked if the message is of type eMailNotification, iCalendar handler 357 is invoked if the message is of type CalendarEventNotification or GroupwareTaskNotification, and vCard handler 358 is invoked if the message is of type GroupwareContactNotification.

Each of handlers 356-358 includes methods to convert an XML fragment of the received SOAP message to an internal representation and to convert the internal representation to a string corresponding to an attachment type. Such a conversion is performed at S912, S914 or S916 depending on the determined message type. In this regard, the iCalendar and vCard standards may require fields that are not provided by outbound process agent 376. These fields may be generated at S912 or S914, respectively. S912 and S914 may also include creation of an internal MIME structure if nested attachments are required because mail adapter 340 may create the attachment headers only for the highest node level.

An intermediate SOAP message such as described above is composed at S920. Composition may comprise attaching the attachments produced by handlers 356-358 to a SOAP message in which the main payload represents a header structure and body of a mail message and the attachments represent the MIME attachments. The SOAP message also includes a recipient electronic mail address that may be determined from fields of an iCalendar attachment or from fields of a corresponding inbound message.

According to some embodiments, S920 may also include additional operations to support various additions to a generic electronic mail message including a standards-based groupware object. Examples of such additional operations include URL generation for navigation from the groupware object into application platform 370 or for additional Web service calls, generation of voting button support, and attachment of text templates (e.g., iForms).

Mail adapter 340 converts the SOAP message with attachments to an internet electronic mail message at S922. The main payload of the SOAP message is mapped to the header and body of the internet electronic mail message, and composition module 348 converts the attachments into representations based on RFC 2045 and/or RFC 2046 according to some embodiments. The latter operation may include the handling of digital signatures.

The electronic mail message is converted from internet message format RFC 2822 to the wire format at S924. Module 344 performs the conversion and sends the electronic mail message to mail server 320 via SMTP. Mail server 320 then routes the electronic mail message to a mail server associated with a recipient electronic mail address of the electronic mail message.

Some embodiments of the foregoing features may provide a powerful and efficient system for integrating groupware clients with a business process platform. More specifically, the ability to interact with groupware-related Web services via electronic mail addresses presents unlimited possibilities for increased user productivity. Usage scenarios according to some embodiments and demonstrating such increased productivity will be described below.

Activity Tracking: Electronic mail

As described in the present Background, it may be desirable to centrally track electronic mail messages within a business process platform. Some embodiments provide an efficient system for such tracking.

Figure 10:
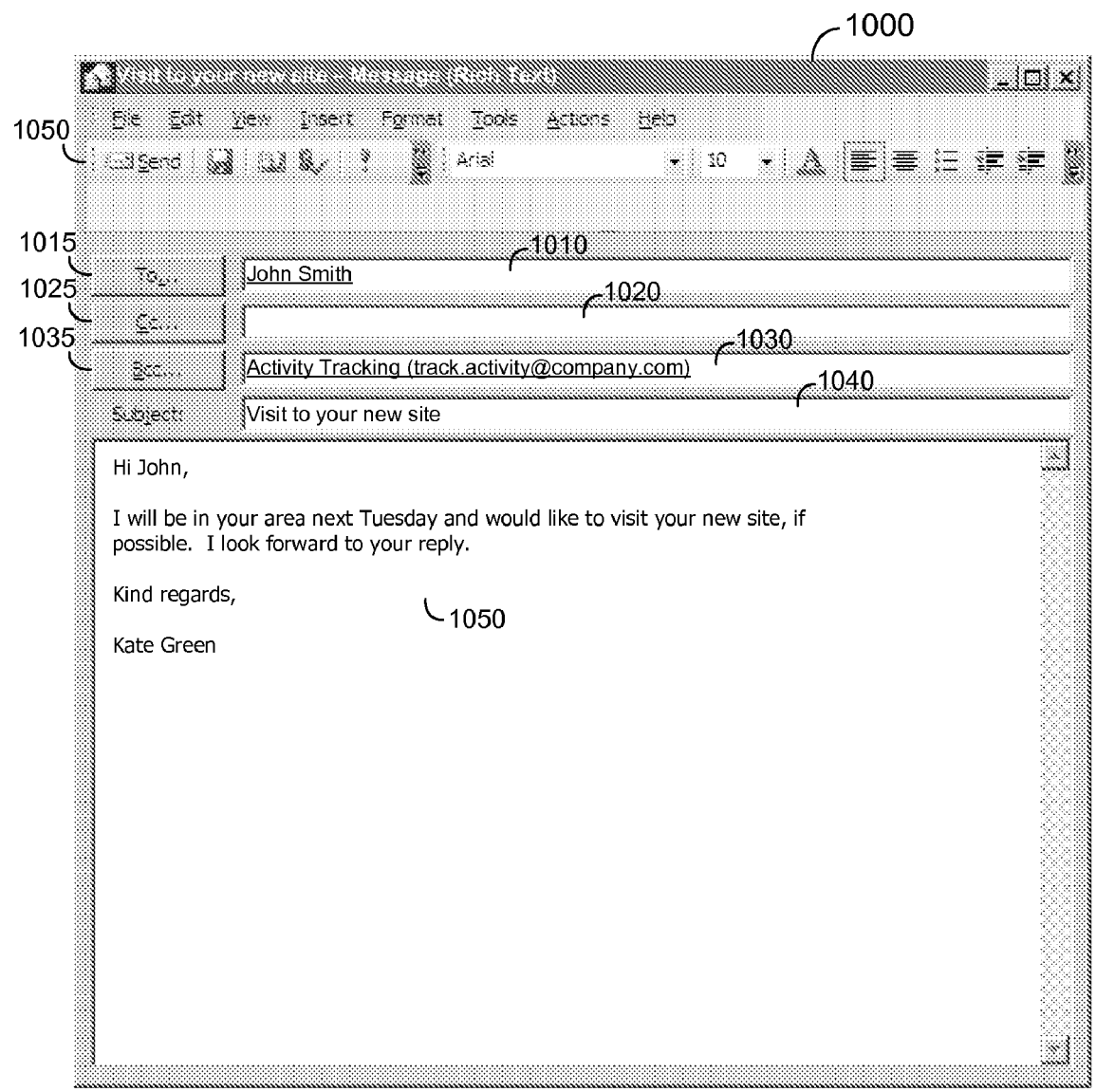
FIG. 10 is a view of a groupware client user interface for creating and sending an electronic mail message according to some embodiments.

FIG. 10 presents user interface 1000 of a groupware mail client. User interface 1000 may be manipulated by a user to create an internet electronic mail message and to send the internet electronic mail message to one or more recipient electronic mail addresses. Embodiments are not limited to the particular appearance, arrangement and function of user interface 1000.

User interface 1000 includes fields 1010, 1020 and 1030 for inputting one or more recipient electronic mail addresses, subject 1040, and body 1050. The recipient electronic mail addresses may be entered into fields 1010, 1020 and 1030 manually or inserted from a contacts list of the groupware mail client that may be accessed through respective buttons 1015, 1025 and 1035. If an input recipient electronic mail address corresponds to a contact from the contact list, the groupware mail client may display the name of the contact instead of the electronic mail address.

The user has input the electronic mail address of an intended recipient in field 1010. The user has also input track.activity@company.com into recipient electronic mail address field 1030. In the present example, the electronic mail address track.activity@company.com is associated with a groupware object-tracking Web service provided by a CRM system or other business process platform to which the user has access. By inputting track.activity@company.com into recipient electronic mail address field 1030, the user indicates an intention to track the created electronic mail message in the platform. Upon user selection of Send button 1050, the electronic mail message is sent to the intended recipient and to the platform using standard protocols.

Figure 11:
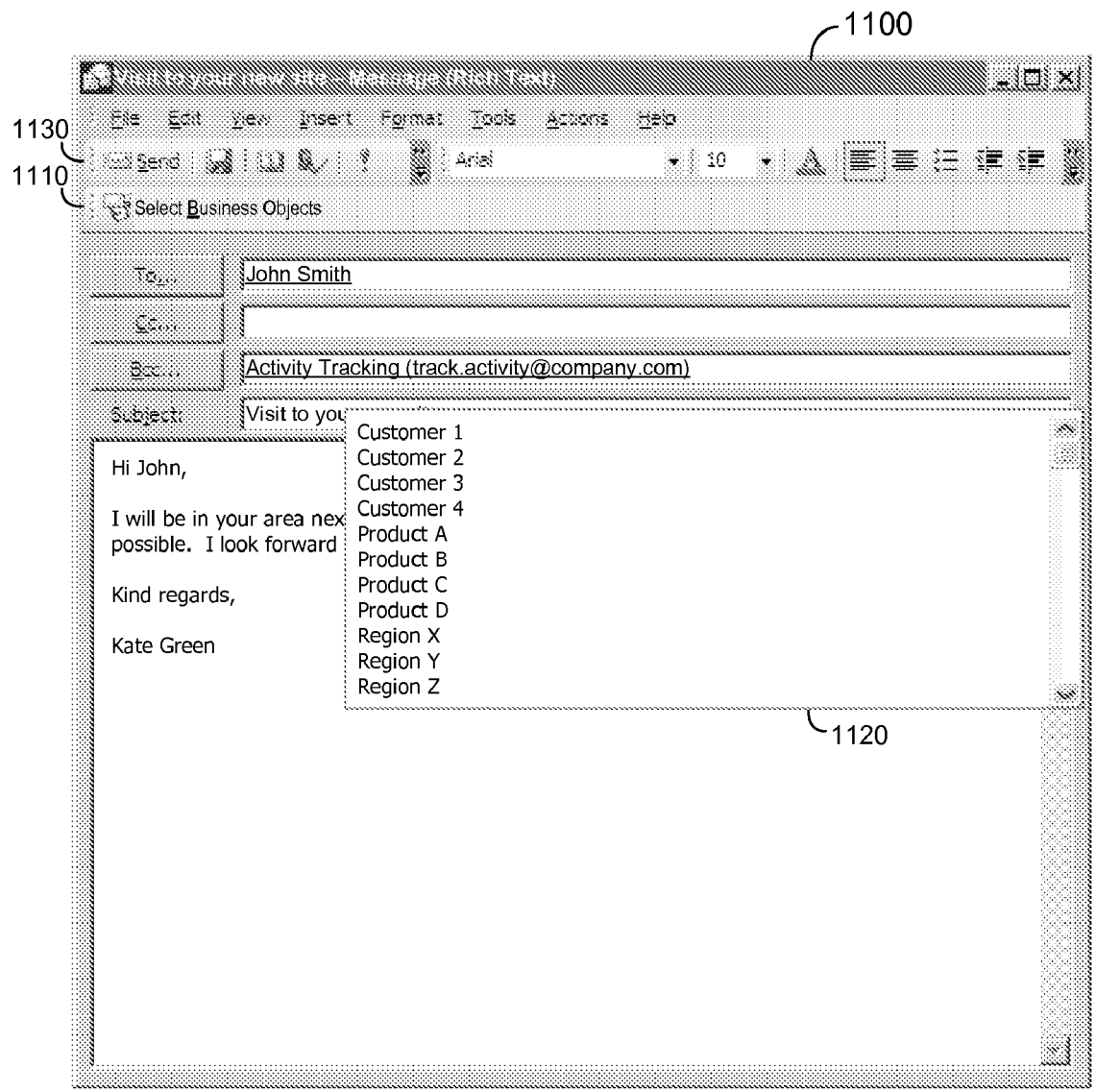
FIG. 11 is a view of a groupware client user interface for creating and sending an electronic mail message according to some embodiments.

FIG. 11 shows user interface 1100 which differs slightly from user interface 1000 of FIG. 10. Specifically, user interface 1100 includes Select Business Objects button 1110. Selection of button 1110 causes display of window 1120 including a list of business objects. Button 1110 is generated by a usability plug-in that extends the standard functionality of the groupware mail client. Button 1110 may initiate a process allowing the mail client to communicate directly with an inbound process agent of an application platform as shown in FIG. 3. The communication may comprise a request for and a reception of the list of business objects shown in window 1120.

The user may select one or more business objects from window 1120. Accordingly, upon selection of Send button 1130, the message is sent to the intended recipient and to the business process platform. The message will include an indication of the selected business objects, within custom fields supported by electronic mail standards and/or within other fields. The indication may be used by the groupware-tracking Web service to categorize and track the electronic mail message.

Figure 12:
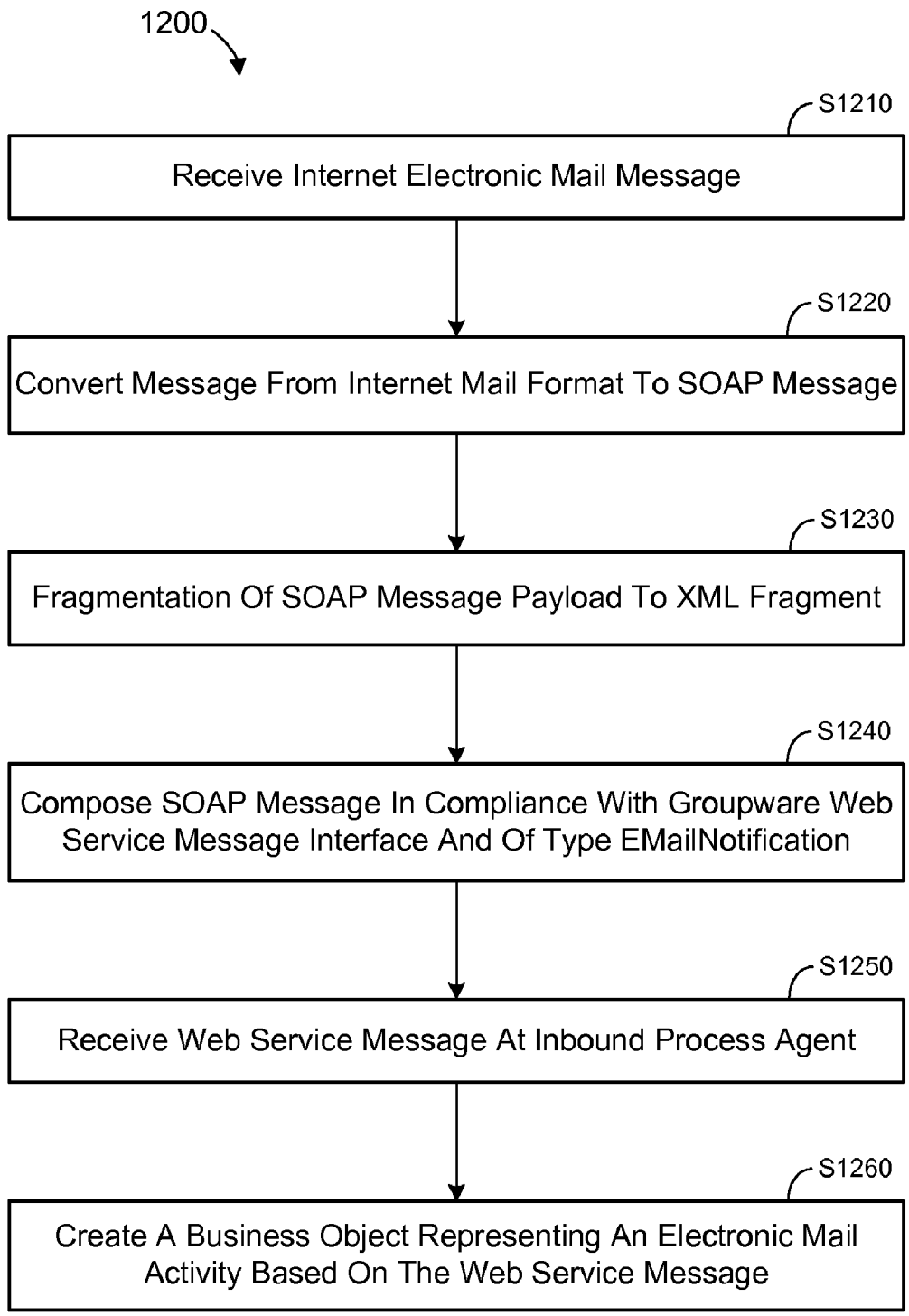
FIG. 12 is a flow diagram of a process to track an electronic mail message according to some embodiments.

FIG. 12 is a flow diagram of process 1200 according to some embodiments. Process 1200 may be performed by the entity providing a Web service for tracking electronic mail messages within a business process platform. Process 1200 may be implemented by elements other than those described in the following example.

An internet electronic mail message is initially received at S1210. According to some examples, the internet electronic mail message is received from a mailbox storing all electronic mail messages directed to track.activity@company.com. In some embodiments, mail protocol conversion module 342 of system 300 receives the electronic mail message and converts the electronic mail message from the wire format to internet message format RFC 2822 at S1210.

The electronic mail message is converted from the internet electronic mail message format to a SOAP message at S1220. For example, decomposition module 347 may compose a SOAP message having a main payload comprising the header elements and body of the internet electronic mail message. No SOAP attachment is created at S1220 because the received internet electronic mail message does not include any attachments in the present example.

The SOAP message is fragmented at S1230. Based on process 600 of FIG. 6, electronic mail handler 356 may be invoked at S1230 to import an electronic mail string of the SOAP message payload to an internal representation, and to export the internal representation to an XML fragment. The XML fragment is used at S1240 to compose an XML (SOAP) message compliant with a generic groupware Web service message interface. According to some embodiments, the message is of type eMailNotification.

The Web service message is received at an inbound process agent implementing a generic groupware Web service at S1250. According to the present example, the electronic mail address track.activity@company.com is associated with the generic groupware Web service. Since the received electronic mail message was sent to this address and the Web service message already complies with the message interface of the generic groupware Web service, no interface mapping of the Web service message is required prior to S1250.

The inbound process agent creates a business object representing an electronic mail activity based on the Web service message at S1260. A sender electronic mail address associated with the message is used to identify the user for tracking and for verifying privileges. A digital certificate associated with the message may be used to authenticate the user as well.

In a case that the electronic mail message received at S1210 was associated with one or more business objects as described with respect to FIG. 11, the business object created at S1260 may be associated with these one or more business objects. S1260 is intended to track the received electronic mail message in the business process platform, therefore any method for doing so that is or becomes known may be performed at S1260.

According to some embodiments, the electronic mail message received at S1210 may have been forwarded to the track.activity@company.com electronic mail address using the forwarding functionality of a standard groupware mail client. The forwarded electronic mail message may comprise an electronic mail message that was received by a user and that the user would like to track in a CRM system or other business process platform.

Figure 13:
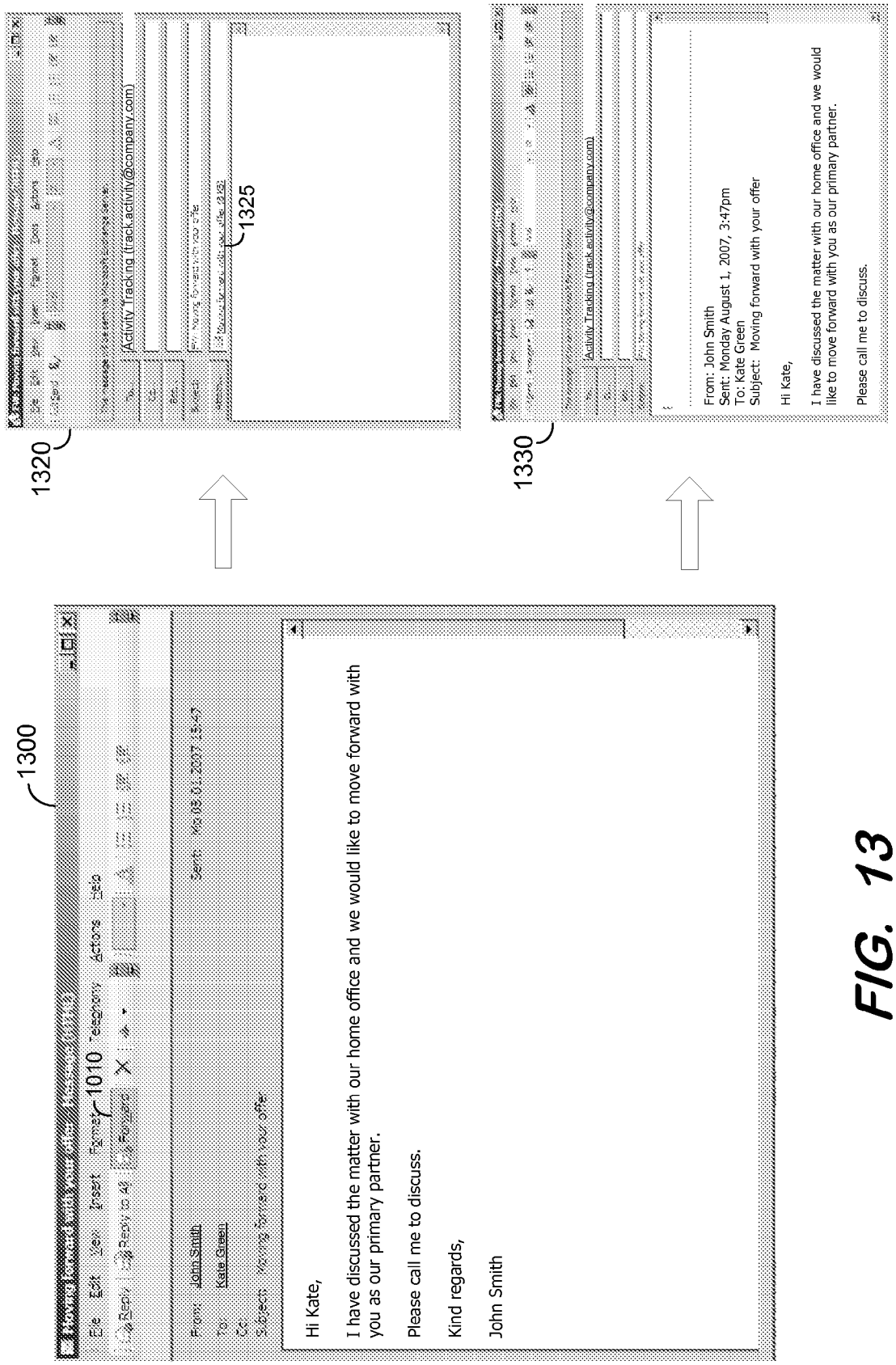
FIG. 13 depicts views of groupware client user interfaces for forwarding an electronic mail message according to some embodiments.

FIG. 13 illustrates two methods that may be employed by a groupware client to forward a received electronic mail message. User interface 1300 displays a received electronic mail message. A user may select Forward button 1310 to launch a second user interface for forwarding the electronic mail message to an electronic mail address.

User interface 1320 illustrates the second user interface according to one method. User interface 1320 is similar to user interface 1000 of FIG. 10 but includes attachment 1325 including the electronic mail message shown in user interface 1300. The address track.activity@company.com has been input as a recipient mail address because the user wishes to track the original electronic mail message in the business platform.

User interface 1330 illustrates the second user interface according to a second method. The electronic mail message to be forwarded is shown in the body of the message of user interface 1330. Again, the address track.activity@company.com has been input as a recipient mail address because the user wishes to track the original electronic mail message in the business platform.

The electronic mail messages of user interfaces 1320 and 1330 may be sent and tracked as described with respect to process 1200. However, additional processing may be required to determine the sender of the original electronic mail message so that the message may be properly tracked (e.g., associated with an appropriate business partner). For the message of user interface 1320, the attachment may be parsed into an XML fragment including header information at S1230 and the sender may be determined therefrom at S1260. In the case of the message of user interface 1330, an inbound process agent may parse the message body at S1260 to determine the original sender.

According to some embodiments, electronic mail messages sent from a CRM system or other platform may be sent to a groupware client for synchronization. Process 900 provides some details of such a process in some embodiments. For example, an outbound process agent may expose the electronic mail messages via Web service messages. The Web service messages may then be converted to outgoing internet mail messages for receipt by the groupware client of the sender or another groupware client. Other examples of transmitting a groupware object from a business process platform to a groupware client are provided below.

Activity Tracking: Task

Figure 14:
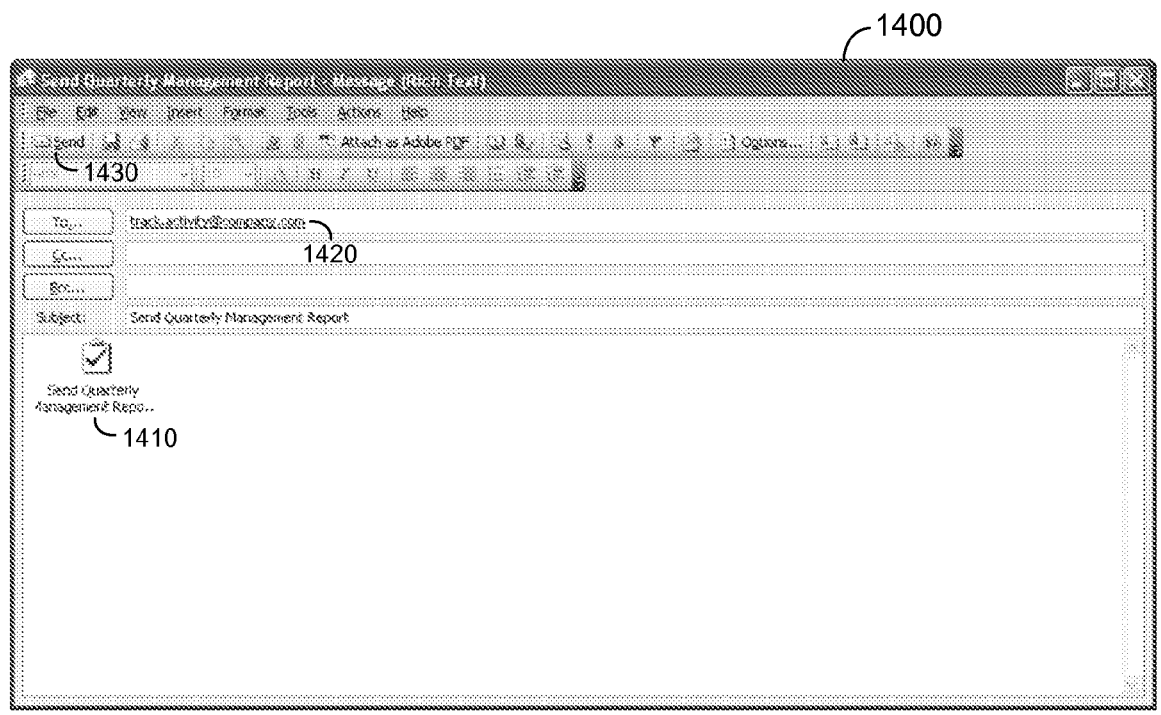
FIG. 14 is a view of a groupware client user interface for creating a task according to some embodiments.
Figure 15:
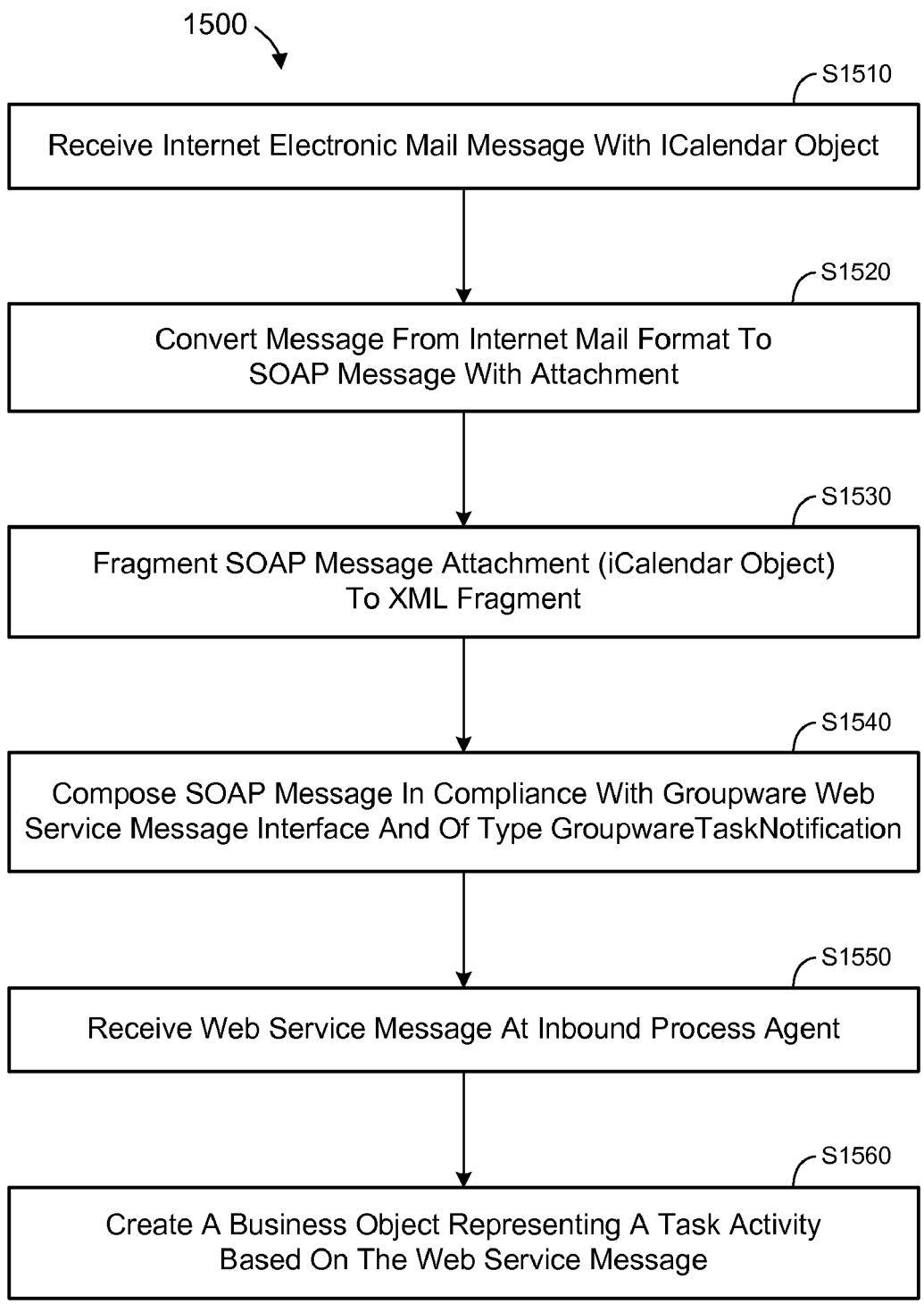
FIG. 15 is a flow diagram of a process to track a task according to some embodiments.

FIGS. 14 and 15 will be used to describe tracking of groupware tasks within a business process platform using a groupware client. FIG. 14 presents user interface 1400 of a groupware mail client. User interface 1400 shows an electronic mail message including attachment 1410. Attachment 1410 represents a groupware task and, according to current standards, is an iCalendar object in compliance with RFC 2445.

The electronic mail address track.activity@company.com has been input into recipient electronic mail address field 1420. Again, the electronic mail address track.activity@company.com is assumed to be associated with a groupware object-tracking Web service provided by a CRM system or other business process platform to which the user has access. The user may select Send button 1430 to send the electronic mail message to the platform using standard protocols. User interface 1400 and any other user interface described herein may include features such as Select Business Objects button 1110 of user interface 1100 to associate one or more business objects with an electronic mail message and/or its attachments.

Process 1500 of FIG. 15 may be performed by a business process platform in response to an electronic mail message as depicted in FIG. 14. The internet electronic mail message including the iCalendar attachment is received at S1510 from a mailbox storing all electronic mail messages directed to track.activity@company.com. Mail protocol conversion module 342 of system 300 may receive the electronic mail message and convert the electronic mail message from the wire format to internet message format RFC 2822 at S1510.

The electronic mail message is converted from the internet electronic mail message format to a SOAP message with a SOAP attachment at S1520. For example, decomposition module 347 may resolve the body, the header elements, and a highest node level of the attachment tree. Decomposition module 347 then composes a SOAP message having a main payload comprising the header elements and body, and a SOAP attachment of the highest level nodes of the attachment tree.

The SOAP message is fragmented at S1530. Returning to process 600 of FIG. 6, it is noted that iCalendar handler 357 will be invoked at S1530 because the SOAP message includes an iCalendar attachment. iCalendar handler 357 imports an electronic mail string of the SOAP attachment to an internal representation, and exports the internal representation to an XML fragment.

The XML fragment is used at S1540 to compose an XML (SOAP) message compliant with a generic groupware Web service message interface. Since the attachment represents a task, a VTODO block is found at S655 of process 600 and the composed message is of type GroupwareTaskNotification.

The Web service message is received at an inbound process agent implementing a generic groupware Web service at S1550. Since the received electronic mail message was sent to the electronic mail address associated with the generic groupware Web service, and the Web service message complies with the message interface of the generic groupware Web service, no interface mapping of the Web service message is required prior to S1550.

The inbound process agent creates a business object representing a task activity based on the Web service message at S1560. As described above, a sender electronic mail address associated with the message may be used to identify the user for tracking and for verifying privileges. A digital certificate associated with the message may also be used to authenticate the user.

Activity Tracking: Appointment

Some embodiments provide for tracking of calendar events within a business process platform using a groupware mail client. Such calendar events may include work-related events, customer meetings scheduled by a user, meetings scheduled by a customer, and/or meetings scheduled by the business process platform.

Figure 16:
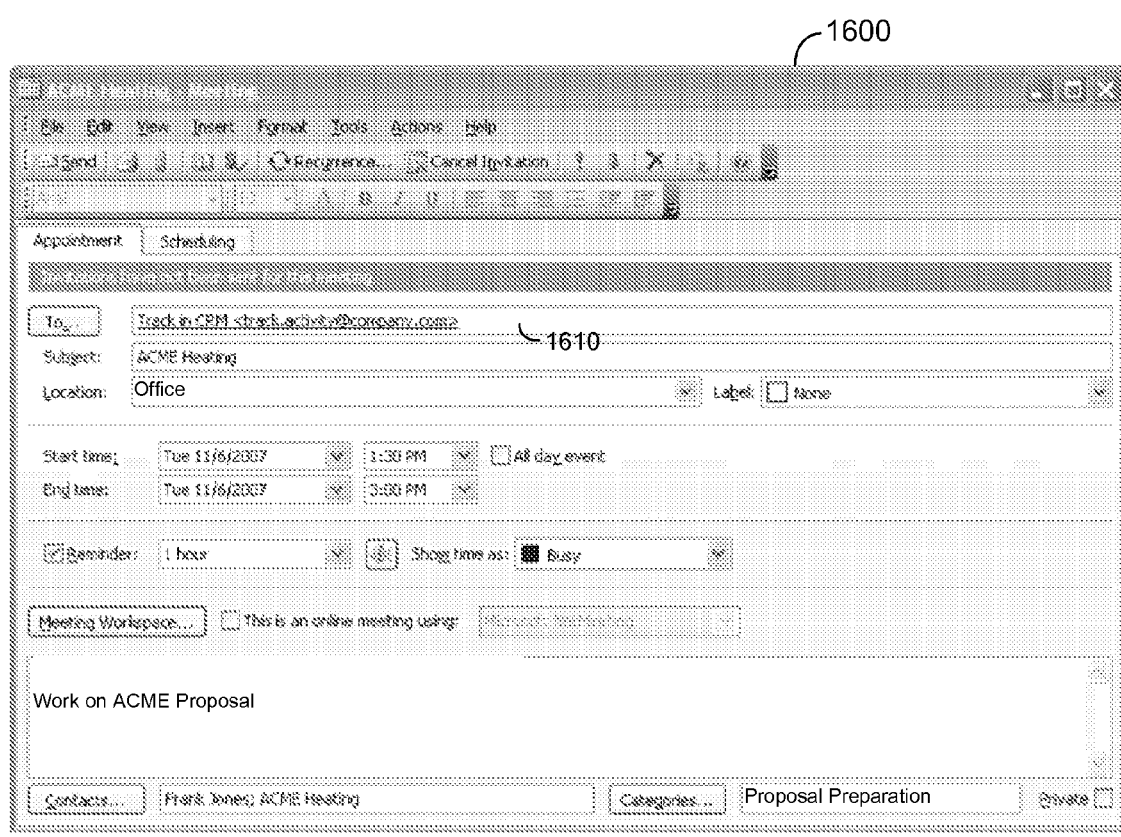
FIG. 16 is a view of a groupware client user interface for creating a calendar event according to some embodiments.

FIG. 16 presents user interface 1600 of a groupware mail client. A user may manipulate user interface 1600 to define fields of an iCalendar object representing a calendar event. In the illustrated example, a user has created an event associated with work done (or to be done) at a particular day and time. User interface 1600 also includes fields to specify a subject, a location, contacts and categories associated with the iCalendar object. Embodiments to define fields of an iCalendar object are not limited to the particular appearance, arrangement and function of user interface 1600.

The user has input the mail address track.activity@company.com into recipient electronic mail address field 1610. As in the prior examples, the electronic mail address track.activity@company.com is associated with a groupware object-tracking Web service provided by a CRM system or other business process platform to which the user has access. The user therefore would like to create and track an appointment activity associated with the iCalendar object in the platform.

The user may select Send button 1620 to send the electronic mail message and the iCalendar attachment to the platform using standard protocols. The electronic mail message and/or the iCalendar attachment may include indications of the contacts and categories associated with the iCalendar attachment. These indications may assist in creation of a corresponding business object in the platform.

Figure 17:
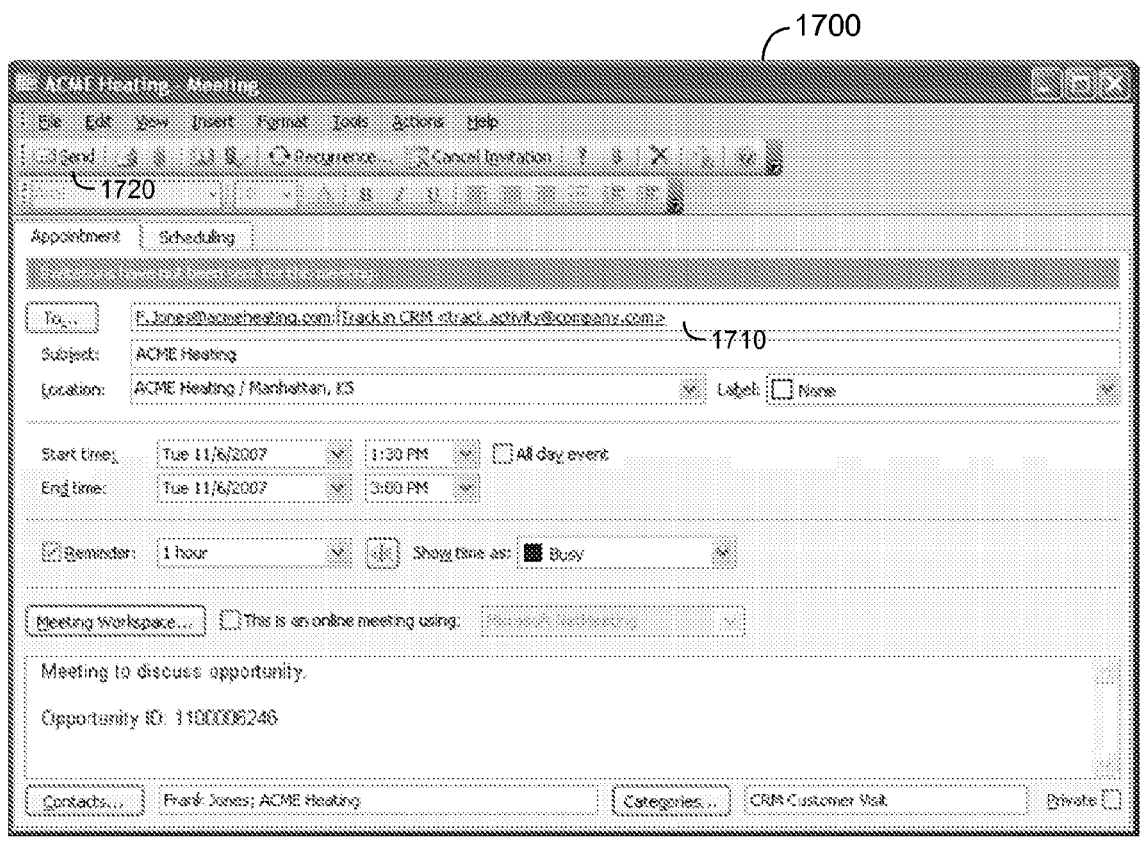
FIG. 17 is a view of a groupware client user interface for creating a calendar event according to some embodiments.

User interface 1700 of FIG. 17 is identical to user interface 1600 but is used to request a meeting as well as to submit a calendar event to the business process platform. In this regard, field 1710 includes an electronic mail address of a customer as well as mail address track.activity@company.com. Selection of Send button 1720 will cause the groupware client to send the electronic mail message including the iCalendar attachment to the platform using standard protocols.

User interface 1800 may be used to forward a received meeting request (i.e., iCalendar object) to a CRM system. As shown, a meeting request was received from "Frank Jones" and will be forwarded (as an iCalendar object attached to an electronic mail message) to mail address track.activity@company.com. User interface 1800 includes field 1810 for specifying additional identifying information that may be used by the CRM system to generate a related appointment activity.

Figure 18:
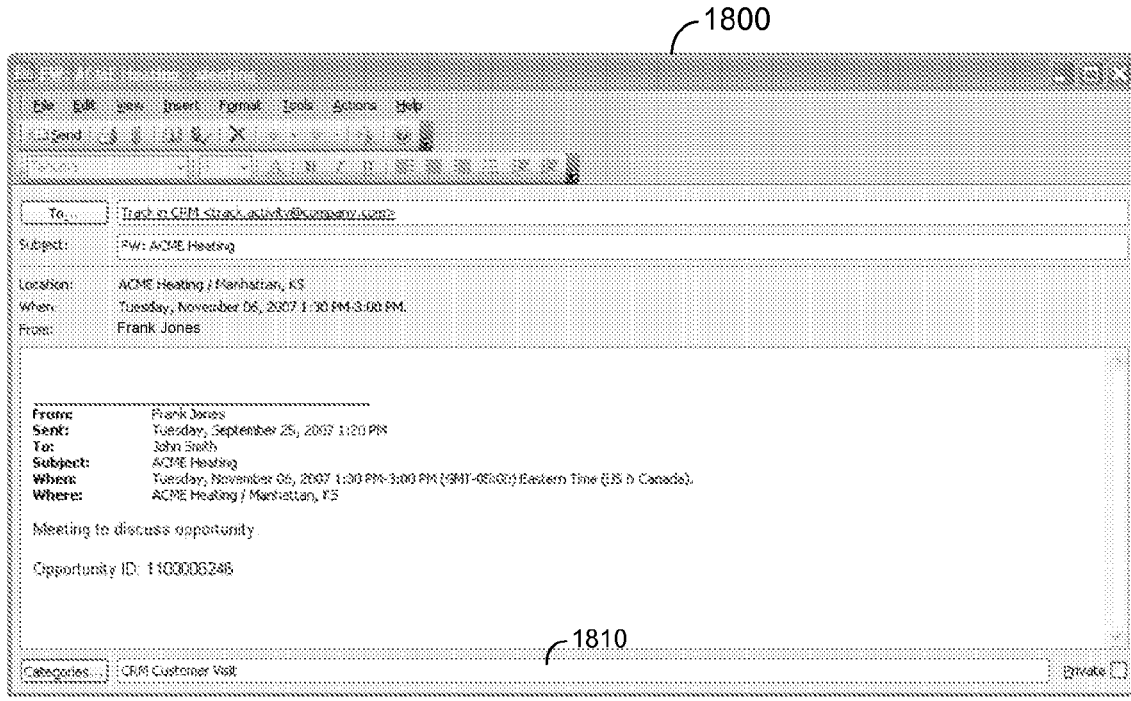
FIG. 18 is a view of a groupware client user interface for forwarding a calendar event according to some embodiments.
Figure 19:
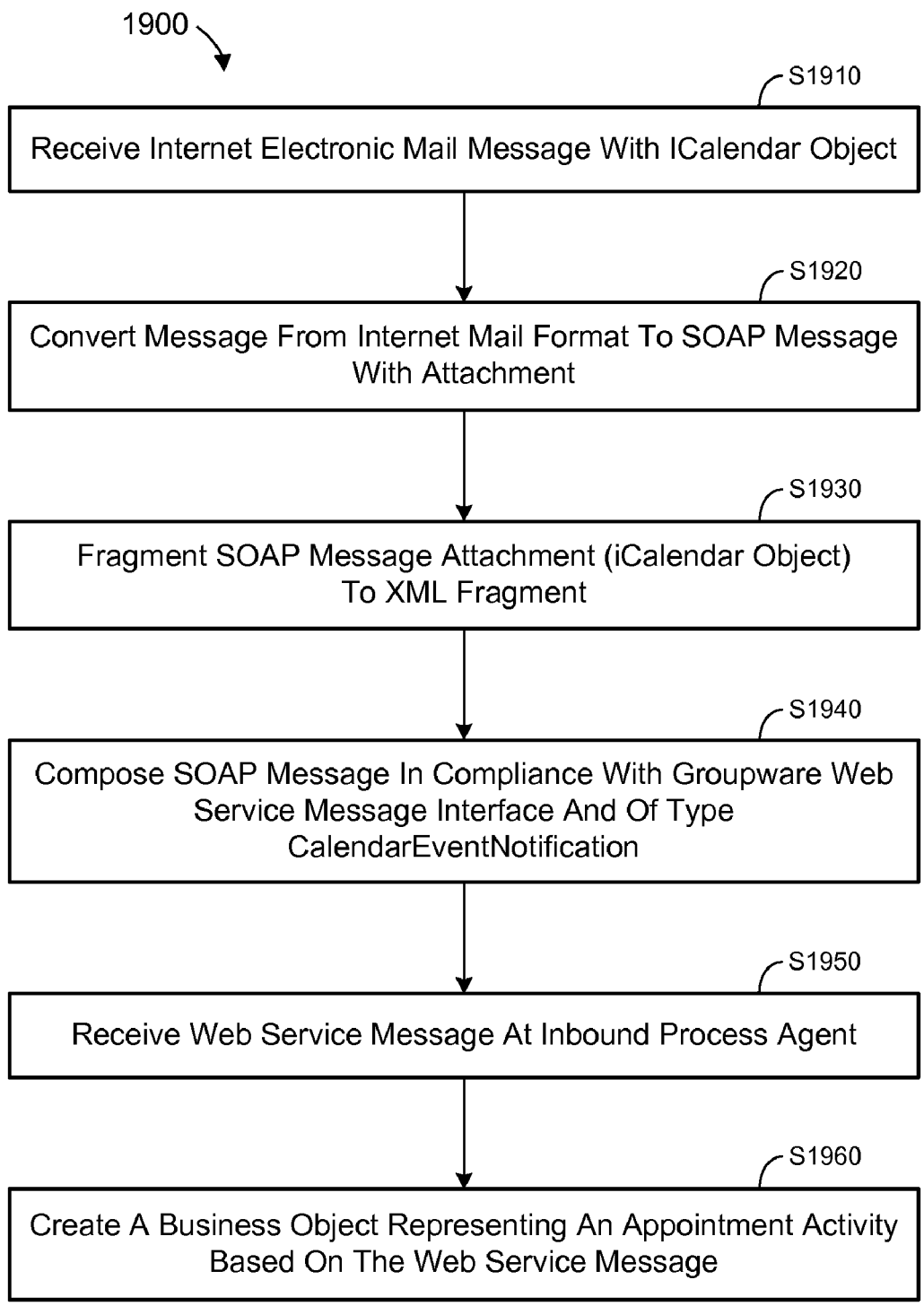
FIG. 19 is a flow diagram of a process to track a calendar event according to some embodiments.

FIG. 19 illustrates process 1900 which may be performed by a business process platform in response to transmission of the electronic mail messages depicted in FIGS. 16 through 18. Initially, at S1910, an internet electronic mail message including an attached iCalendar object is received. The message may be received from a mailbox storing all electronic mail messages directed to track.activity@company.com. The electronic mail message may also be converted from the wire format to the internet message format at S1910.

Next, at S1920, the electronic mail message is converted from the internet electronic mail message format to a SOAP message with a SOAP attachment. Conversion may include resolving the body of the electronic mail message, the header elements of the electronic mail message, and a highest node level of the attachment tree. A SOAP message is then composed to include a main payload comprising the body and the header elements, and a SOAP attachment of the highest level nodes of the attachment tree.

The SOAP attachment is fragmented to an XML fragment at S1930. With respect to process 600 of FIG. 6, iCalendar handler 357 may be invoked at S1930 because the SOAP attachment comprises an iCalendar attachment. iCalendar handler 357 therefore imports an electronic mail string of the SOAP attachment to an internal representation, and exports the internal representation to an XML fragment.

An XML (SOAP) message compliant with a generic groupware Web service message interface is composed at S1940 based on the XML fragment. The attachment includes a VEVENT block, therefore, in accordance with S650 of process 600, the composed message is of type CalendarEventNotification.

The Web service message is received at S1950 at an inbound process agent implementing the generic groupware Web service. Again, since the received electronic mail message was sent to the electronic mail address associated with the generic groupware Web service, and the Web service message complies with the message interface of the generic groupware Web service, no interface mapping of the Web service message is required prior to S1950.

The inbound process agent creates a business object at S1960 representing an appointment activity based on the Web service message. The business object may include or otherwise reference details of the associated calendar event specified in various fields of user interfaces 1600, 1700 or 1800. For example, in the case of user interface 1600, the business partner associated with the business object is determined from the Subject field of the electronic mail message. In the case of user interface 1700, an associated business partner is determined based on the recipient mail address of the electronic mail message. With respect to user interface 1800, the business partner is determined based on the meeting organizer specified by the iCalendar object.

Figure 20:
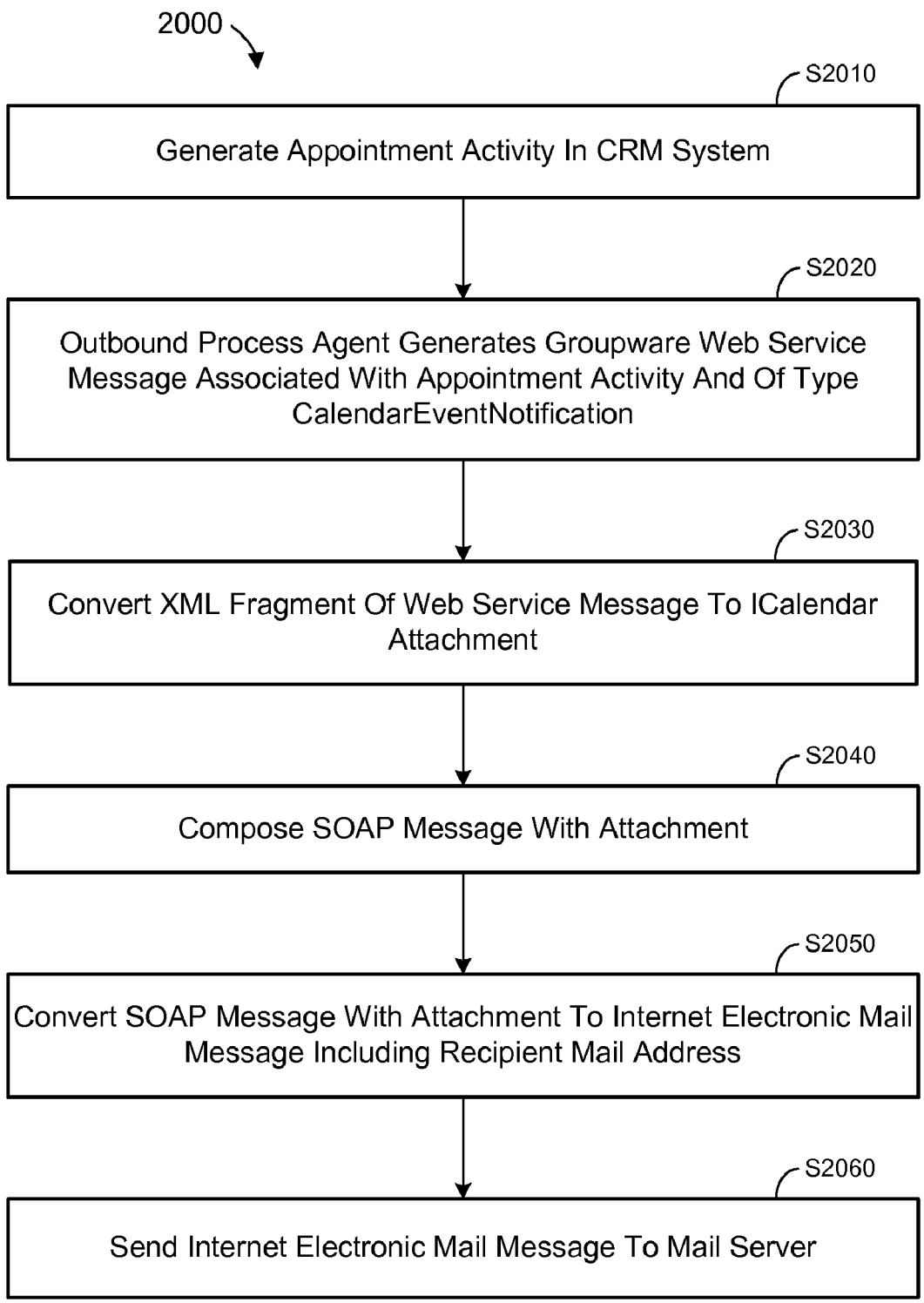
FIG. 20 is a flow diagram of a process to transmit an appointment activity according to some embodiments.

FIG. 20 illustrates process 2000 to transmit a groupware object (i.e., an iCalendar object) from a business process platform to a groupware client. Such a transmission may be useful to synchronize groupware-related business objects of the business process platform with a groupware client.

An appointment activity is generated in a CRM system at S2010. The appointment activity may be generated manually using user interface 380 of system 300 or may be automatically generated by platform 370 based on business rules and associated trigger events.

Generation of the appointment activity causes an outbound process agent to expose the appointment activity via a Web service message at S2020. The Web service message is associated with the appointment activity, complies with a generic groupware message interface, and is of message type CalendarEventNotification. Accordingly, iCalendar handler 357 is invoked at S2030 to convert an XML fragment of the received Web service message to an internal representation and to convert the internal representation to a string corresponding to an iCalendar attachment. Any fields required by the iCalendar standard that are not provided in the Web service message may also be generated at S2030.

An intermediate SOAP message is composed at S2040 by attaching the iCalendar attachment to a SOAP message in which the main payload represents a header structure and body of a mail message and the attachment is a SOAP attachment. The intermediate SOAP message also includes a recipient electronic mail address that may be determined from fields of the iCalendar attachment.

Mail adapter 340 may convert the SOAP message with attachments to an internet electronic mail message at S2050. The main payload of the SOAP message including the recipient electronic mail address may be mapped to the header and body of the internet electronic mail message, and composition module 348 may convert the SOAP attachment into a MIME attachment (i.e., a groupware iCalendar object) based on RFC 2045 and/or RFC 2046 according to some embodiments.

At S2060, the electronic mail message is converted from internet message format RFC 2822 to the wire format and is sent to a mail server via SMTP. Mail server 320, for example, may then route the electronic mail message to a mail server associated with the recipient electronic mail address of the electronic mail message.

Figure 21:
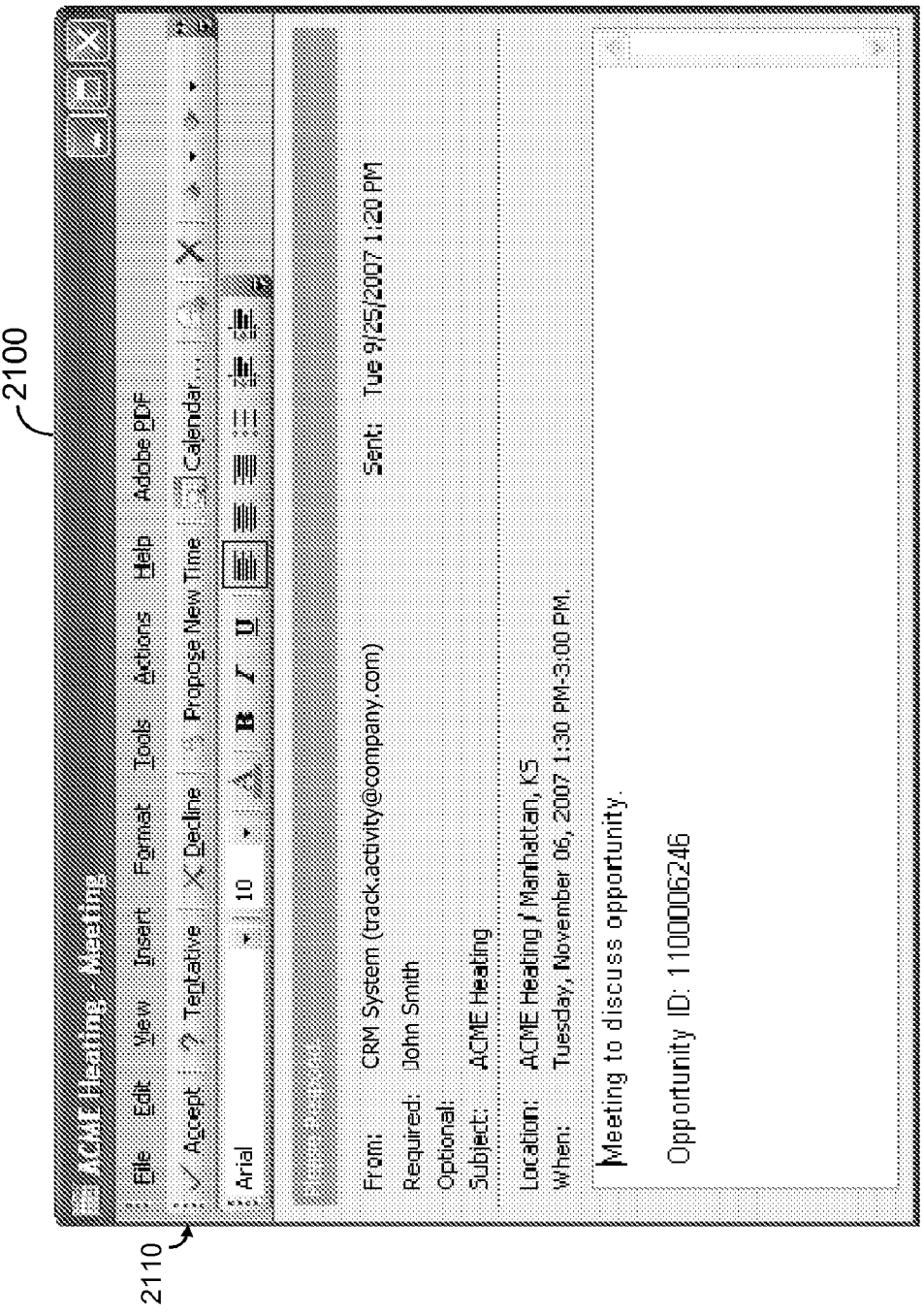
FIG. 21 is a view of a groupware client user interface for accepting a meeting request according to some embodiments.

FIG. 21 illustrates user interface 2100 of a groupware client to present the electronic mail message as received at the recipient electronic mail address. The groupware client presents the electronic mail message via user interface 2100 because the groupware client recognizes the electronic mail message and its attached iCalendar object as a meeting request. Accordingly, user interface 2100 includes Meeting toolbar 2110. User interface 2100 also displays sender electronic mail address 2120 and recipient electronic mail address 2130. Manipulation of Meeting toolbar 2110 may therefore cause transmission of an electronic mail message with an attached iCalendar object back to the CRM system for processing as described above.

Time Recording

Figure 22:
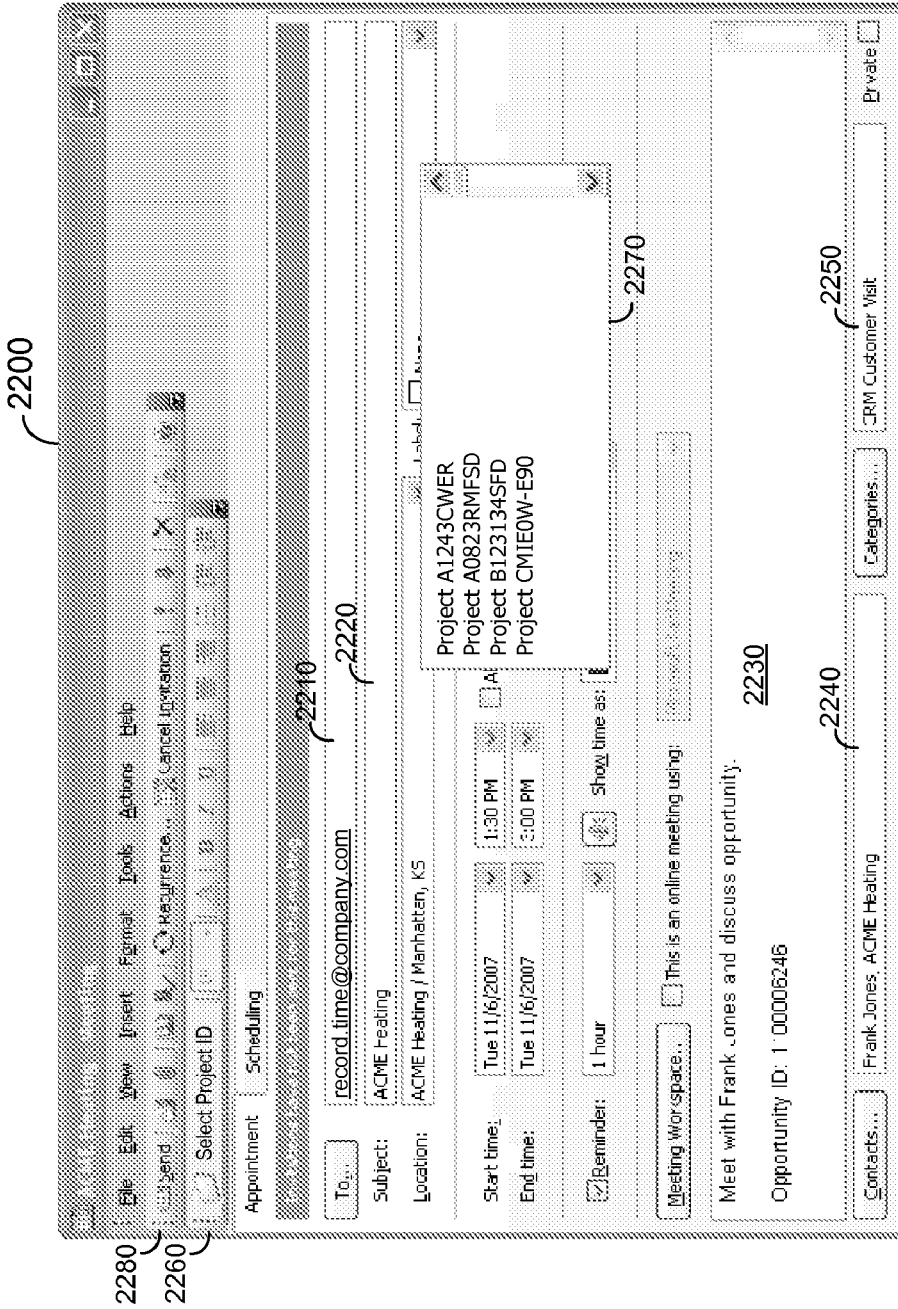
FIG. 22 is a view of a groupware client user interface for creating a calendar event according to some embodiments.

Time recording may be facilitated through use of a groupware client according to some embodiments. For example, a groupware calendar event may be created to represent time spent on a particular project. FIG. 22 illustrates creation of such a calendar event.

User interface 2200 of FIG. 22 has been manipulated to create a calendar event associated with time spent on a particular project. The electronic mail address record.time@company.com is entered into recipient electronic mail address field 2210. It will be assumed that this address is associated with a time recording Web service provided by a CRM system or other business process platform to which the user has access. The time recording Web service may require an identifier of the project for which the time is to be recorded.

The project may be identified in subject field 2220, body 2230, contacts field 2240 or categories field 2250. User interface 2200 also includes Select Project ID button 2260. Selection of button 2260 causes display of window 2270 including a list of Project IDs. Recently-used Project IDs may be displayed at the top of the list. Button 2260 may generated by a usability plug-in that extends the standard functionality of the groupware mail client. In operation, button 2260 may initiate a process allowing the mail client to communicate directly with an inbound process agent of an application platform as shown in FIG. 3. The communication may comprise a request for and a reception of the list of Project IDs shown in window 2270.

Figure 23:
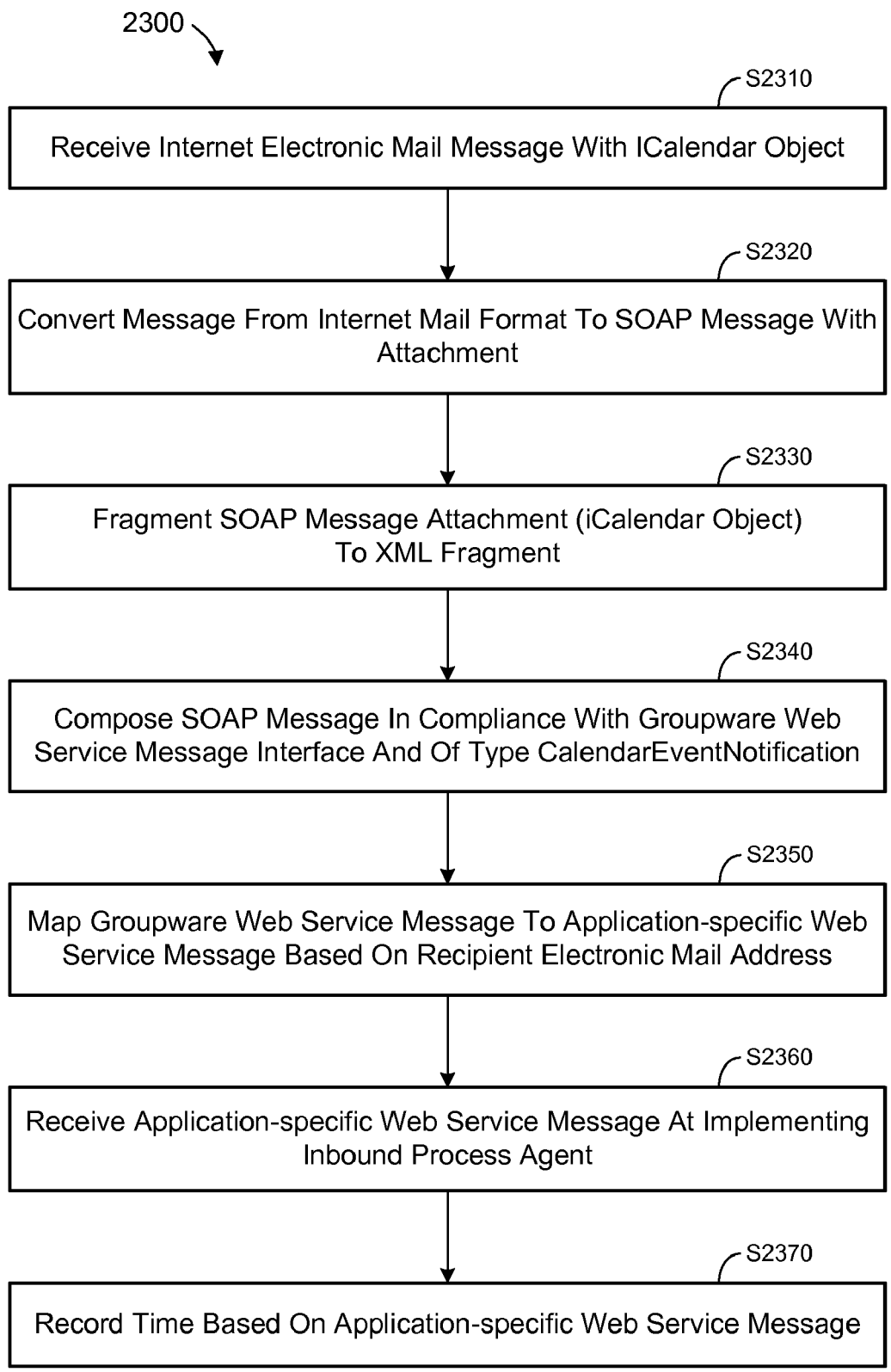
FIG. 23 is a flow diagram of a process to record time according to some embodiments.

The user may select Send button 2280 to send a corresponding electronic mail message with an iCalendar attachment to a business process platform implementing the time recording Web service. The electronic mail message and/or the iCalendar attachment include information specifying the project for which time is to be recorded. FIG. 23 illustrates process 2300 which may be performed by the platform in response to transmission of the electronic mail message.

The internet electronic mail message including the attached iCalendar object is received at S2310. As previously described, the message may be received from a mailbox storing all electronic mail messages directed to record.time@company.com and may be converted from the wire format to the internet message format at S2310. The electronic mail message is then converted from the internet electronic mail message format to a SOAP message with a SOAP attachment at S2320.

The conversion at S2320 may include resolving the body of the electronic mail message, the header elements of the electronic mail message, and a highest node level of the attachment tree. The SOAP message is then composed to include the body and the header elements in its main payload, and a SOAP attachment of the highest level nodes of the attachment tree. An XML fragment is generated by iCalendar handler 357 based on the SOAP attachment at S2330.

Next, at S2340, an XML (SOAP) message compliant with a generic groupware Web service message interface is composed based on the XML fragment. By virtue of interface 2200 used to create the electronic mail message and the iCalendar object, the attachment includes a VEVENT block, and therefore the composed message is of type CalendarEventNotification. In some embodiments, adapter module 350 outputs the generic groupware Web service message to integration server 360 at S2340.

The generic groupware Web service message is mapped at S2350 to an application-specific Web service message interface based on a recipient electronic mail address of the received electronic mail message. In this regard, the electronic mail address record.time@company.com is associated with an application-specific groupware Web service. An electronic mail message sent to this electronic mail address is therefore to be processed by the application-specific groupware Web service. Since adapter module 350 outputs a message that complies with the generic groupware Web service message interface at S2340, the message that is output by adapter module 350 is mapped to the message interface of the application-specific groupware Web service at S2350 based on pre-defined mappings.

In addition, the application-specific groupware Web service message is received by an inbound process agent corresponding to the application-specific groupware Web service at S2360. The inbound process agent then operates at S2370 to provide the application-specific groupware Web service. For example, the inbound process agent determines relevant information from the message (e.g., user, project, duration, etc.) and instantiates a business object to record the time in association with the project.

Contact Management

Acquisition of contact information stored in a back-end system may also be facilitated by some embodiments. Some embodiments also allow synchronization of contact information between a back-end system and a groupware client, and/or persistence of contact information within the groupware client.

Figure 24:
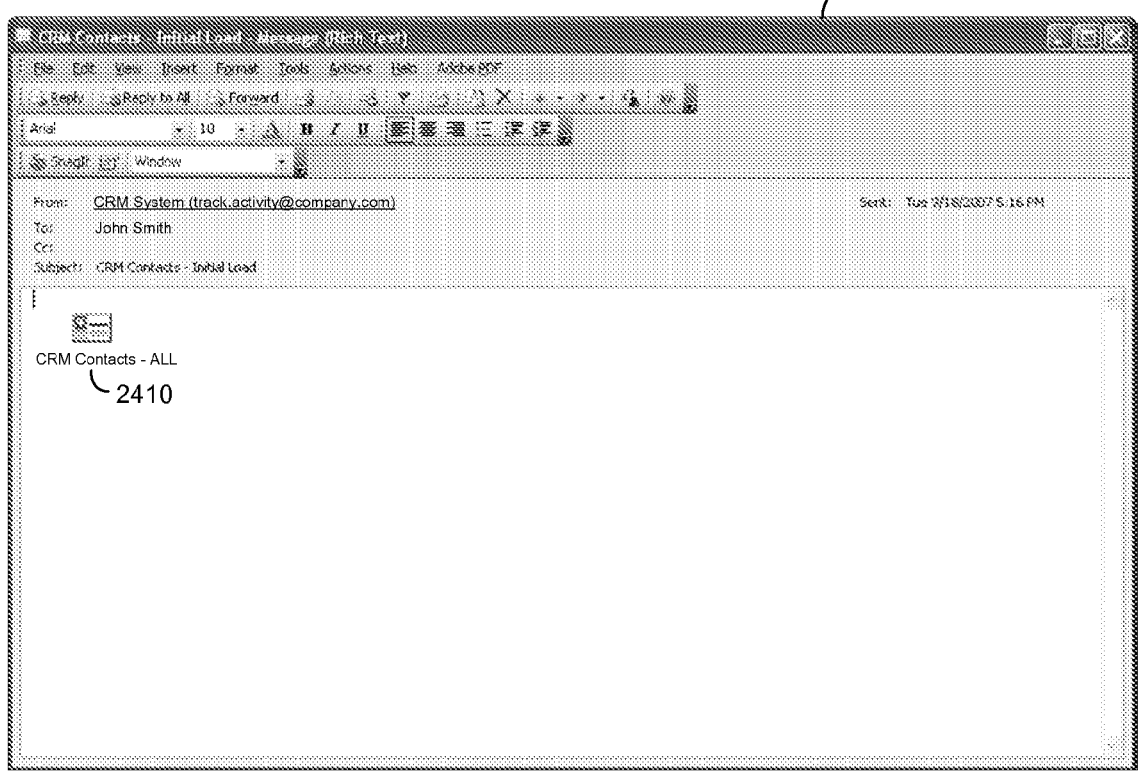
FIG. 24 is a view of a groupware client user interface displaying a received electronic mail message including a contact object according to some embodiments.

FIG. 24 illustrates user interface 2400 of a groupware client to present an electronic mail message as received by a user. User interface 2400 presents attachment 2410 comprising a vCard attachment pursuant to RFC 2426. Attachment 2410 includes contact information received from a business process platform associated with electronic mail address track.activity@company.com according to some embodiments. Attachment 2410 may comprise information for one or more contacts, and may be imported to local contact information of the groupware client using any suitable procedure supported by the groupware client. According to some embodiments, the groupware client automatically imports contact information received from an electronic mail address associated with the business process platform.

Figure 25:
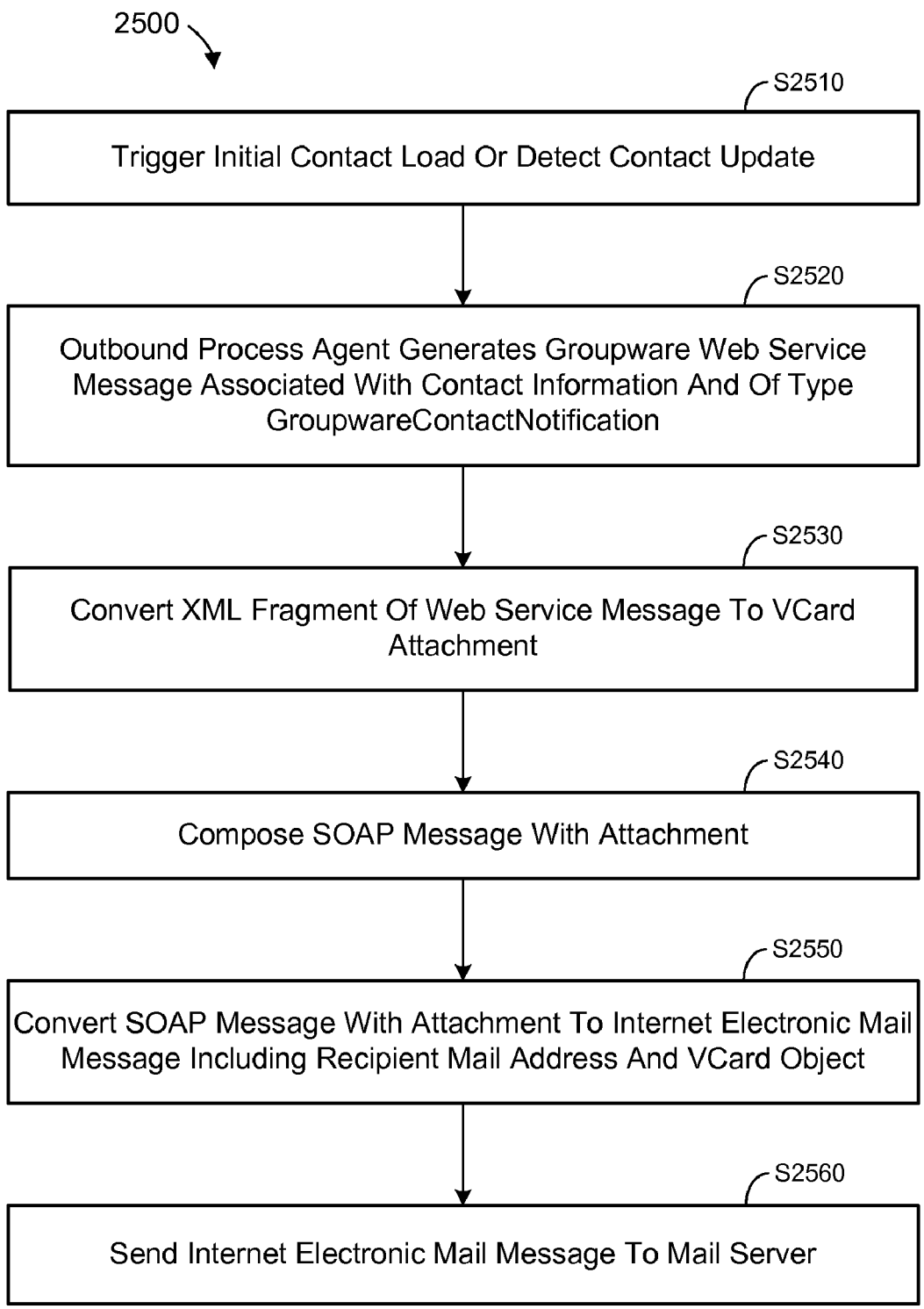
FIG. 25 is a flow diagram of a process to update contact information of a groupware client according to some embodiments.

Process 2500 of FIG. 25 may be executed to transmit contact information stored in business objects of a business process platform to a groupware client via an electronic mail message such as that illustrated in FIG. 24. At S2510, a system of the business process platform (e.g., a CRM system) determines to initially load a groupware client of a user with a set of contact information associated with the user. This determination may be triggered by an indication that the user is a new employee, by an indication that the user has received a new computing device, or by any other suitable indication. Alternatively, an update to contact information associated with the user may be detected at S2510. The detected update may have been initiated through a user interface 380 of the system.

An outbound process agent exposes the relevant contact information (i.e., the initial load or the updated contact information) via a Web service message at S2520. The Web service message is associated with the contact information, complies with a generic groupware message interface, and is of message type GroupwareContactNotification. The Web service message also includes an electronic mail address of the user. Due to the message type, vCard handler 358 is invoked at S2530 to convert an XML fragment of the received Web service message to an internal representation and to convert the internal representation to a string corresponding to a vCard attachment.

Next, at S2540, an intermediate SOAP message is composed by attaching the vCard attachment as a SOAP attachment to a SOAP message. The main payload of the SOAP message represents a header structure of a mail message (including the recipient electronic mail address) and a body of a mail message. The SOAP message with attachment is then converted to an internet electronic mail message at S2550. The main payload of the SOAP message including the recipient electronic mail address may be mapped to the header and body of the internet electronic mail message, and the vCard attachment is converted into a MIME attachment (i.e., a groupware vCard object) according to some embodiments.

The electronic mail message is converted from internet message format RFC 2822 to the wire format at S2560 and is sent via SMTP to a mail server. The electronic mail message is then routed to a mail server associated with the recipient electronic mail address of the electronic mail message. The user may access the electronic mail message using a groupware client and import associated contact information as described with respect to FIG. 24. Advantageously, the imported contact information may be accessed by the groupware client even if no network connection is available (i.e., the groupware client is "offline").

Figure 26:
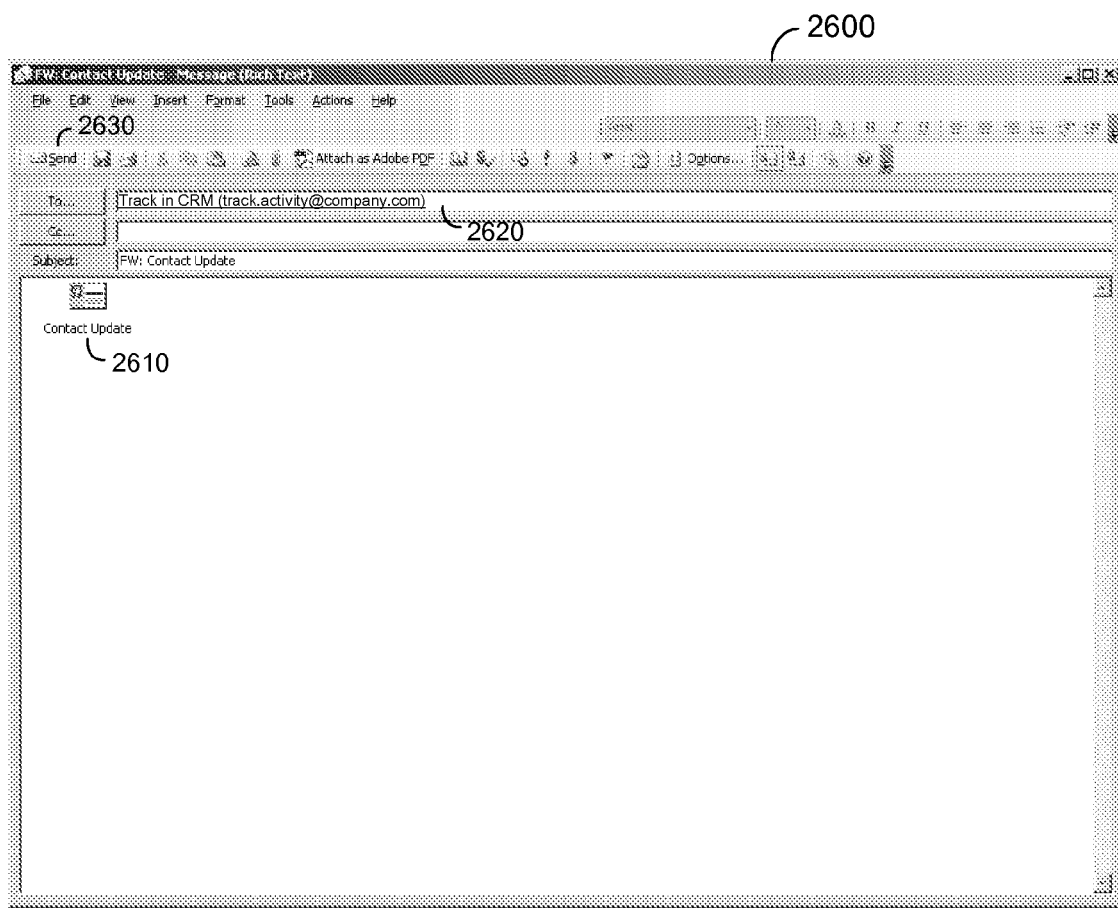
FIG. 26 is a view of a groupware client user interface for creating and sending an electronic mail message including a contact object according to some embodiments.

User Interface 2600 of FIG. 26 shows an electronic mail message including attachment 2610. Attachment 2610 represents contact information and, according to current standards, is a vCard object in compliance with RFC 2426. Attachment 2610 may represent contact information stored in a local persistence of the groupware client.

The electronic mail address track.activity@company.com has been input into recipient electronic mail address field 2620. Since the electronic mail address track.activity@company.com is associated with a groupware object-tracking Web service provided by a CRM system or other business process platform, the user may select Send button 2630 to send the electronic mail message and attachment 2610 to the platform using standard protocols. According to some embodiments, the groupware client is configured to generate an electronic mail message as shown in FIG. 26 each time contact information is updated in the local persistence.

Figure 27:
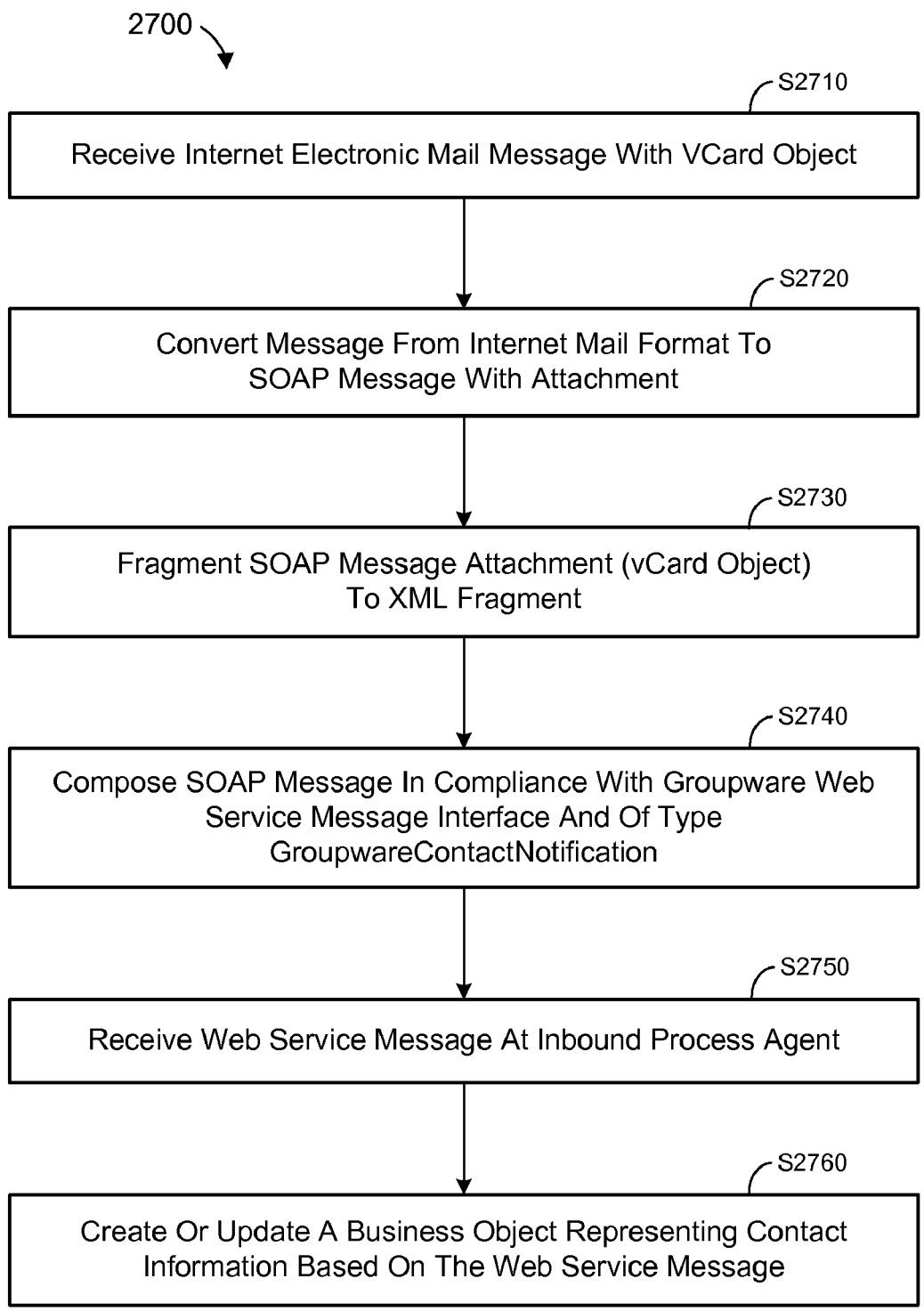
FIG. 27 is a flow diagram of a process to update contact information of a business process platform according to some embodiments.

Process 2700 of FIG. 27 may be performed by a business process platform in response to sending an electronic mail message as shown in FIG. 27. The internet electronic mail message including the vCard object is received at S2710 from a mailbox associated with the electronic mail address track.activity@company.com. The electronic mail message is converted at S2720 from the internet electronic mail message format to a SOAP message having a SOAP attachment. For example, decomposition module 347 may compose a SOAP message at S2720 having a main payload comprising the header elements and body of the electronic mail message, and a SOAP attachment of the highest level nodes of the attachment tree.

Next, at S2730, vCard handler 358 imports an electronic mail string of the SOAP attachment to an internal representation, and exports the internal representation to an XML fragment. The XML fragment is used at S2740 to compose an XML (SOAP) message compliant with a generic groupware Web service message interface. The composed message is of type GroupwareContactNotification.

An inbound process agent implementing a generic groupware Web service receives the Web service message at S2750. No interface mapping of the Web service message is required prior to S2750 because the received electronic mail message was sent to the electronic mail address associated with the generic groupware Web service, and the Web service message composed at S2740 complies with the message interface of the generic groupware Web service.

The inbound process agent creates or updates a business object representing contact information based on the Web service message at S2760. The inbound process agent may use a sender electronic mail address associated with the message to identify the user for tracking and for verifying privileges. The inbound process agent may also use a digital certificate associated with the message to authenticate the user.

Fact Sheet Broadcast

Figure 28:
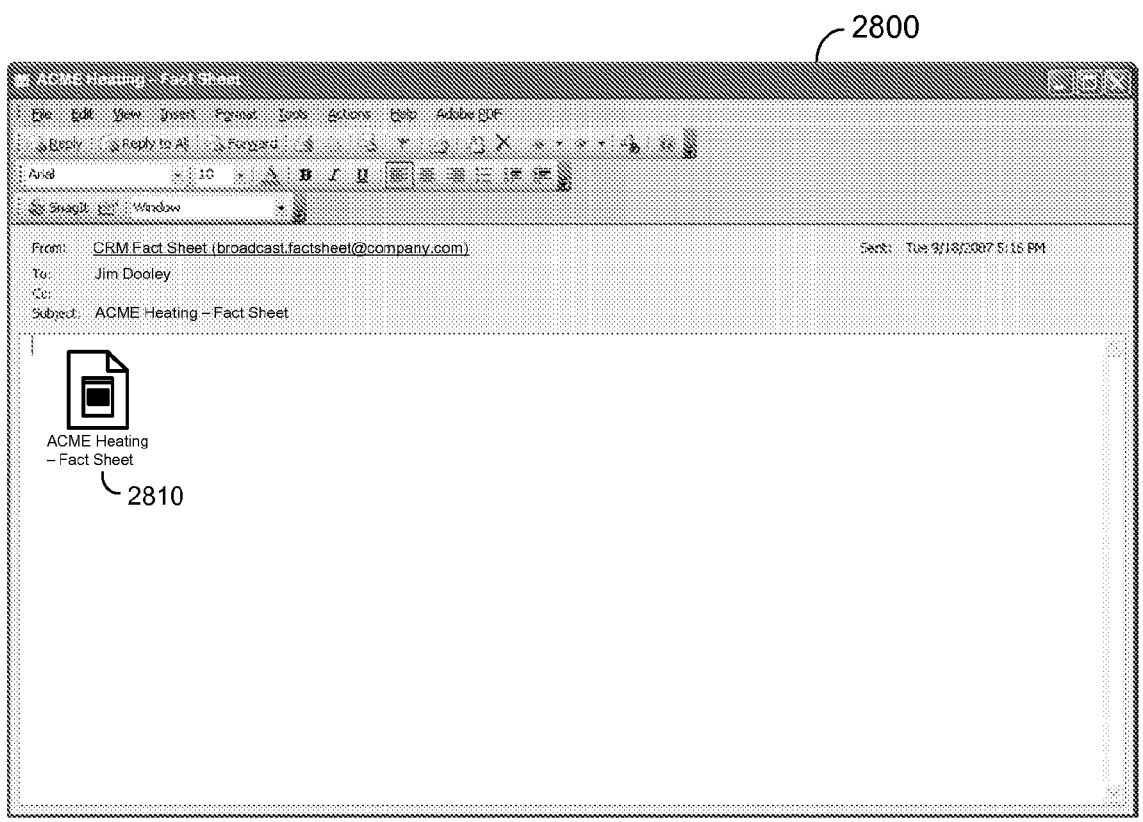
FIG. 28 is a view of a groupware client user interface displaying a received electronic mail message including a fact sheet according to some embodiments.

User interface 2800 of FIG. 28 presents an electronic mail message sent to a user. The electronic mail message was sent to the user by a Web service associated with the electronic mail address broadcast.factsheet@company.com. Generation of the electronic mail message according to some embodiments will be described below with respect to FIG. 29.

The electronic mail message includes attachment 2810, which is a fact sheet associated with a business partner. Attachment 2810 may comprise a text file, a file native to any software application, including but not limited to a Portable Document Format (PDF) file, a Word file, or any other suitable file type. In some embodiments, attachment 2810 does not comply with a groupware object standard such as those described above.

Attachment 2810 may be saved locally by the user for offline use. As will be described below, a fact sheet attachment 2810 associated with a business partner may be transmitted to the user periodically and/or in response to a fact sheet update. The foregoing may provide the user with persistent access to updated fact sheets.

Figure 29:
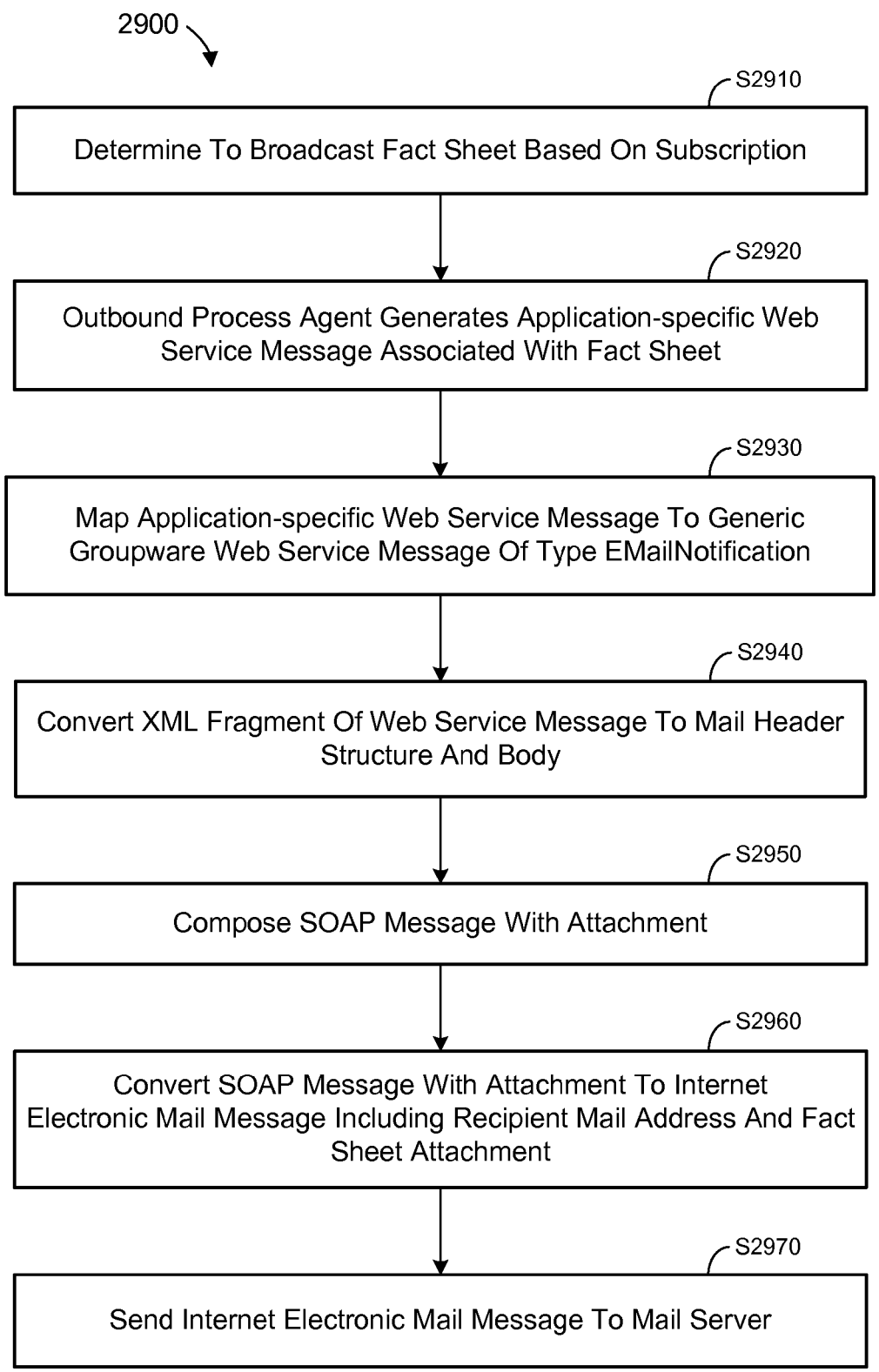
FIG. 29 is a flow diagram of a process to broadcast electronic mail messages including fact sheets according to some embodiments.

Process 2900 of FIG. 29 may be executed to transmit a fact sheet to a groupware client via an electronic mail message such as that illustrated in FIG. 25. Such a fact sheet may include information stored in business objects of a business process platform.

Initially, at S2910, a system of the business process platform (e.g., a CRM system) determines to broadcast a fact sheet based on a subscription. In this regard, the business process platform may maintain user subscriptions to fact sheet broadcasts. A user may subscribe, for instance, to fact sheets associated with one or more business partners. In some embodiments, the user may transmit an electronic mail message to a subscription Web Service of the platform electing to receive the fact sheets periodically, in response to updates thereto, and/or in any other suitable manner. The determination at S2910 may therefore be triggered by an update to fact sheet data or by a calendar event.

An outbound process agent exposes the fact sheet via an application-specific Web service message at S2920. The Web service message complies with an application-specific groupware message interface according to some embodiments. The Web service message also includes an electronic mail address of the user.

The application-specific Web service message is mapped at S2930 to a generic groupware Web service message interface of type eMailNotification. The mapping may be pre-configured and triggered based on a determination that the application-specific Web service message does not comply with the generic groupware Web service message interface. This determination may be based on detecting a difference between the sender electronic mail address of the message (e.g., broadcast.factsheet@company.com) and the electronic mail address associated with the generic groupware Web service (e.g., track.activity@company.com), on the identity of the outbound process agent that generated the application-specific Web service message, or on any other factor.

An XML fragment of the converted Web service message is converted at S2940 to an electronic mail message body and header structure. Due to the message type, eMail handler 356 is invoked at S2940 to convert the XML fragment to an internal representation and to convert the internal representation to a string corresponding to the electronic mail message body and header structure.

An intermediate SOAP message with attachment is composed at S2950. The main payload of the SOAP message includes the header structure of the mail message (including the recipient electronic mail address) and the body of the mail message. The fact sheet is attached as a SOAP attachment to the SOAP message.

The intermediate SOAP message with attachment is converted to an internet electronic mail message at S2960. The main payload of the SOAP message including the recipient electronic mail address may be mapped to the header and body of the internet electronic mail message, and the SOAP attachment is converted into a MIME attachment according to some embodiments.

At S2970, the electronic mail message is converted from internet message format RFC 2822 to the wire format and is sent via SMTP to a mail server. The electronic mail message is then routed to a mail server associated with the recipient electronic mail address of the electronic mail message. The user may access the electronic mail message using a groupware client and save the fact sheet locally as described with respect to FIG. 28. As in other usage scenarios described herein, the locally-saved fact sheet may be accessed by the groupware client even if no network connection is available (i.e., the groupware client is "offline"). According to some embodiments, groupware contact information accessible by a groupware client may include a parameterized hyperlink for direct online download of an associated fact sheet.

Vacation Request

Figure 30:
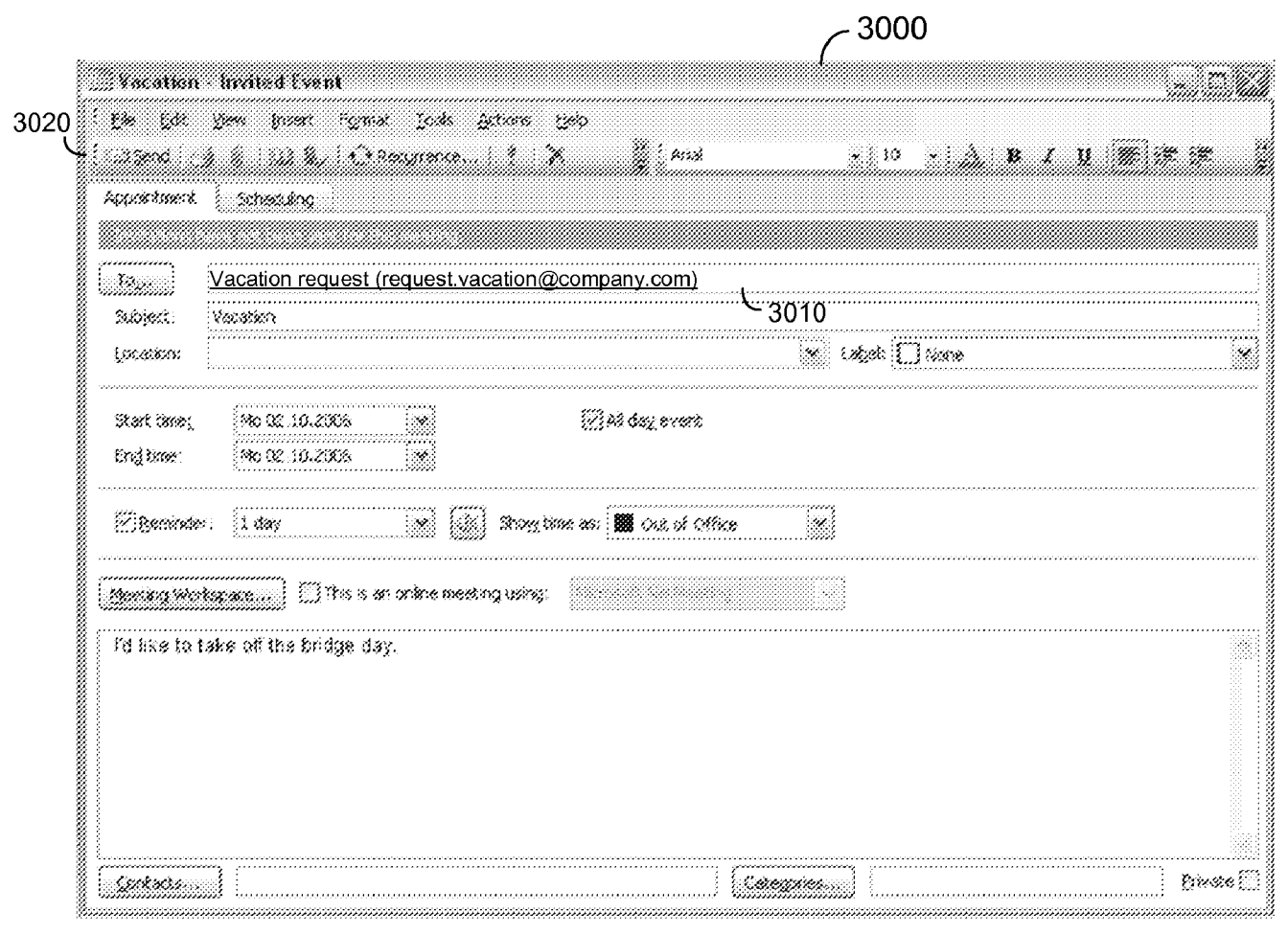

FIG. 30 presents user interface 3000 of a groupware mail client. A user may manipulate user interface 3000 to define fields of an iCalendar object representing a calendar event. In the illustrated example, the user has defined an all-day event on a specified date. The user has also input the electronic mail address request.vacation@company.com into recipient electronic mail address field 3010. User interface 3000 includes other fields to input information for association with the iCalendar object.

Figure 31:
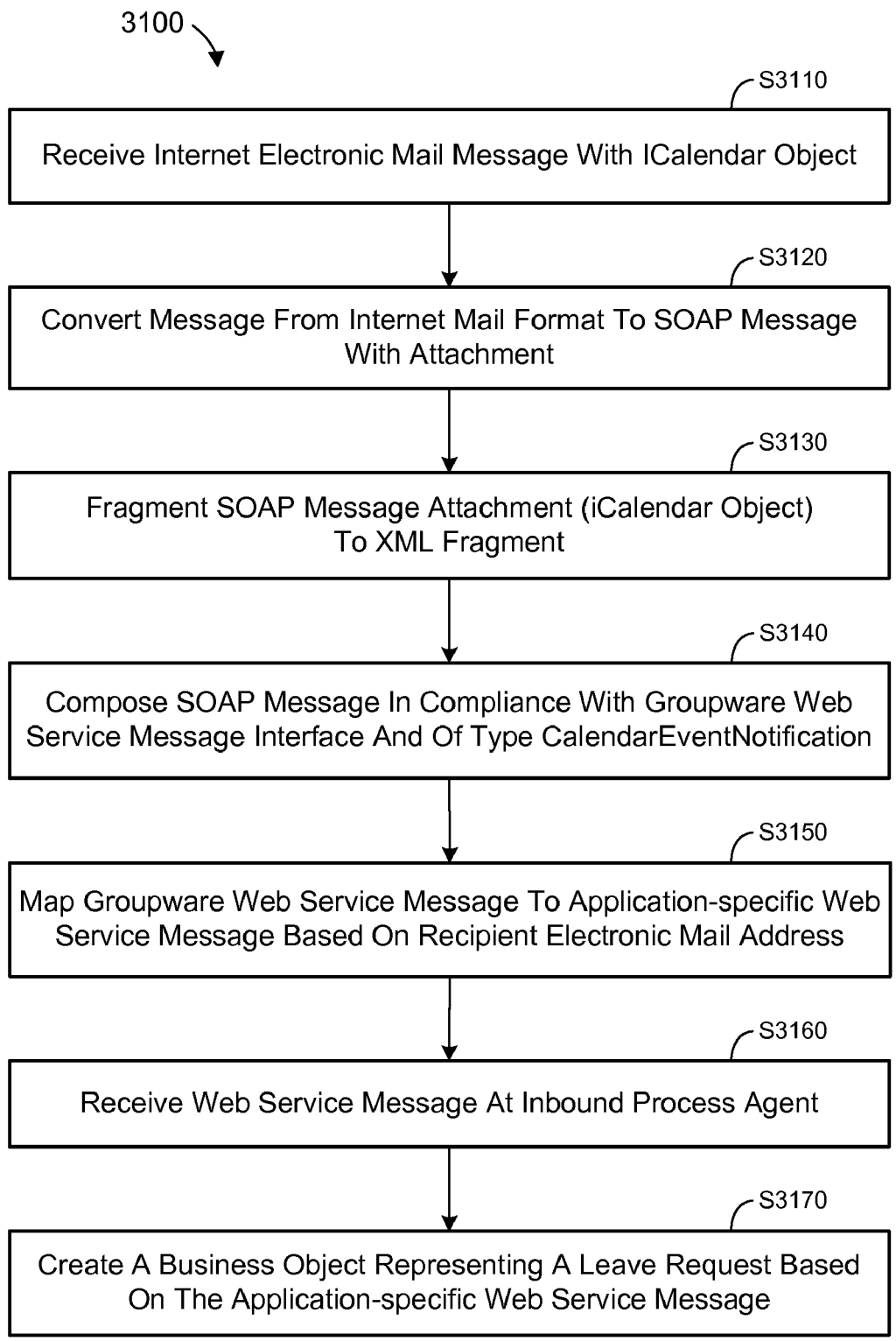
FIG. 31 is a flow diagram of a process to receive a vacation request according to some embodiments.

The electronic mail address request.vacation@company.com has been pre-associated with a vacation request Web service provided by a CRM system or other business process platform to which the user has access. The user may therefore request the Web service by selecting Send button 3020 to transmit the electronic mail message and the iCalendar object to the platform using standard protocols. FIG. 31 illustrates process 3100 which may be performed by the platform in response to transmission of the electronic mail message.

The internet electronic mail message including the attached iCalendar object is received at S3110. The message may be received from a mailbox storing all electronic mail messages directed to request.vacation@company.com and may be converted from the wire format to the internet message format at S3110. Next, at S3120, the electronic mail message is converted from the internet electronic mail message format to a SOAP message with a SOAP attachment.

According to some embodiments, S3120 may include resolving the body of the electronic mail message, the header elements of the electronic mail message, and a highest node level of the attachment tree. The main payload of the SOAP message comprises the body and the header elements, and the SOAP attachment comprises the highest level nodes of the attachment tree.

The SOAP attachment is fragmented at S3130 to generate an XML fragment. Since the SOAP attachment is an iCalendar attachment, iCalendar handler 357 may be invoked at S3130 to generate the XML fragment. An XML (SOAP) message compliant with a generic groupware Web service message interface is composed based on the XML fragment at S3140. The attachment includes a VEVENT block according to the present example, therefore the composed message is of type CalendarEventNotification as described with respect to process 600.

The generic groupware Web service message is mapped to an application-specific Web service message interface at S3150 based on a recipient electronic mail address of the received electronic mail message. Continuing the present example, the generic groupware Web service message is mapped to the message interface of an application-specific Web service associated with the recipient electronic mail address vacation.request@company.com.

The application-specific Web service message is received by an inbound process agent corresponding to application-specific Web service at S3160. The inbound process agent then operates at S3170 to provide the application-specific Web service. For example, the inbound process agent may instantiate a business object corresponding to a vacation request using information included in the application-specific Web service message.

Approval Processing

Some embodiments provide an efficient system to process approvals using a groupware mail client. Such approvals may apply to vacation requests submitted as described above or any other request for which approval is needed. Such other requests may also be submitted according to the embodiments described herein.

Figure 32:
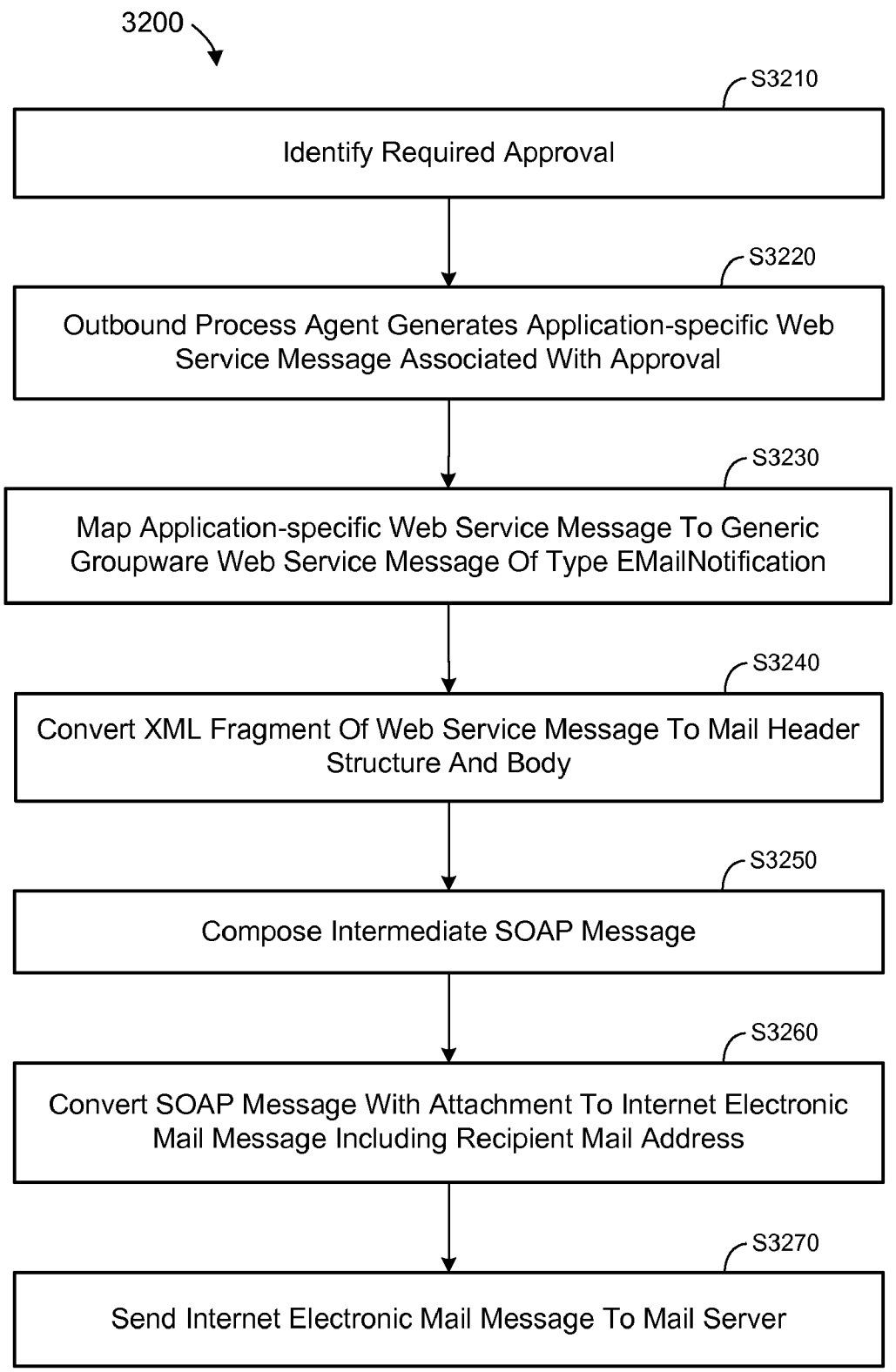
FIG. 32 is a flow diagram of a process to approve a request according to some embodiments.

Process 3200 of FIG. 32 may be executed by a business process platform to facilitate approvals using a groupware client. A required approval is initially identified at S3210. The identification may comprise detection of a business object instantiated in response to a vacation request, price change request, or any other request requiring an approval. The required approval may be exposed by a dedicated approval system of the business process platform.

An outbound process agent generates an application-specific Web service message at S3220. The Web service message complies with an application-specific groupware message interface and is associated with the approval. For example, the application-specific Web service message may include details to assist a determination of whether to grant or deny the approval. The Web service message also includes an electronic mail address of a user with the authority to grant or deny the approval. The details and electronic mail address may be received by the outbound process agent from the approval system.

The application-specific Web service message is mapped to a generic groupware Web service message interface of type eMailNotification at S3230. The mapping may be triggered based on a difference between the sender electronic mail address of the message (e.g., approvals@company.com) and the electronic mail address associated with the generic groupware Web service (e.g., track.activity@company.com), on the identity of the outbound process agent that generated the application-specific Web service message, or on any other factor.

At S3240, an XML fragment of the converted Web service message is converted to an electronic mail message body and header structure. eMail handler 356 may be invoked at S3240 to convert the XML fragment to an internal representation and to convert the internal representation to a string corresponding to the electronic mail message body and header structure.

An intermediate SOAP message is then composed at S3250. The main payload of the SOAP message includes the header structure of the mail message (including the recipient electronic mail address) and the body of the mail message. According to some embodiments, S3250 may also comprise enriching the SOAP message with various additions such as URLs for direct navigation into application platform 370 and voting buttons for facilitating responses.

The intermediate SOAP message is converted to an internet electronic mail message at S3260. The main payload of the SOAP message including the recipient electronic mail address may be mapped to the header and body of the internet electronic mail message according to some embodiments. The electronic mail message is then converted from internet message format RFC 2822 to the wire format and sent via SMTP to a mail server at S3270.

Figure 33:
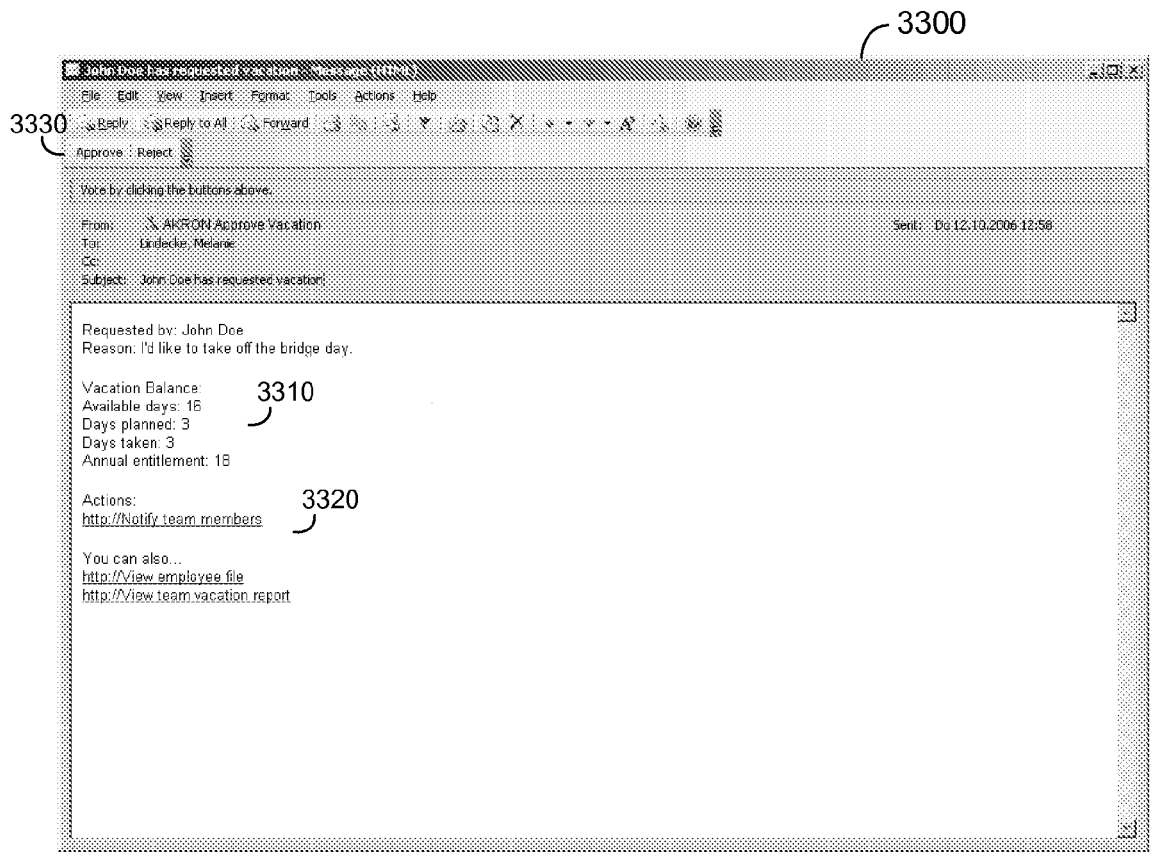
FIG. 33 is a view of a groupware client user interface displaying a received electronic mail message for approving a request according to some embodiments.

FIG. 33 illustrates user interface 3300 of a groupware client to present an electronic mail message generated according to process 3200 and as received at the recipient electronic mail address. The displayed electronic mail message includes body 3310 specifying details of the requested approval. User interface 3300 also displays URLs 3320 for directly accessing Web pages and/or Web services of an application platform, and voting buttons 3330 for approving or rejecting the request. Selection of one of voting buttons 3330 may cause the groupware client to generate and send a corresponding electronic mail message back to the sender electronic mail address associated with the application-specific Web service (e.g., approval.request@company.com).

Figure 34:
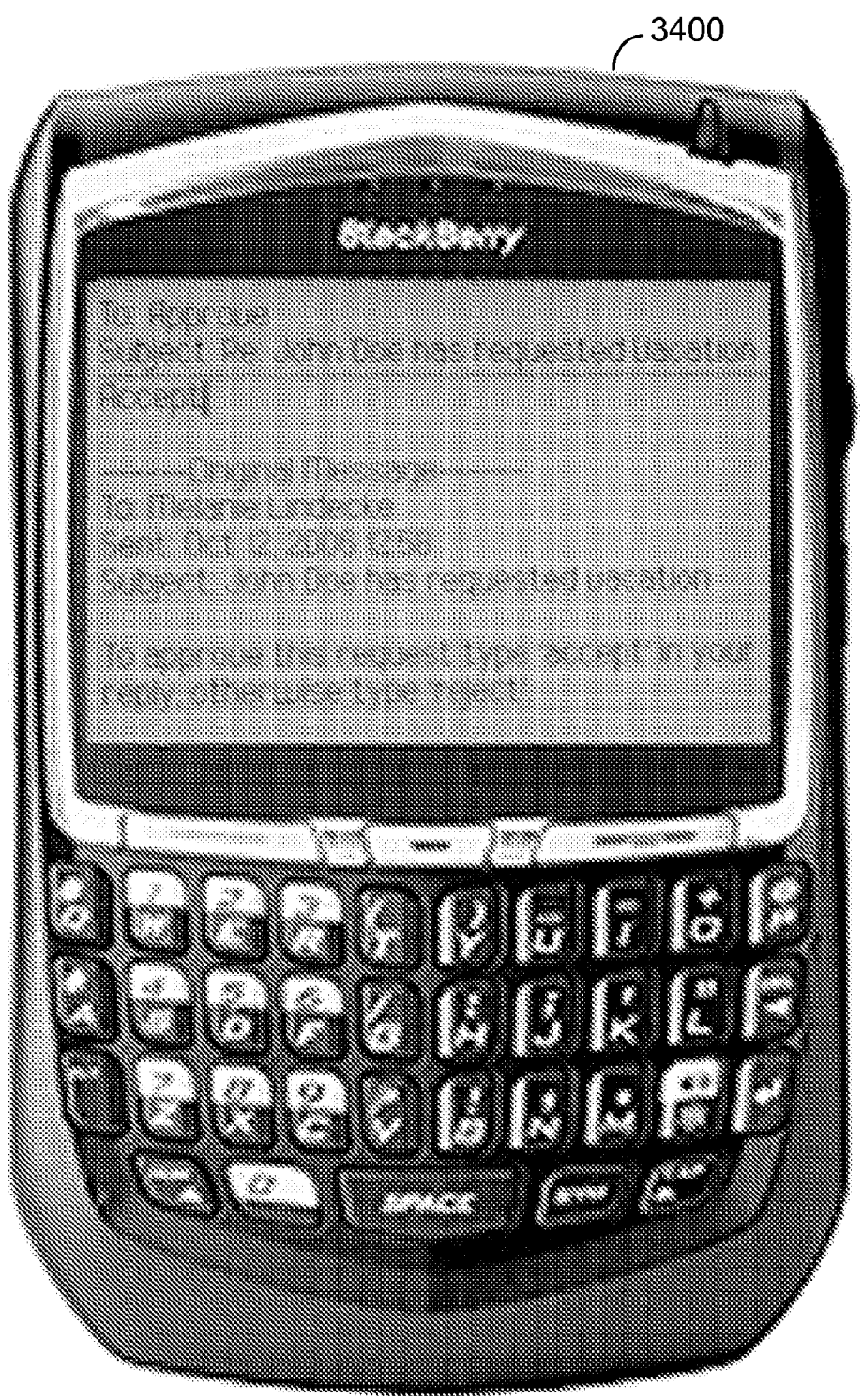
FIG. 34 is a view of a portable groupware client user interface displaying a received electronic mail message for approving a request according to some embodiments.

FIG. 34 shows mobile device 3400 displaying an electronic mail message received from an approval system as described above. Mobile device 3400 executes its own groupware client which may interpret and display a received electronic mail message differently than as shown in FIG. 33. As shown, the request may be approved or rejected by replying to the displayed electronic mail message with corresponding text. The reply is sent to the sender electronic mail address associated with the application-specific Web service (e.g., approval.request@company.com), which can perform appropriate action based on the text.

Case Management

Some embodiments may facilitate direct customer interaction with a business process platform. Such interaction may be particularly useful for case management.

Figure 35:
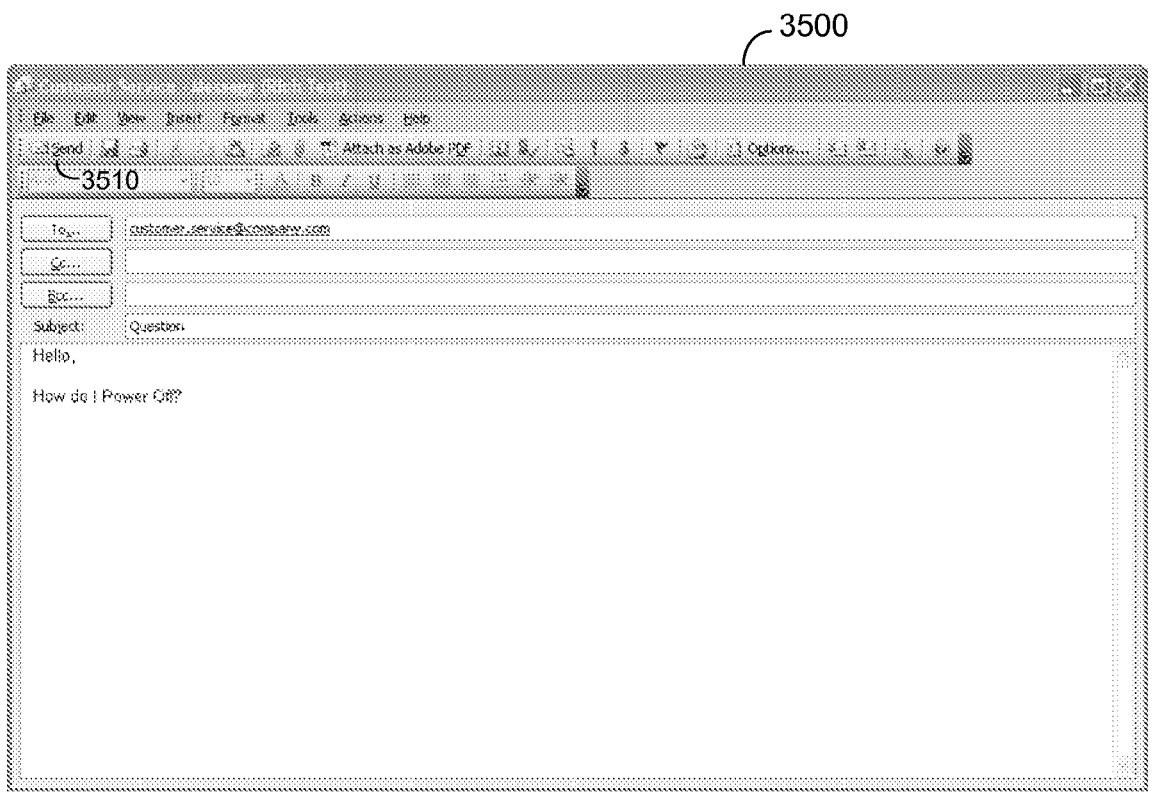
FIG. 35 is a view of a groupware client user interface for creating and sending an electronic mail message according to some embodiments.

For example, FIG. 35 presents user interface 3500 of a groupware mail client. A customer has manipulated user interface 3500 to create an internet electronic mail message for transmission to the internet electronic mail address customer.service@company.com. It will be assumed that customer.service@company.com is associated with an application-specific Web service provided by a CRM system or other business process platform to which the user has access. Accordingly, upon user selection of Send button 3510, the electronic mail message is sent to the platform using standard protocols.

Figure 36:
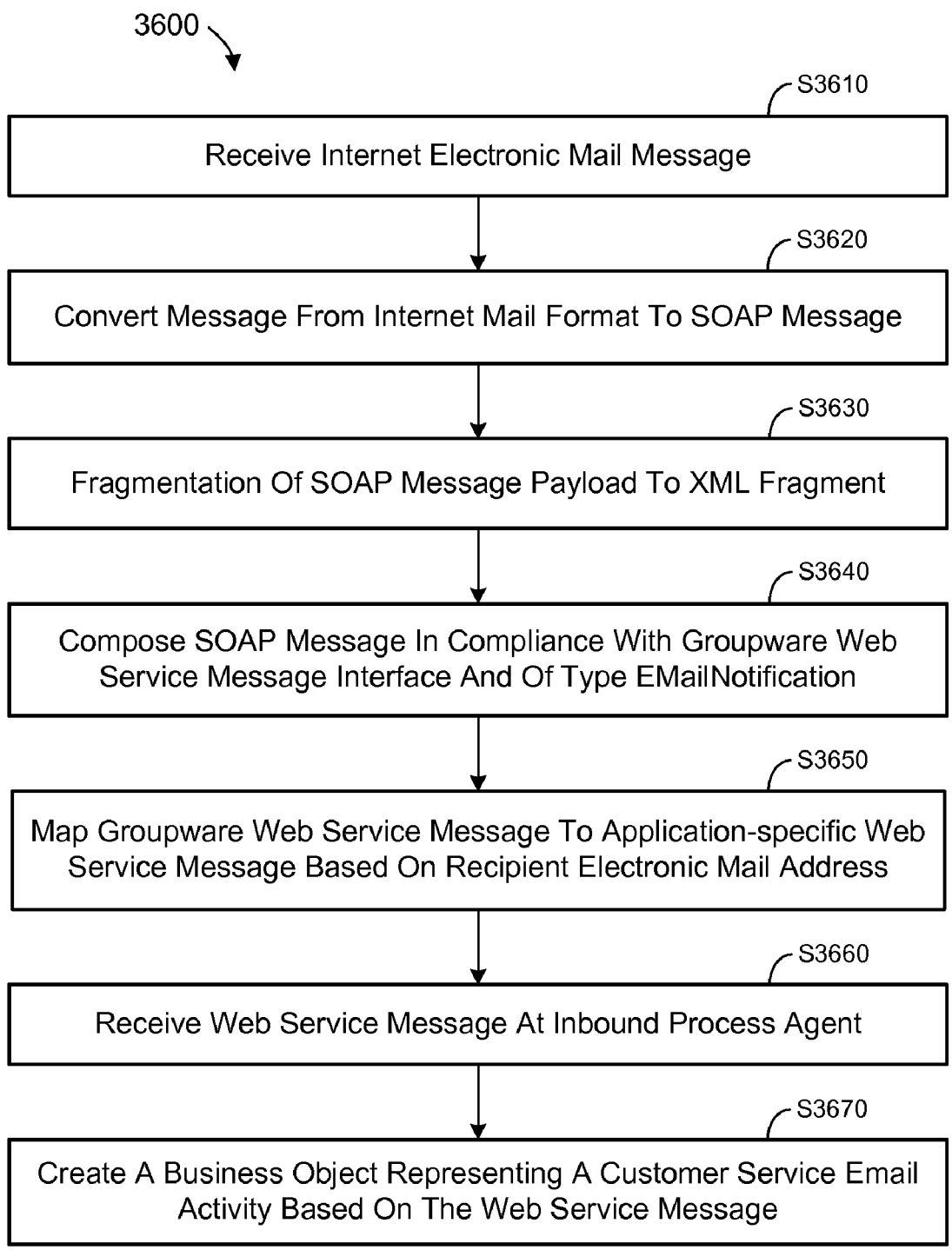
FIG. 36 is a flow diagram of a process to receive a customer service electronic mail message according to some embodiments.

FIG. 36 illustrates process 3600 which may be performed by the platform in response to transmission of the electronic mail message. The internet electronic mail message is received at S3610. The message may be received from a mailbox storing all electronic mail messages directed to customer.service@company.com and may be converted from the wire format to the internet message format by conversion module 342 at S3610.

The electronic mail message is then converted to a SOAP message at S3620. As described above, S3620 may include resolving the body and the header elements of the electronic mail message. The body and the header elements are used to create the main payload of the SOAP message.

Next, an XML (SOAP) message compliant with a generic groupware Web service message interface is composed at S3640. The SOAP message does not include any attachments. Therefore, according to S615 of process 600, the composed message is of type eMailNotification.

The generic groupware Web service message is mapped at S3650 to an application-specific Web service message interface based on a recipient electronic mail address of the received electronic mail message. More specifically, the electronic mail address customer.service@company.com is associated with an application-specific groupware Web service. The generic groupware Web service message is mapped to the message interface of this application-specific groupware Web service at S3650 based on pre-defined mappings.

The application-specific Web service message is received by an inbound process agent corresponding to the application-specific groupware Web service at S3660. The inbound process agent creates a business object based on the application-specific Web service message at S3670. The business object may represent a customer service electronic mail activity in some embodiments. The business process platform may proceed to operate based on the created business object. For example, a case manager may be notified of the customer service electronic mail activity via any suitable notification mechanisms provided by the business process platform.

Figure 37:
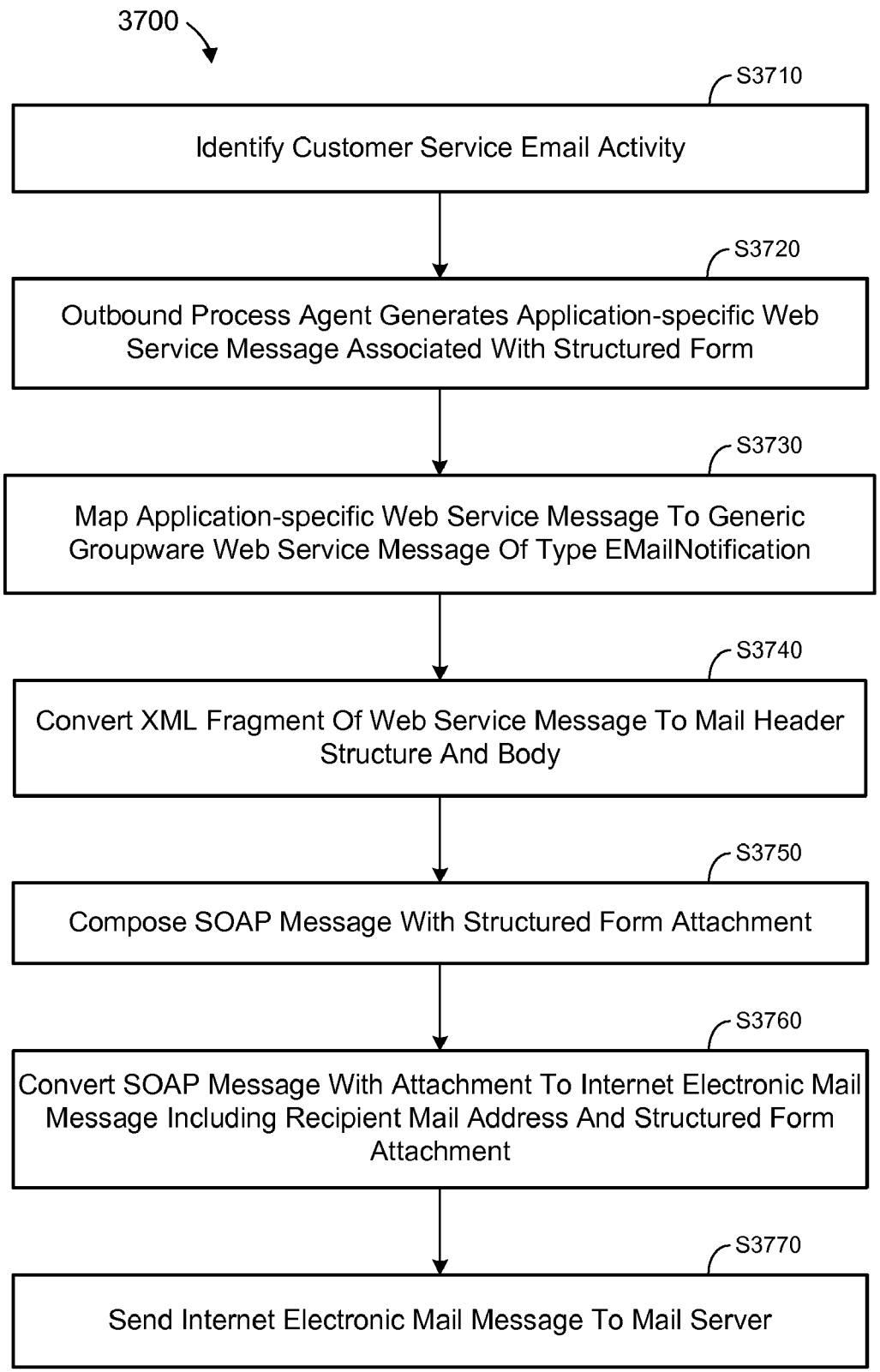
FIG. 37 is a flow diagram of a process to transmit a customer service electronic mail message according to some embodiments

According to some embodiments, process 3700 of FIG. 37 is executed by a business process platform in response to a customer service mail activity. The customer service mail activity may have been generated by process 3600 or by any other process of the business process platform. The customer service email activity is identified at S3700, and an outbound process agent generates an application-specific Web service message associated with a structured form at S3720.

The Web service message complies with an application-specific groupware message interface and includes a form having a known structure. The form may comprise an iForm®, a PDF form, a word processing document, or any other fillable document. The Web service message also includes an electronic mail address of a user with whom the customer service mail activity is associated.

The application-specific Web service message is mapped to a generic groupware Web service message interface of type eMailNotification at S3730. The mapping may be pre-configured and triggered based on a determination that the Web service message complies with the application-specific Web service message interface and not with the generic groupware Web service message interface.

At S3740, an XML fragment of the converted Web service message is converted to an electronic mail message body and an electronic mail message header structure (including the recipient electronic mail address). eMail handler 356 may be invoked at S3740 to convert the XML fragment to an internal representation and to convert the internal representation to a string corresponding to the electronic mail message body and header structure.

An intermediate SOAP message with attachment is composed at S3750. The main payload of the SOAP message includes the header structure of the mail message and the body of the mail message. The structured form is attached to the SOAP message as a SOAP attachment.

The intermediate SOAP message is converted to an internet electronic mail message at S3760. The main payload of the SOAP message including the recipient electronic mail address may be mapped to the header and body of the internet electronic mail message, and the SOAP attachment is converted to a MIME attachment and attached thereto according to some embodiments. The electronic mail message is then converted to the wire format and sent to a mail server via SMTP at S3770.

Figure 38:
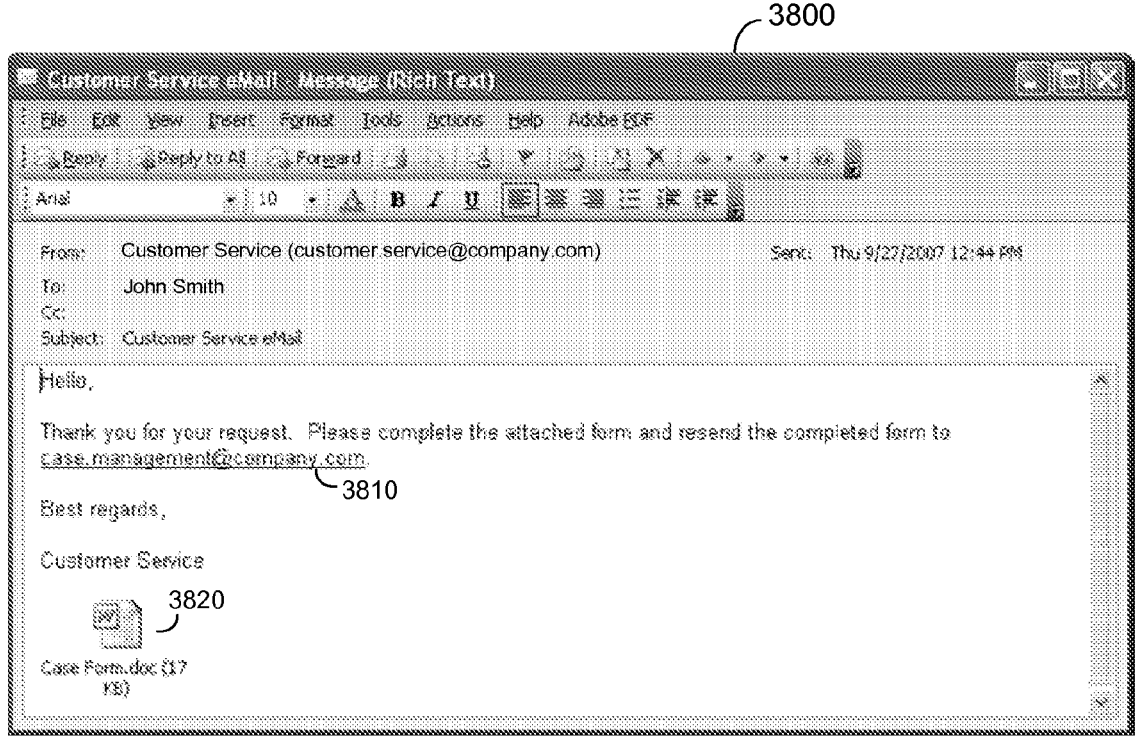
FIG. 38 is a view of a groupware client user interface displaying a received electronic mail message including a structured document according to some embodiments.

User interface 3800 of FIG. 38 presents an electronic mail message generated according to process 3700 and as received at a groupware client. The displayed electronic mail message includes instructions for responding within body 3810 and structured form 3820. As noted in the instructions, the customer may complete form 3820 and forward the form to the electronic mail address case.management@company.com. This electronic mail address is associated with a case management-related Web service of a business process platform.

Accordingly, by sending a reply to the electronic mail address case.management@company.com including completed form 3820, the customer interacts with an inbound process agent of the case management-related Web service as described above. The inbound process agent may instantiate a business object based on the reply and on information from completed form 3820. The information may be parsed from completed form 3820 based on the known structure of form 3820. The business object may then be handled by a CRM system of the business process platform in any suitable manner. In some embodiments, a case manager may complete a locally-saved copy of a structured form, generate an electronic mail message including the completed form, and send the electronic mail message directly to the electronic mail address case.management@company.com to initiate the process described above.

Report Generation

Some embodiments provide efficient access to reports of a business process platform. These reports may include information related to any number of business objects maintained by the platform, and may interrelate any applications and processes executing within the platform.

Figure 39:
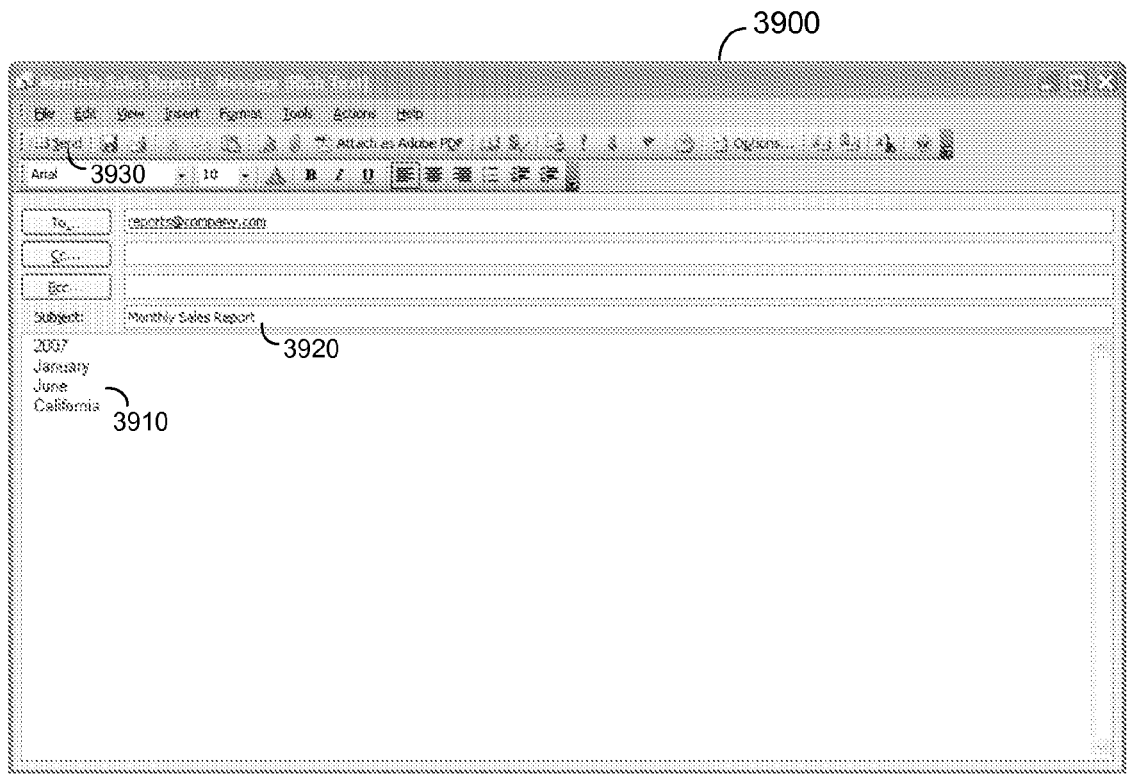
FIG. 39 is a view of a groupware client user interface for creating and sending an electronic mail message including report selection criteria according to some embodiments.
Figure 40:
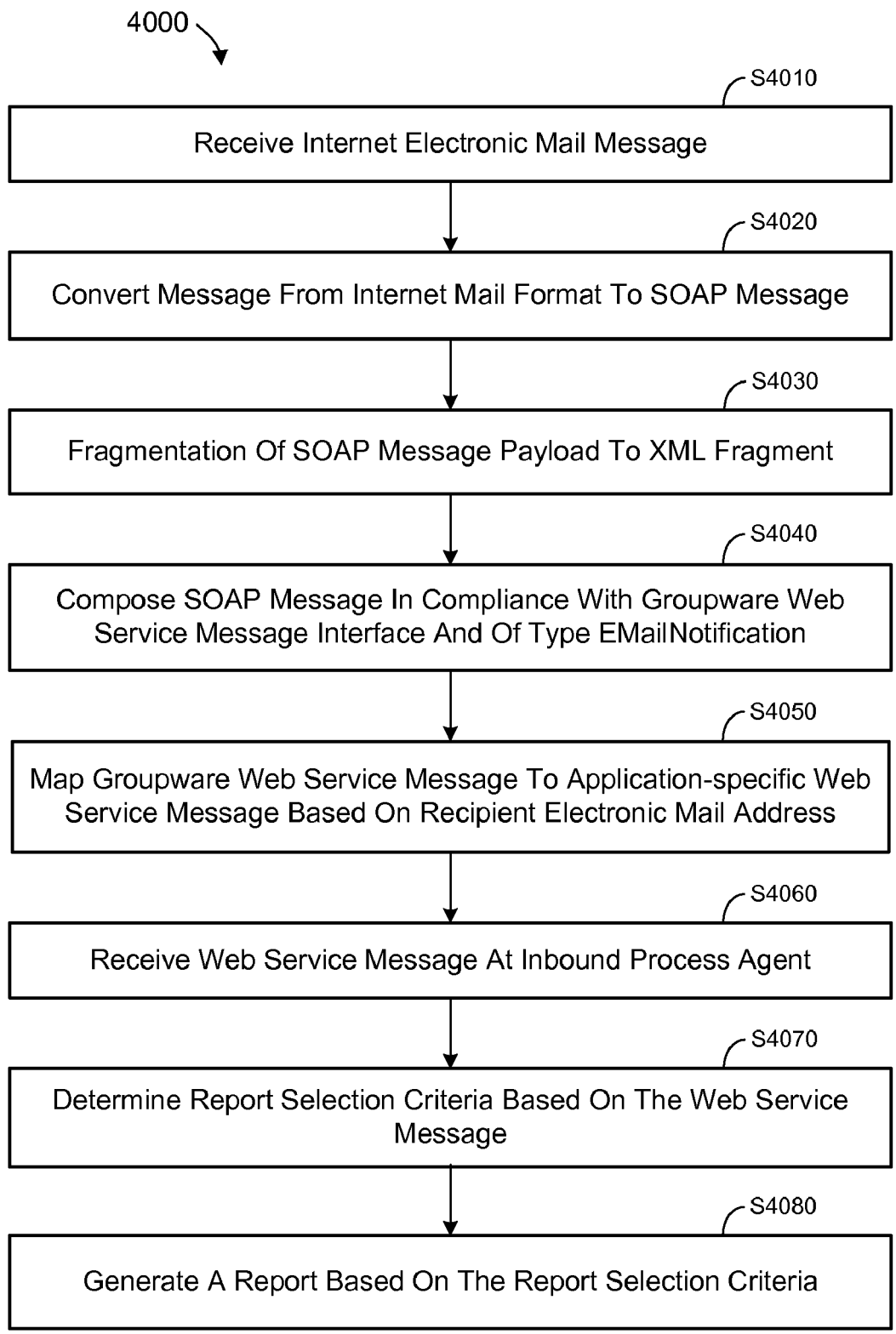
FIG. 40 is a flow diagram of a process to generate a report based on an electronic mail message according to some embodiments.

FIG. 39 presents user interface 3900 of a groupware mail client. User interface 3900 has been used create an internet electronic mail message for transmission to the recipient electronic mail address reports@company.com. A body of the electronic mail message includes report selection criteria 3910. Criteria 3910 may specify a type of report as well as selection criteria of the report.

Report selection criteria may be included within an electronic mail message in any manner that is known or described herein. For example, report selection criteria may be specified in subject field 3920, in other fields presented by user interface 3900, in a pull-down menu of user interface 3900, and/or in a pop-up window that is displayed upon selection of a plug-in-enabled button of user interface 3900. Such a pull-down menu or pop-up window may display a list of selectable report selection criteria that is stored locally and/or obtained from the business process platform through on-the-fly Web service calls and/or URL navigation.

According to some embodiments, the electronic mail address reports@company.com is associated with a report-generating Web service provided by a CRM system or other business process platform to which the user has access. Some embodiments may associate report-specific electronic mail addresses with corresponding report-specific Web services. The latter embodiments might not require specification of a report type within the report selection criteria. In either case, transmission of report selection criteria 3910 to a report-generating Web service is initiated by user selection of Send button 3930.

For example, an internet electronic mail message including report selection criteria may be received at S4010 of process 4000. The message may be received from a mailbox associated with address reports@company.com. The electronic mail message is converted from an internet electronic mail message format to a SOAP message at S4020. The SOAP message includes the body and the header elements of the electronic mail message in its main payload. More specifically, the main payload of the SOAP message includes the report selection criteria.

eMail handler 356 may be invoked at S4030 to generate an XML fragment based on the main payload of the SOAP message. Next, at S4040, the XML fragment is used to compose an XML (SOAP) message compliant with a generic groupware Web service message interface.

The generic groupware Web service message is mapped at S4050 to an application-specific Web service message interface based on a recipient electronic mail address of the received electronic mail message. As mentioned above, it will be assumed that the electronic mail address reports@company.com is associated with a report-generating Web service. An electronic mail message sent to this electronic mail address is therefore to be processed by the application-specific groupware Web service. Since a generic groupware Web service message is composed at S4040, this message is mapped to the message interface of the report-generating Web service at S4050 based on pre-defined mappings.

The report-generating Web service message is received by an inbound process agent corresponding to the report-generating Web service at S4060. The inbound process agent determines the report selection criteria from the report-generating Web service message at S4070. Next, at S4080, the inbound process agent interacts with a reporting system to generate a report based on the report selection criteria.

Figure 41:
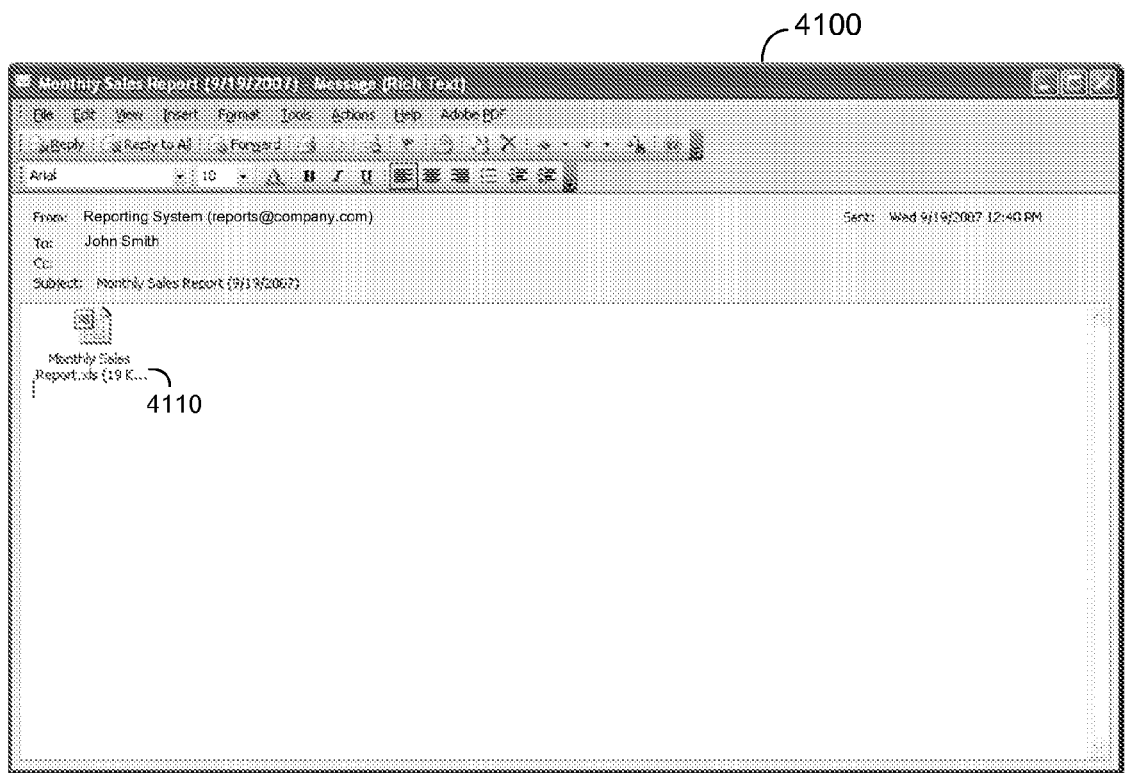
FIG. 41 is a view of a groupware client user interface displaying a received electronic mail message including a report attachment according to some embodiments.

User interface 4100 of FIG. 41 presents an electronic mail message sent to a user according to some embodiments. The electronic mail message was sent to the user by a Web service associated with the electronic mail address reports@company.com. Briefly, an outbound process agent may have exposed a report generated according to process 4000 and the electronic mail message of FIG. 41 may have been subsequently generated by a business process platform as described above with respect to process 2900.

The electronic mail message includes report attachment 4110, which may comprise a file native to any software application, including but not limited to an Excel file, a PDF file, a Word file, or any other suitable file type. In some embodiments, attachment 4110 does not comply with a groupware object standard as described herein. Report attachment 4110 may be saved locally by the user to facilitate offline use.

Service Orders

Conventional CRM systems may generate service orders for execution by a technician or other appropriate employee. Some embodiments provide for efficient communication of such a generated service order to a groupware client.

Figure 42:
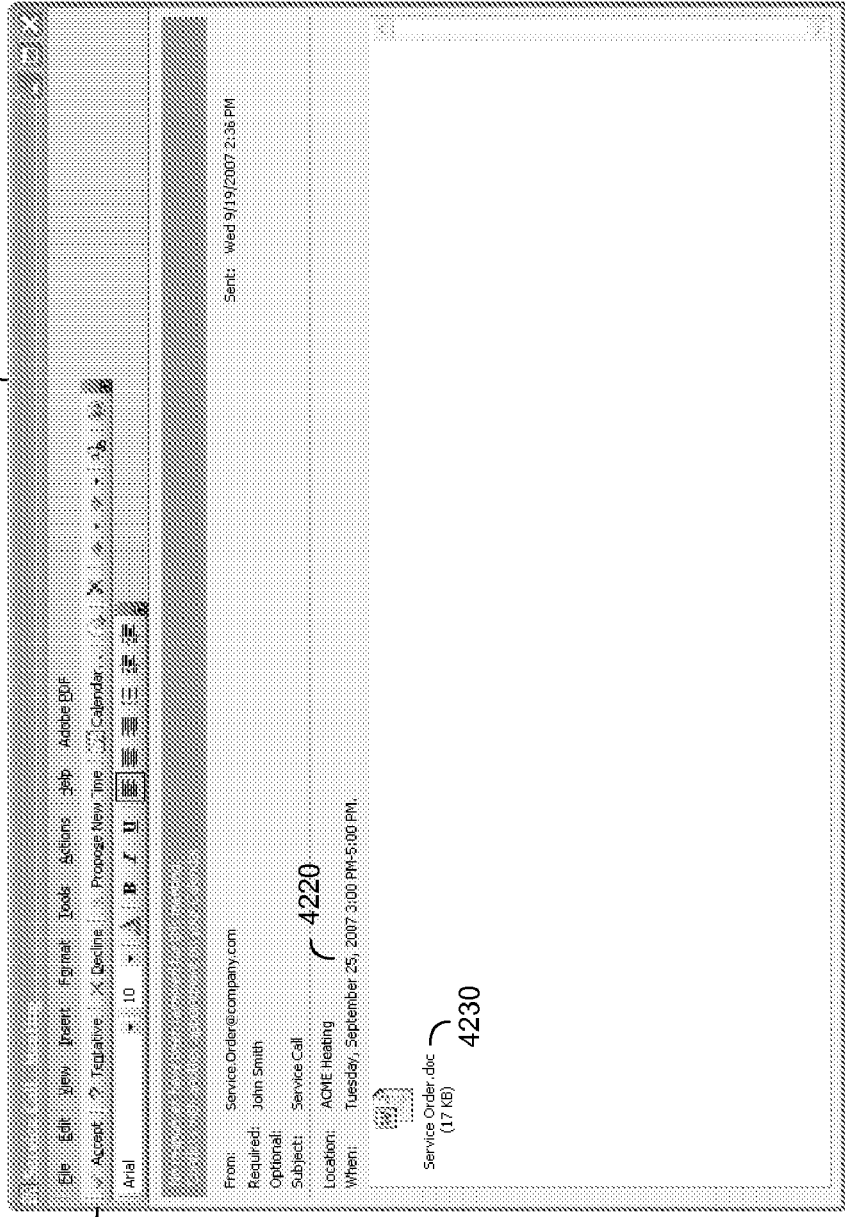
FIG. 42 is a view of a groupware client user interface displaying a received calendar entry including an attachment according to some embodiments.

FIG. 42 illustrates user interface 4200 of a groupware client to present an electronic mail message as received at the recipient electronic mail address. The electronic mail message is presented as a meeting because an iCalendar object was attached to the message. Accordingly, user interface 4200 includes Meeting toolbar 4210 and presents associated meeting details 4220. In addition, user interface displays file 4230 which was also attached to the electronic mail message. File 4230 may include details of a service order and/or may comprise a form to be completed and returned to the CRM system upon completion of the service order.

Figure 43:
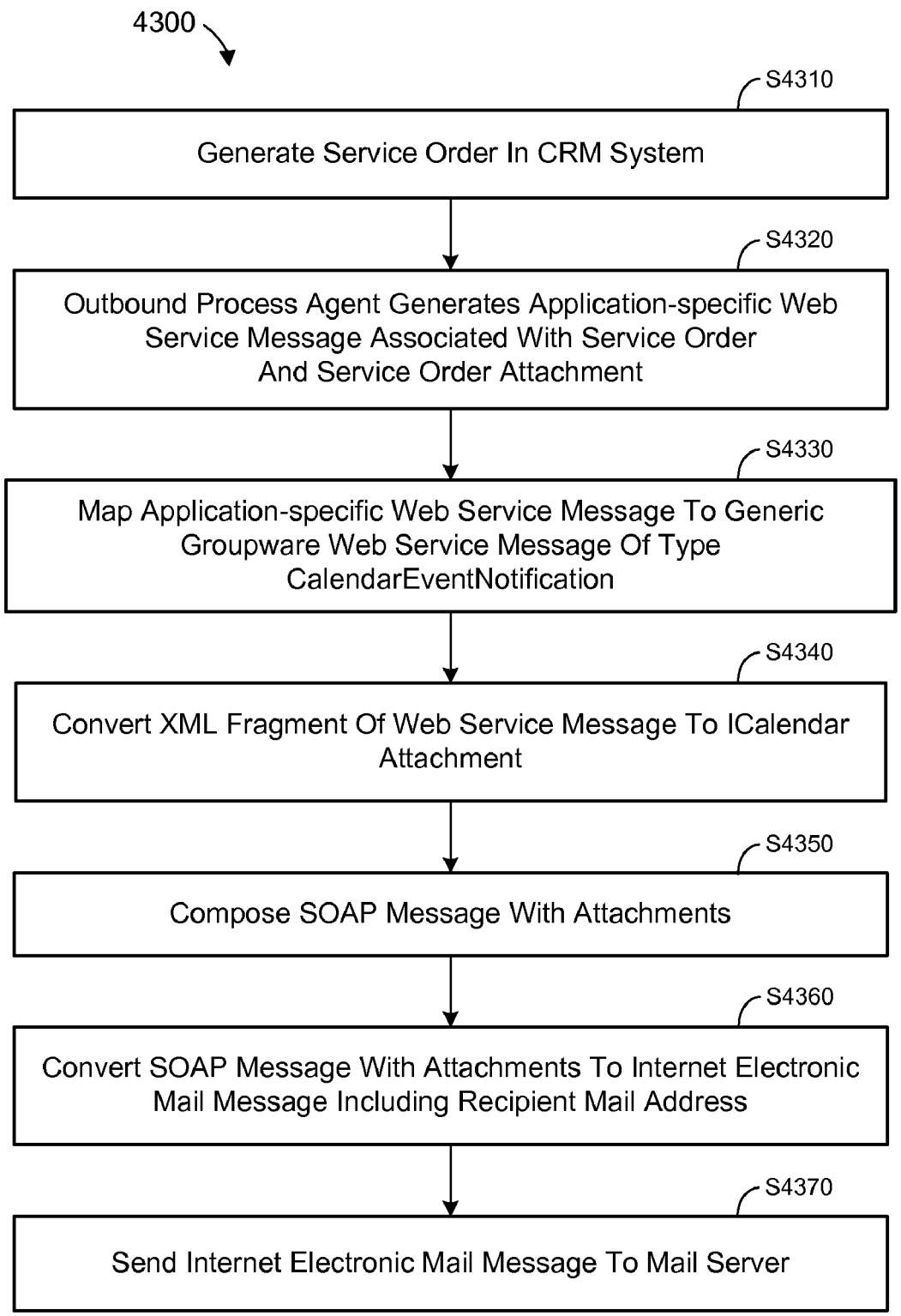
FIG. 43 is a flow diagram of a process to generate a calendar entry according to some embodiments.
Figure 44:
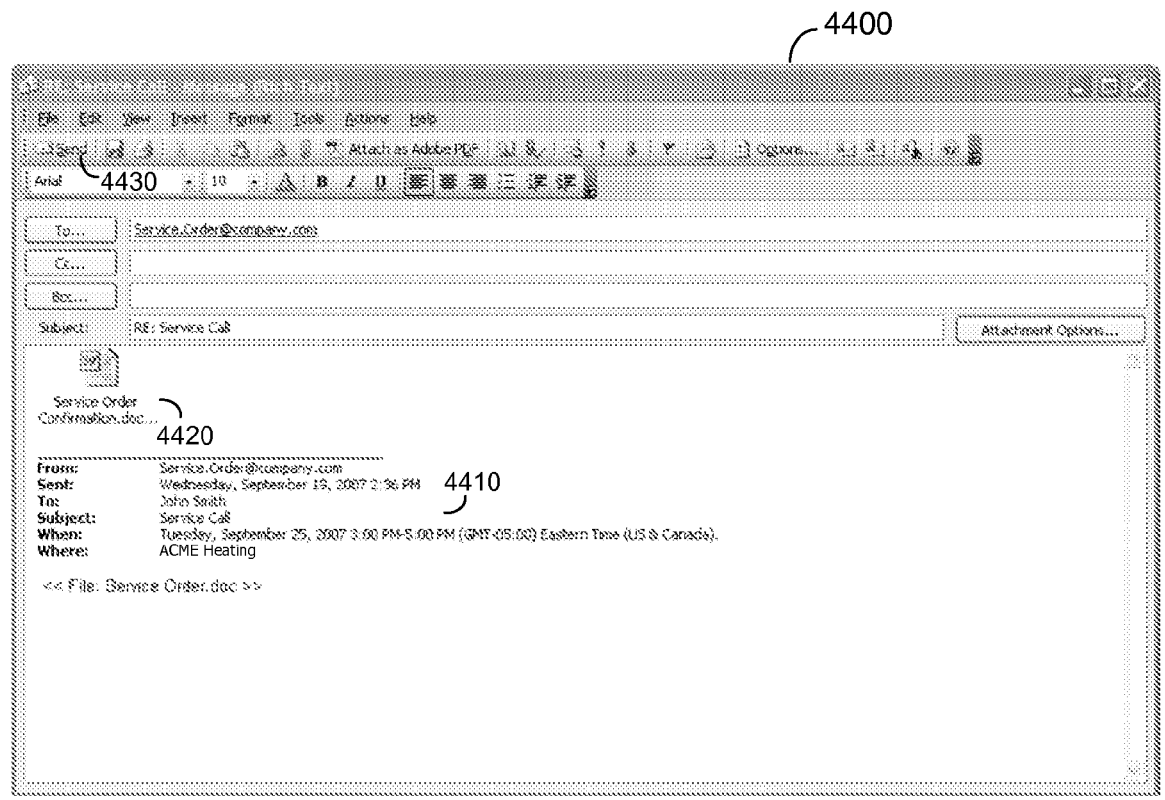
FIG. 44 is a view of a groupware client user interface for creating and sending an electronic mail message associated with a calendar entry according to some embodiments.

Process 4300 of FIG. 43 may be executed to transmit an electronic mail message as shown in FIG. 42. A service order is initially generated in a CRM system at S4310. The service order may be automatically generated by platform 370 based on business rules and associated trigger events or may be generated manually using user interface 380 of system 300. The service order may comprise a business object instantiated in response to a customer report, a maintenance schedule, and/or any other suitable trigger.

The generated service order is exposed by an outbound process agent via a Web service message at S4320. The Web service message is associated with the service order and complies with an application-specific message interface according to some embodiments. The Web service message is also associated with a service order attachment such as that represented by file 4230 of FIG. 42. The attachment may comprise an iForm®, a PDF form, a word processing document, or any other fillable document. The Web service message also includes an electronic mail address of a user to whom the service order is to be transmitted.

The application-specific Web service message is mapped to a generic groupware Web service message interface of type CalendarEventNotification at S4330. The mapping may be pre-configured and triggered based on a determination that the Web service message complies with the application-specific Web service message interface and not with a generic groupware Web service message interface. In some aspects, this determination is based on a determination that the sender electronic mail address within the Web service message differs from an electronic mail address associated with the generic groupware Web service.

A XML fragment of the converted Web service message is converted to an iCalendar attachment at S4340. S4340 may comprise invoking iCalendar handler 357 to convert the XML fragment to an internal representation and to convert the internal representation to a string corresponding to the iCalendar attachment. S4340 may also comprise generation of any fields required by the iCalendar standard that are not provided in the Web service message.

An intermediate SOAP message is composed at S4350 by attaching the iCalendar attachment to a SOAP message in which the main payload represents a header structure and body of a mail message and the attachment is a SOAP attachment. The intermediate SOAP message also includes the recipient electronic mail address, which may be determined from fields of the iCalendar attachment, and a second SOAP attachment comprising the service order attachment.

Next, at S4360, the SOAP message with attachments is converted to an internet electronic mail message. According to some embodiments, the main payload of the SOAP message is mapped to the header and body of the internet electronic mail message, and the SOAP attachments are converted into MIME attachments. The iCalendar attachment is converted to an iCalendar object prior to attachment to the electronic mail message.

The electronic mail message is converted from internet message format RFC 2822 to the wire format and is sent to a mail server via SMTP at S4370. The electronic mail message may then be routed to a mail server associated with the recipient electronic mail address of the electronic mail message, and displayed by a groupware client of a user as shown in FIG. 42. In some embodiments, the iCalendar object is automatically imported into the user's calendar.

User interface 4400 may be used to return a service order form to a CRM system according to some embodiments. User interface 4400 may be presented in response to user selection of the Reply function of the groupware client. As shown, the service order (i.e., the iCalendar object) represented in FIG. 42 is described by body text 4410. Attachment 4420 comprises a completed version of attachment 4230. Attachment 4420 is sent to the electronic mail address of the original sender (i.e., the electronic mail address associated with the corresponding application-specific Web service) by selecting Send button 4430.

The reply message may be converted to a generic groupware Web service message and then to an application-specific Web service message as described above. An inbound process agent may update a business object associated with the service order based on the application-specific Web service message and on information from completed attachment 4420. As described with respect to form 3820 of a previous example, the information may be parsed from completed attachment 4420 based on the known structure of attachment 4420. The business object may then be handled by a CRM system of the business process platform in any suitable manner.

Task Assignment

Figure 45:
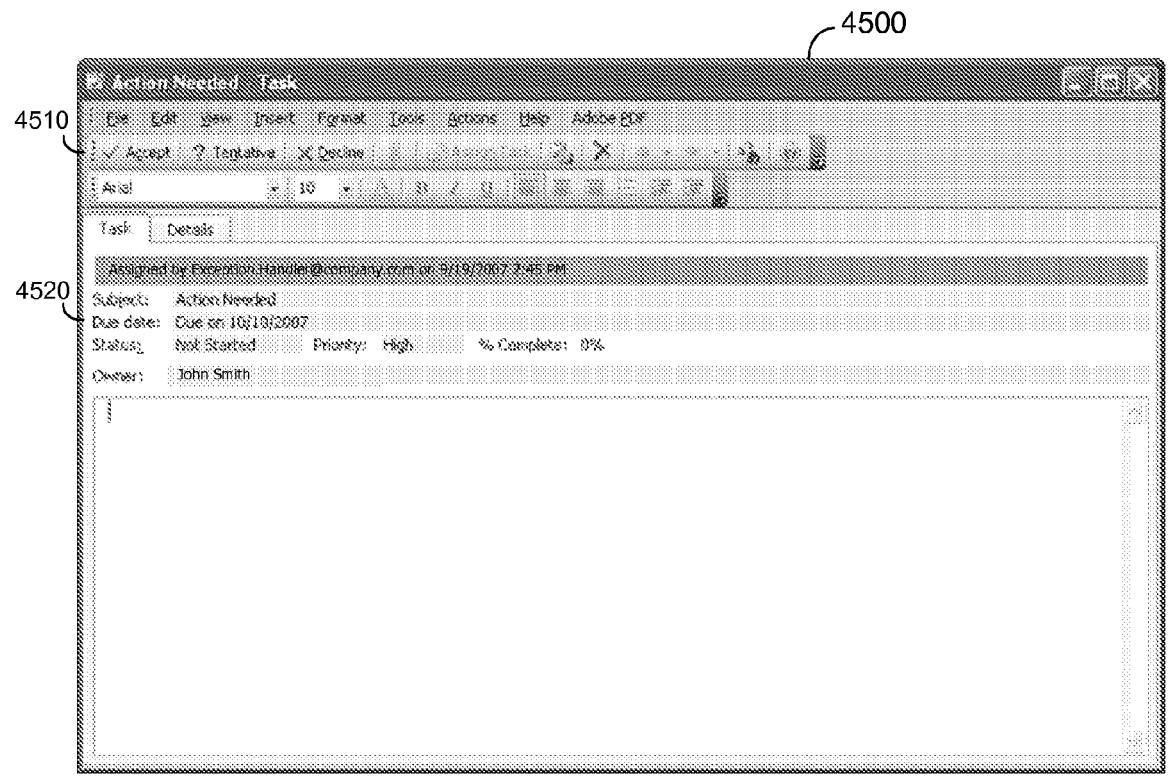
FIG. 45 is a view of a groupware client user interface displaying a received task according to some embodiments.

A business process platform may generate tasks related to business process and/or platform exceptions (e.g., for exception handling). FIG. 45 illustrates user interface 4500 representing such a task as displayed by a groupware client. An interface such as user interface 4500 is used by the groupware client to present an electronic mail message to which an iCalendar object representing a task is attached. Accordingly, user interface 4500 includes Task toolbar 4510 and presents associated task details 4520.

Figure 46:
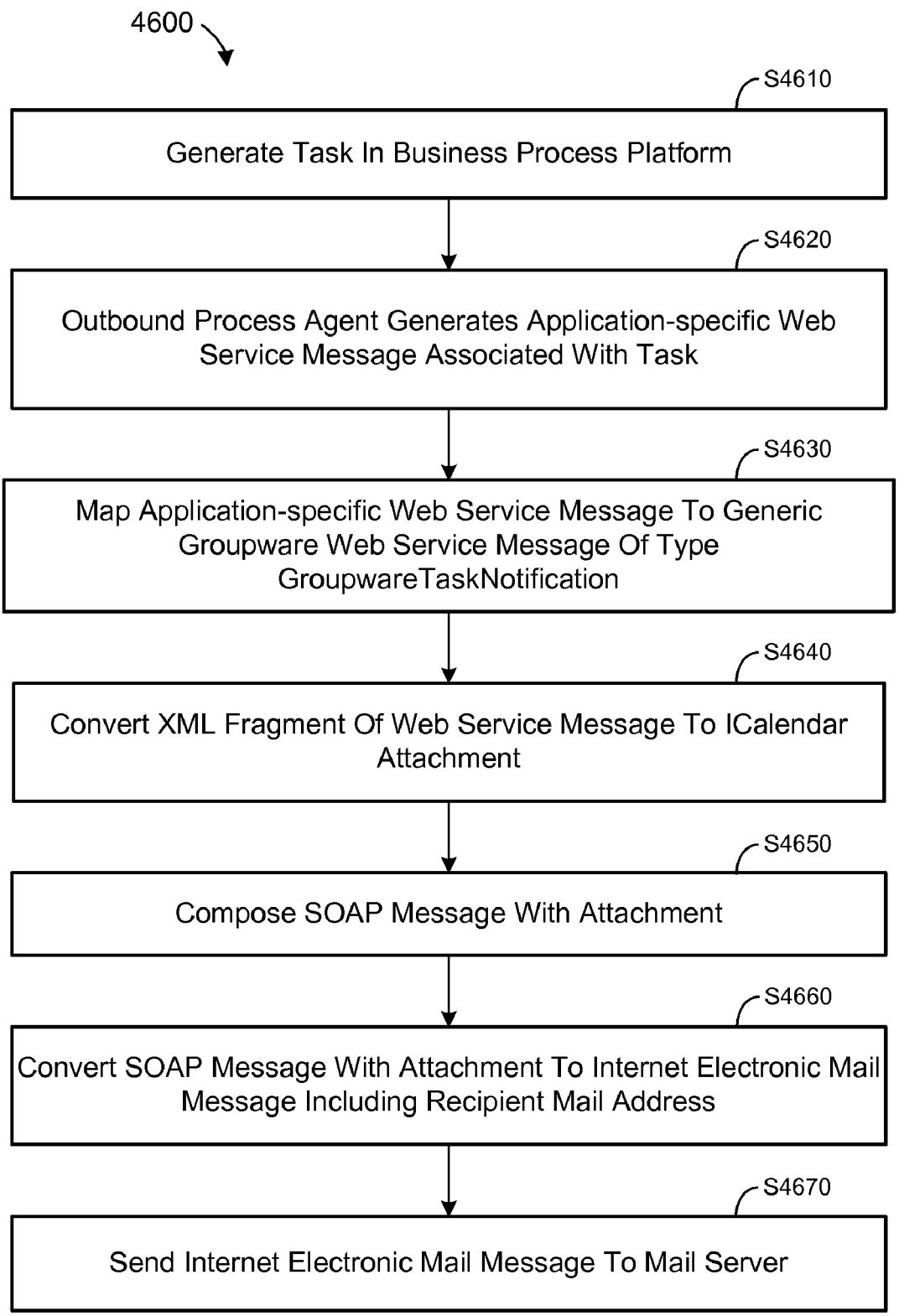
FIG. 46 is a flow diagram of a process to generate a task according to some embodiments.

An electronic mail message as shown in FIG. 45 may be generated and transmitted according to process 4600 of FIG. 46. A business process platform generates a task at S4610. The task may be generated manually or automatically generated based on business rules and associated trigger events such as, but not limited to, detection of an exception. The generated task may comprise an instantiation of a task business object.

The generated task is exposed by an outbound process agent via a Web service message at S4620. The Web service message may be associated with the task and complies with an application-specific message interface. Moreover, he Web service message includes an electronic mail address of a user to whom the task is to be assigned.

The application-specific Web service message is mapped at S4630 to a generic groupware Web service message interface of type GroupwareTaskNotification. The mapping may be follow a determination that the Web service message complies with the application-specific Web service message interface and not with a generic groupware Web service message interface.

A XML fragment of the converted Web service message is converted to an iCalendar attachment at S4640. iCalendar handler 357 may be invoked at S4640 to convert the XML fragment to an internal representation and to convert the internal representation to a string corresponding to the iCalendar attachment. Next, at S4650, an intermediate SOAP message is composed by attaching the iCalendar attachment to a SOAP message in which the main payload represents a header structure and body of a mail message. The intermediate SOAP message also includes the recipient electronic mail address, which may be determined from fields of the iCalendar attachment.

The SOAP message with attachments is converted to an internet electronic mail message at S4660. According to some embodiments, the main payload of the SOAP message is mapped to the header and body of the internet electronic mail message, and the SOAP attachment is converted into MIME attachments. The iCalendar attachment is converted to an iCalendar object prior to attachment to the electronic mail message. The iCalendar attachment may include a VTODO block to designate the object as a groupware task.

The electronic mail message is then converted from internet message format RFC 2822 to the wire format and is sent to a mail server via SMTP at S4670. In some embodiments, the electronic mail message is routed to a mail server associated with the recipient electronic mail address of the electronic mail message, and displayed by a groupware client of a user as shown in FIG. 45. In some embodiments, the iCalendar object is automatically imported into the user's calendar.

Figure 47:
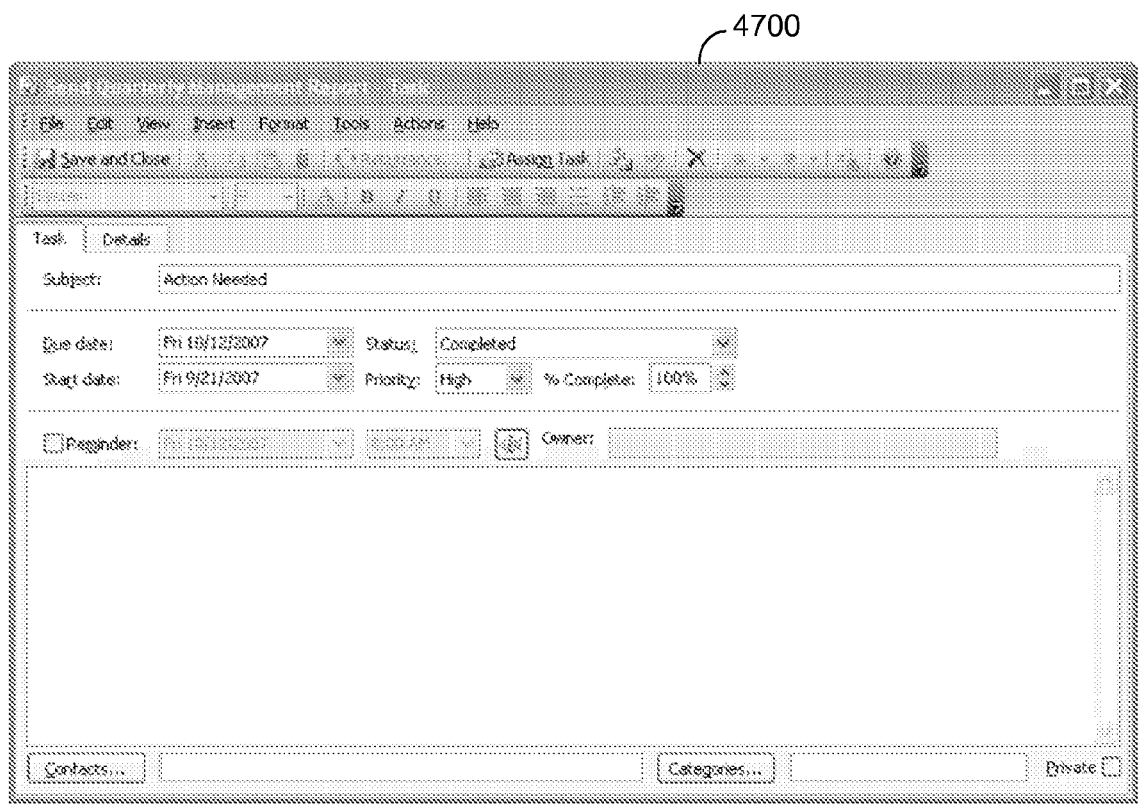
FIG. 47 is a view of a groupware client user interface to update a task according to some embodiments.

User interface 4700 of FIG. 47 may be used to indicate progress of an assigned task according to some embodiments. Upon saving any user changes to a received task, the groupware client transmits an electronic mail message including the changed task object to the electronic mail address of the original sender (i.e., the electronic mail address associated with the corresponding application-specific Web service). As described with respect to examples above, the electronic mail message is converted to a generic groupware Web service message and then to an application-specific Web service message as described above. An inbound process agent may then update the task business object based on the application-specific Web service message.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A method implemented by an apparatus executing processor-executable program code, comprising:
receiving, at a mail server associated with a recipient electronic mail address, an internet electronic mail message comprising a MIME attachment and associated with the recipient electronic mail address;
generating a first markup language fragment based on a header and body of the internet electronic mail message;
generating a second markup language fragment based on the MIME attachment;
determining a message type based on the MIME attachment; and
composing, using the first and second markup language fragments, a first message compliant with a first message interface of a first Web service, the first message associated with the determined message type.

2. A method according to claim 1, wherein the MIME attachment complies with RFC 2822, RFC 2445 or RFC 2426.

3. A method according to claim 1, wherein generating the first one markup language fragment based on the internet electronic mail message comprises:
converting the internet electronic mail message to an intermediate message; and
generating the first markup language fragment based on the intermediate message.

4. A method according to claim 3, wherein a payload of the intermediate message comprises the header of the internet electronic mail message and the body of the internet electronic mail message, and
   wherein generating the first one markup language fragment comprises generating an eXtensible Markup Language fragment based on the header of the internet electronic mail message and the body of the internet electronic mail message.

5. A method according to claim 3, wherein generating the second markup language fragment comprises converting the MIME attachment to an eXtensible Markup Language fragment.

6. A method according to claim 3, wherein the intermediate message and the first message comply with Simple Object Access Protocol.

7. A method according to claim 1, further comprising:
   determining whether the internet electronic mail message is identical to a previously-received internet electronic mail message prior to converting the internet electronic mail message.

8. A method according to claim 1, further comprising:
   determining a second Web service based on the recipient electronic mail address of the internet electronic mail message; and
   mapping the first message to a second message compliant with a second message interface of the second Web service.

9. A method according to claim 8, further comprising:
   determining a process agent associated with the second message based on the recipient electronic mail address of the internet electronic mail message.

10. A method according to claim 8, further comprising:
    storing the internet electronic mail message in a buffer;
    determining a user based on a sender electronic mail address of the internet electronic mail message;
    sending the second message and authorization credentials of the user to a provider of the second Web service;
    receiving an acknowledgement of the second message from the provider of the second Web service; and
    deleting the internet electronic mail message from the buffer in response to the acknowledgement.

11. A non-transitory medium storing processor-executable program code, the program code comprising:
    code to receive, at a mail server associated with a recipient electronic mail address, an internet electronic mail message comprising a MIME attachment and associated with the recipient electronic mail address;
    code to generate a first markup language fragment based on a header and body of the internet electronic mail message;
    code to generate a second markup language fragment based on the MIME attachment;
    code to determine a message type based on the MIME attachment; and
    code to compose, using the first and second markup language fragments, a first message compliant with a first message interface of a first Web service, the first message associated with the determined message type.

12. A non-transitory medium according to claim 11, wherein the MIME attachment complies with RFC 2822, RFC 2445 or RFC 2426.

13. A non-transitory medium according to claim 11, wherein the code to generate the first markup language fragment based on the internet electronic mail message comprises:
    code to convert the internet electronic mail message to an intermediate message; and
    code to generate the first markup language fragment based on the intermediate message.

14. A non-transitory medium according to claim 13, wherein a payload of the intermediate message comprises the header of the internet electronic mail message and the body of the internet electronic mail message, and
    wherein the code to generate the first markup language fragment comprises code to generate an eXtensible Markup Language fragment based on the header of the internet electronic mail message and the body of the internet electronic mail message.

15. A non-transitory medium according to claim 13, wherein the code to generate the second markup language fragment comprises code to convert the MIME attachment to an eXtensible Markup Language fragment.

16. A non-transitory medium according to claim 13, wherein the intermediate message and the first message comply with Simple Object Access Protocol.

17. A non-transitory medium according to claim 11, the program code further comprising:
    code to determine whether the internet electronic mail message is identical to a previously-received internet electronic mail message prior to converting the internet electronic mail message.

18. A non-transitory medium according to claim 11, the program code further comprising:
    code to determine a second Web service based on the recipient electronic mail address of the internet electronic mail message; and
    code to map the first message to a second message compliant with a second message interface of the second Web service.

19. A non-transitory medium according to claim 18, the program code further comprising:
    code to determine a process agent associated with the second message based on the recipient electronic mail address of the internet electronic mail message.

20. A non-transitory medium according to claim 18, the program code further comprising:
    code to store the internet electronic mail message in a buffer;
    code to determine a user based on a sender electronic mail address of the internet electronic mail message;
    code to send the second message and authorization credentials of the user to a provider of the second Web service;
    code to receive an acknowledgement of the second message from the provider of the second Web service; and
    code to delete the internet electronic mail message from the buffer in response to the acknowledgement.

21. A system comprising:
    a memory storing processor-executable program code;
    a processor to execute the processor-executable program code to cause the system to:
    receive an internet electronic mail message comprising a MIME attachment and associated with a recipient electronic mail address;
    generate a first markup language fragment based on a header and a body of the internet electronic mail message;
    generate a second markup language fragment based on the MIME attachment;
    determine a message type based on the MIME attachment; and
    compose, using the first and second markup language fragments, a first message compliant with a first message interface of the first Web service, the first message associated with the determined message type.

22. A system according to claim 21, the processor to execute the processor-executable program code to further cause the system to:
   convert the internet electronic mail message to an intermediate message; and
   generate the first markup language fragment based on the intermediate message.

23. A system according to claim 22, wherein a payload of the intermediate message comprises the header of the internet electronic mail message and the body of the internet electronic mail message,
   wherein generation of the first markup language fragment comprises generation of an eXtensible Markup Language fragment based on the header of the internet electronic mail message and the body of the internet electronic mail message, and
   wherein generation of the second markup language fragment comprises conversion of the MIME attachment to an eXtensible Markup Language fragment.

24. A system according to claim 21, the processor to execute the processor-executable program code to further cause the system to:
   determine a second Web service based on the recipient electronic mail address of the internet electronic mail message; and
   map the first message to a second message compliant with a second message interface of the second Web service.

25. A system according to claim 24, further comprising:
   a process agent to receive the second message and to implement the second Web service.

* * * * *